US005231565A

United States Patent [19]

Bilas et al.

[11] Patent Number: 5,231,565

[45] Date of Patent: Jul. 27, 1993

[54] ELECTRICAL DISTRIBUTION SYSTEM HAVING MAPPABLE CONTROL INPUTS

[75] Inventors: Ronald J. Bilas; Drew A. Reid, both of Cedar Rapids, Iowa

[73] Assignee: Square D Company, Palatine, Ill.

[21] Appl. No.: 723,370

[22] Filed: Jun. 28, 1991

[51] Int. Cl.$^5$ .............................................. G06F 15/56

[52] U.S. Cl. ................................ 364/140; 307/132 E; 364/184; 364/483; 364/492

[58] Field of Search ............... 364/140, 141, 146, 188, 364/189, 481, 483, 492, 184–187; 361/71, 57, 97, 98, 101, 88–93; 307/38, 34, 35, 39, 40, 41, 132 E

[56] References Cited

U.S. PATENT DOCUMENTS

| | | | |
|---|---|---|---|
| 4,535,409 | 8/1985 | Jindrick et al. | 364/483 X |
| 4,628,397 | 12/1986 | Gareis et al. | 364/483 X |
| 4,663,539 | 5/1987 | Sharp et al. | 364/492 X |
| 4,964,058 | 10/1990 | Brown, Jr. | 364/492 |
| 4,996,646 | 2/1991 | Farrington | 364/492 X |

*Primary Examiner*—Joseph Ruggiero

*Attorney, Agent, or Firm*—Larry I. Golden; Kareem M. Irfan

[57] ABSTRACT

In an electrical distribution system for controlling current paths through a plurality of associated circuit breakers, a programmable circuit arrangement operates the circuit breakers by remote control in at least the open and closed circuit positions. The circuit arrangement includes a termination circuit for receiving different kinds of remote control signals, each of which is associated with one of the circuit breakers for commanding that each of the circuit breakers open or close its associated current path. The arrangement also includes a programmable controller, which responds to each of the different kinds of remote control signals and to a user-defined program indicating the kind of remote control signal which commands the associated circuit breaker, for generating control signals. An interface circuit then responds to the generated control signals by controlling the circuit breakers between the open and closed positions. The programmable controller may also include a display for indicating the status of the circuit breakers locally and/or remotely.

22 Claims, 29 Drawing Sheets

ELECTRICAL DISTRIBUTION SYSTEM HAVING MAPPABLE CONTROL INPUTS

FIELD OF THE INVENTION

The present invention relates generally to circuit breaker load centers and, more particularly, to improvements in the control and monitoring of remotely controlled circuit breakers.

BACKGROUND OF THE INVENTION

Remote control circuit breakers are commonly used for temporary interruption of electrical service during peak use hours and for programmable lighting control of industrial locations. By opening and closing on demand from a remote location, these circuit breakers provide a significant improvement over manually operated circuit breakers in terms of convenience.

Systems using remote control circuit breakers typically include a circuit breaker load-center having circuit breakers wired to a remotely located computer for monitoring and/or controlling each circuit breaker. The wiring has been accomplished in such systems either by using a patch-board within the load-center, as described in U.S. Pat. No. 4,920,476 (Brodsky et al.), or by hard-wiring each circuit breaker input/output to a terminal in the remotely located computer.

Such systems, unfortunately, are not very accommodating to system control changes. Rather, the systems are designed to handle specific types of remote control signals, typically provided by a pair of wires that may be shorted to command the circuit breaker to close. Each time the circuit breaker control requirements change in these systems, the wiring and many system components must be reconfigured or replaced, thereby making these systems expensive and burdensome to maintain.

Another maintenance-related problem with these types of systems concerns the ability to control and monitor the system. Most load-center systems fail to provide a conveniently arranged monitoring system for the various circuit breakers and/or fail to provide a convenient method of on-line circuit breaker programming.

There is therefore a need for a remotely controlled circuit breaker load-center which is easier and more convenient to monitor and operate.

OBJECTS AND SUMMARY OF THE INVENTION

It is a general object of the present invention to provide an improved remote control circuit breaker arrangement which overcomes the aforementioned deficiencies of the prior art and which is more convenient to monitor and operate locally and remotely.

It is another object of this invention to provide an improved circuit breaker arrangement having reliable, yet inexpensive, local and remote signals for indicating whether power to the load has been interrupted.

It is another object of this invention to provide a circuit arrangement in a load-center for controlling current paths through a plurality of associated circuit breakers which are each operable by remote control in at least the open and closed circuit positions. The circuit arrangement may include a termination circuit for receiving different kinds of remote control signals, each of which is associated with at least one of the circuit breakers for commanding that each of the circuit breakers open or close the associated current path; and a programmable control circuit, responsive to each of the different kinds of remote control signals and to a prescribed map indicating the kind of remote control signal which commands the associated circuit breaker, for controlling the circuit breakers between the open and closed positions.

In accordance with one embodiment of the present invention, the foregoing objectives are particularly realized by implementing the circuit arrangement with a termination circuit, a programmable controller and an interface circuit. The termination circuit receives a plurality of different kinds of remote control signals, each of which is associated with one of the circuit breakers for commanding that each of the circuit breakers open or close the associated current path. The programmable controller responds to each of the different kinds of remote control signals and to a user-defined program indicating the kind of remote control signal which commands the associated circuit breaker, by generating control signals. Finally, the interface circuit responds to the generated control signals by controlling the circuit breakers between the open and closed positions.

The plurality of different kinds of remote control signals preferably include a pulsed, or momentary, signal for indicating that the associated circuit breaker should change positions between the open and closed circuit positions, and also a maintained or level-indicating signal having an open position level and a closed position level for indicating the open and closed positions for the associated circuit breaker.

Preferably, the interface circuit includes means for monitoring the position of each of the circuit breakers and reporting the position to the programmable controller for local and remote display, and the termination circuit and the controller each includes a microcomputer for communicating between the termination circuit and the controller.

BRIEF DESCRIPTION OF THE DRAWINGS

Other objects and advantages of the invention will be apparent from the following detailed description and the accompanying drawings in which:

FIG. 6 is a block diagram of an expansion module, according to the present invention, which may be used to interconnect a various types of accessories into the system of FIG. 1a;

FIG. 9d is a schematic diagram of the electrical portion of a circuit breaker illustrated in FIG. 1a;

FIGS. 9e-9g comprise three state diagrams which depict the power driver, data transmit and data receive operation of the gate array illustrated in FIG. 9a;

FIGS. 9h-9k comprise a series of timing diagrams which respectively depict the receive message, open contacts, read status and read motor operations of the gate array illustrated in FIG. 9a;

FIGS. 13a-13d comprise a flow chart which may be used to program the microcomputer shown in FIG. 11a.

Figure 1A:
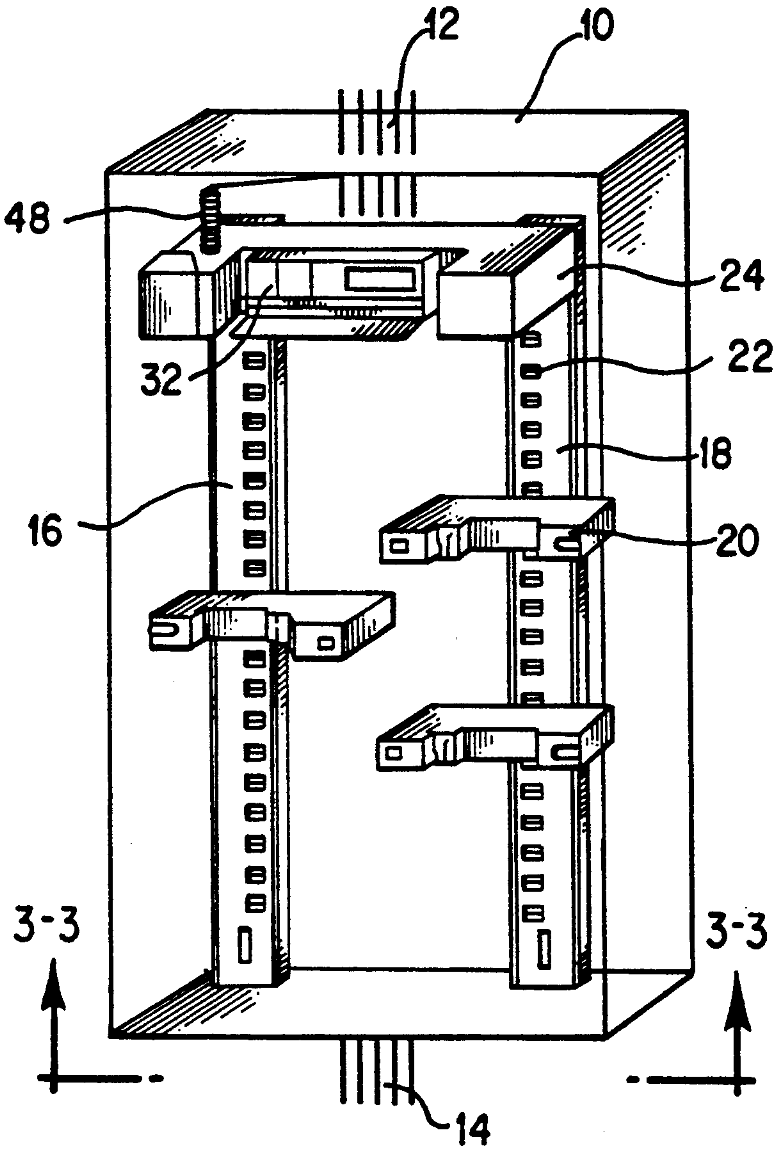
FIG. 1*a* is a perspective view of a load center arrangement or system, according to the present invention.
Figure 1B:
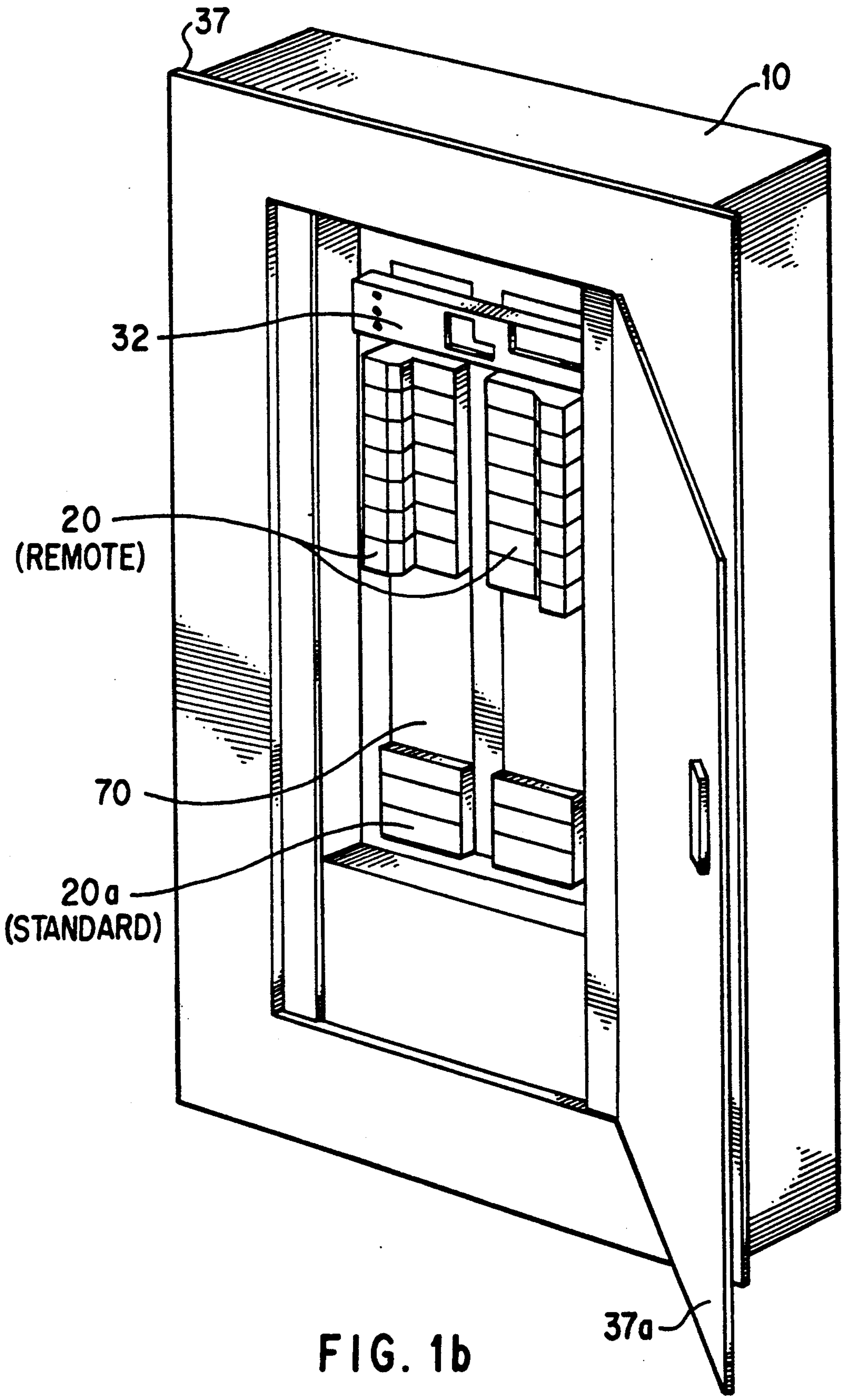
FIG. 1*b* is another perspective view of the load center arrangement of FIG. 1*a;*

While the invention is susceptible to various modifications and alternative forms, specific embodiments thereof have been shown by way of example in the drawings and will be described in detail. It should be understood, however, that it is not intended to limit the invention to the particular form described. On the contrary, the invention is to cover all modifications, equivalents, and alternatives falling within the spirit and scope of the invention as defined by the appended claims.

DESCRIPTION OF THE PREFERRED EMBODIMENT

In FIG. 1a, the present invention is shown to provide an electrical distribution system or arrangement which may include a panelboard or load-center enclosure 10 which receives a plurality of input power lines 12 from a power source (not shown). Lines 14 exit the enclosure 10 to distribute power to various loads (not shown). Bus boards 16 and 18, which may be implemented on the same board, are disposed in parallel on each side of the load-center for mounting remotely controlled circuit breakers 20, each having a plug-in socket which is coupled to one of a plurality of connectors 22 on the bus boards 16 and 18. The connectors 22 are used with the bus boards 16 and 18 to carry motor control and contact-status signals, via an interface module 24, to and from the circuit breakers 20. Electrical switching devices other than circuit breakers may be used such as contactors or electrical relays.

A preferred circuit breaker, which may be used to implement the remotely controlled circuit breakers 20, is described in copending patent application 07/722,050, entitled REMOTE CONTROL CIRCUIT BREAKER, which is filed herewith, assigned to the instant assignee and incorporated herein by reference. Another circuit breaker which may be used to implement the remotely controlled circuit breakers 20 is described in U.S. Pat. No. 4,623,859, Erickson et al., also assigned to the instant assignee and incorporated herein by reference.

Figure 2:
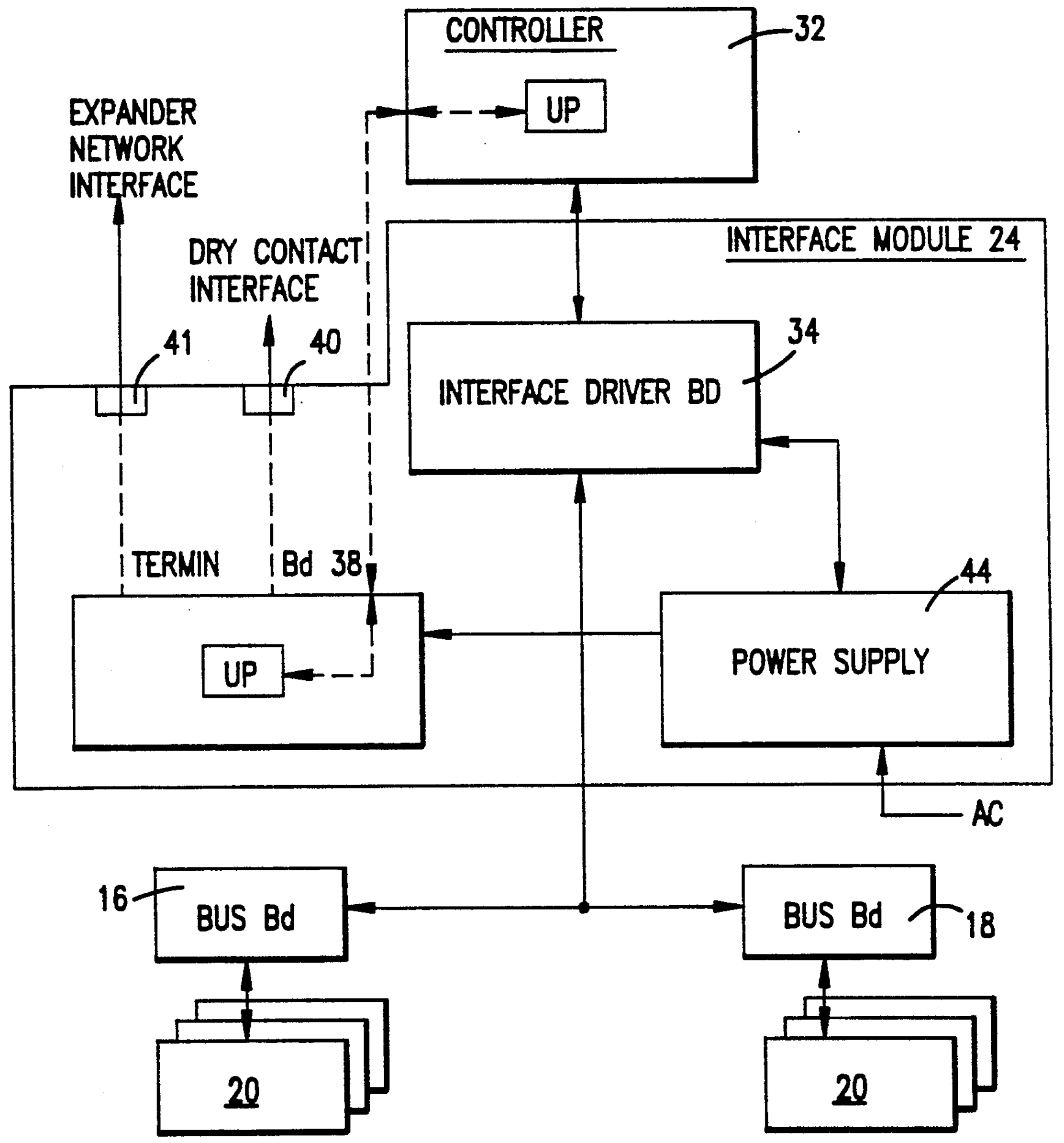
FIG. 2 is an electrical block diagram of the system shown in FIG. 1*a*, and including a controller, an interface module and a termination board which are intercoupled to provide the primary control functions of the system.
Figure 7:
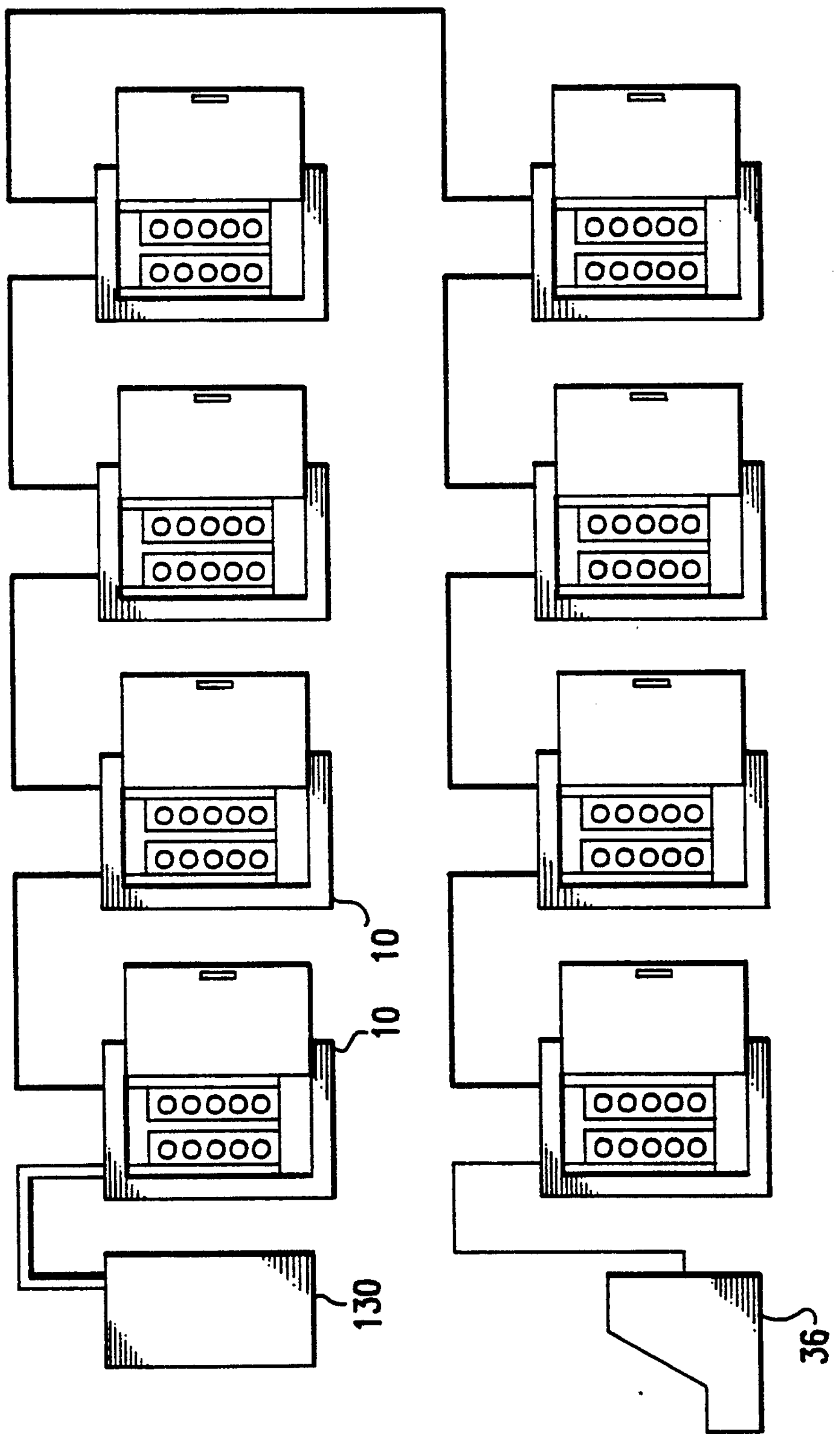
FIG. 7 illustrates a perspective view of a plurality of systems interconnected in accordance with the present invention.

As illustrated in the block diagram of FIG. 2, the interface module 24 interprets messages from a controller 32 so as to facilitate electrical control and monitoring functions from both local and remote locations. Both the control and monitoring functions are accommodated within the interface module 24 using an interface driver board 34. The interface driver board 34 provides a communications path between the circuit breakers 20 and the controller 32, which resides within, and as an integral part of, the load-center enclosure 10. The controller 32 may communicate with a remotely located control/monitoring device 36 (FIG. 7) via the termination board 38. Any such control or monitoring signal transmitted between the interface driver board and the circuit breakers is carried by one of two control buses on the bus boards 16 and 18.

The interface module 24 also includes a termination board 38, which is used to couple the control and monitoring signals between the interface driver board 34 and the remotely located control/monitoring device via the controller 32. Preferably, the control and monitoring signals are transmitted and received using either a direct-wiring (or dry contact) interface, as depicted at port 40 of the termination board 38, or a prescribed serial communication protocol (e.g., a wired or wireless LAN-type interface), as depicted at port 41 of the termination board 38. This coupling may also be accomplished using a number of different techniques, including, for example, those techniques discussed in U.S. Pat. No. 4,709,339 (issued to Fernandez), and co-pending U.S. patent application Ser. No. 07/503,267, by Lee Wallis.

Figure 3:
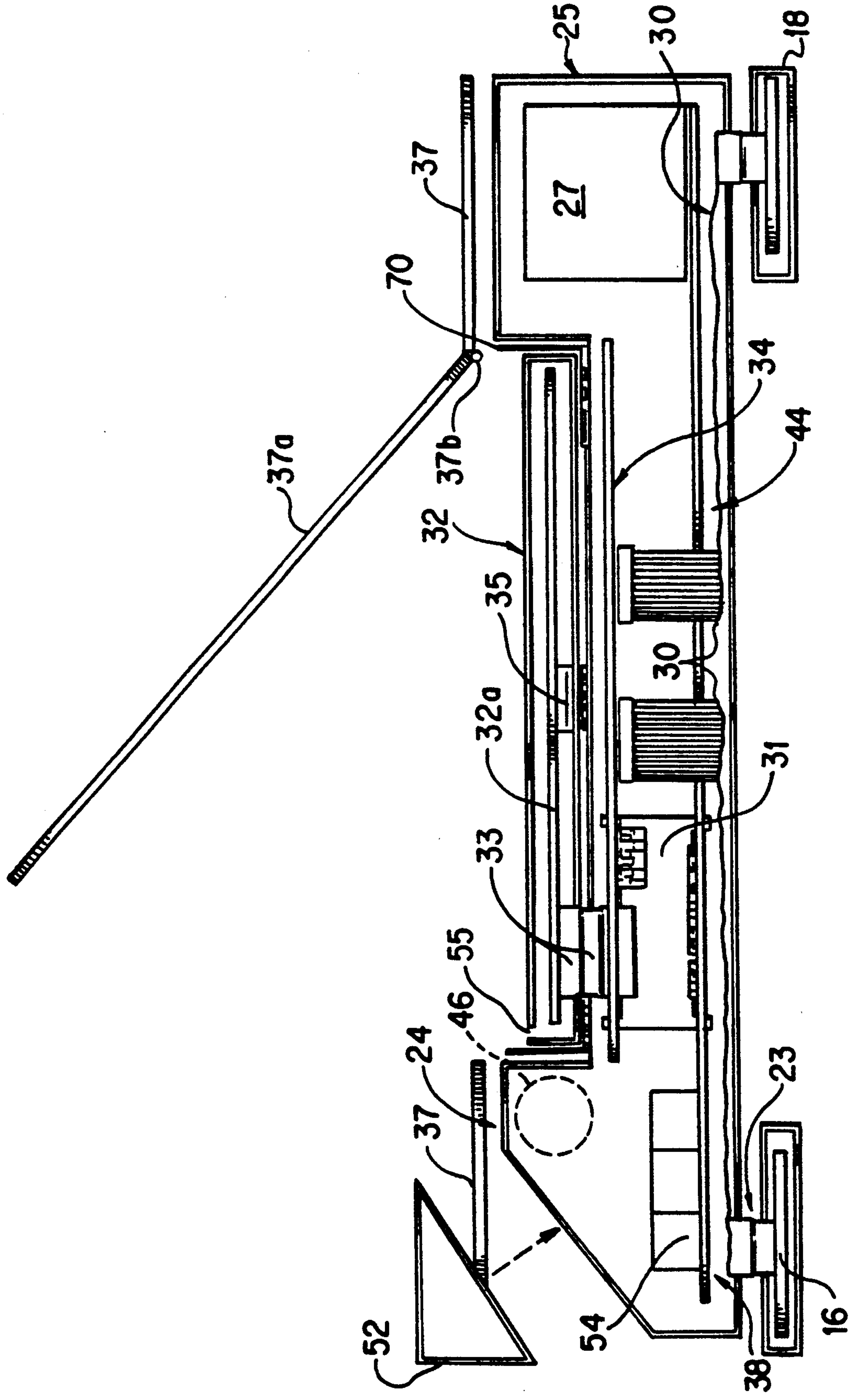
FIG. 3 is an end view, taken along line 3—3 of FIG. 1*a*, illustrating various interconnected components of the system of FIG. 1*a;*

FIG. 3, which shows an end view of load-center components of FIG. 1a, best illustrates the above-described electrical arrangement of FIG. 2 from a structural perspective. FIG. 3 illustrates a manner of interconnecting the bus boards 16 and 18, the controller 32 and the interface module 24, the latter of which includes an interface module housing 25 for enclosing the interface driver board 34, a power supply board 44 and the termination board 38. The interface module 24 may be coupled to the uppermost or lowermost portion of the bus boards 16 and 18 according to the preferred viewing position. The interface driver board 34 is preferably coupled to the bus boards 16 and 18 via a pair of ribbon cables 30 and associated DB25-type connectors 23, and the interface driver board 34 is coupled to the power supply board 44 and the termination board 38 using an interconnect board 31. The connectors 33 may be offset so that the controller 32 overhangs the top or bottom of the load-center if desired. The controller 32 ma be secured to the front panel of the interface module 24 using DB-9 connectors 33.

The controller 32 includes a controller circuit board 32a which may be secured to the front panel of the interface module 24 using DB-9 connectors 33. A membrane keyboard 35 is used to receive user inputs for controlling the circuit breakers and for programming the system.

The power supply board 44 and the termination board 38 may be implemented on a single printed circuit board or separate circuit boards. Further, a power transformer 27 is preferably attached to the power supply board 44 to provide power to the interconnect board 31. The transformer 27 may include two primary windings and three secondary windings to provide signals which may be processed using full-wave rectifier/-regulator stages, such that +5 (Vcc), −5 and −24

Volts are provided along with their associated common signals, of which at least the latter two may be the same. In a preferred embodiment, one secondary winding provides the +5 Volt signal, the second secondary winding provides the −24 Volts signal, and the third secondary winding provides an isolated unregulated signal which is regulated to +5 Volts ($V_{iso}$ of FIG. 11*a*); and the −5 Volt signal emanates from the −24 Volt regulator.

A cover 37, including a cover door 37*a* rotating about a hinge 37*b*, is conventionally used to enclose the load center.

Also illustrated in FIG. 3 is a conduit mounting hole 46 on the interface module housing 25 for receiving leads, via conduit (not shown), which connect to input terminals 54 on the termination board 38. The leads include low voltage wiring for switch inputs, e.g., dry-contact type inputs or a LAN. A removable termination area cover 52 protects and allows access to the input terminals 54 of the termination board 38.

Another important part of the present invention concerns the location of the controller 32. As shown in FIG. 3, a deadfront panel 70 is used to isolate the power lines from operators and to cover the interface module 24 and most of the bus boards 16 and 18 and the circuit breakers 20 (FIGS. 1*a* and 2). The controller 32 is separated from the interface driver board 34 and located in front of the deadfront panel 70. This arrangement is advantageous for a number of reasons. For instance, it provides additional room for the circuitry within the interface module 24, which is located behind the deadfront panel 70.

Another advantage relates to the dissipation of heat generated by the circuitry within the interface module 24, as well as the circuit breakers 20. Unfortunately, the deadfront panel 70 has the potential to significantly increase the temperature resulting from the generated heat due to the lack of ventilation that would otherwise be provided to the interface module circuitry in the absence of the deadfront panel 70. Thus, by locating the controller 32 and its associated circuitry in front of the deadfront panel 70, the temperature of the circuitry is lowered and the cost and reliability of the circuitry is therefore improved.

Figure 5A:
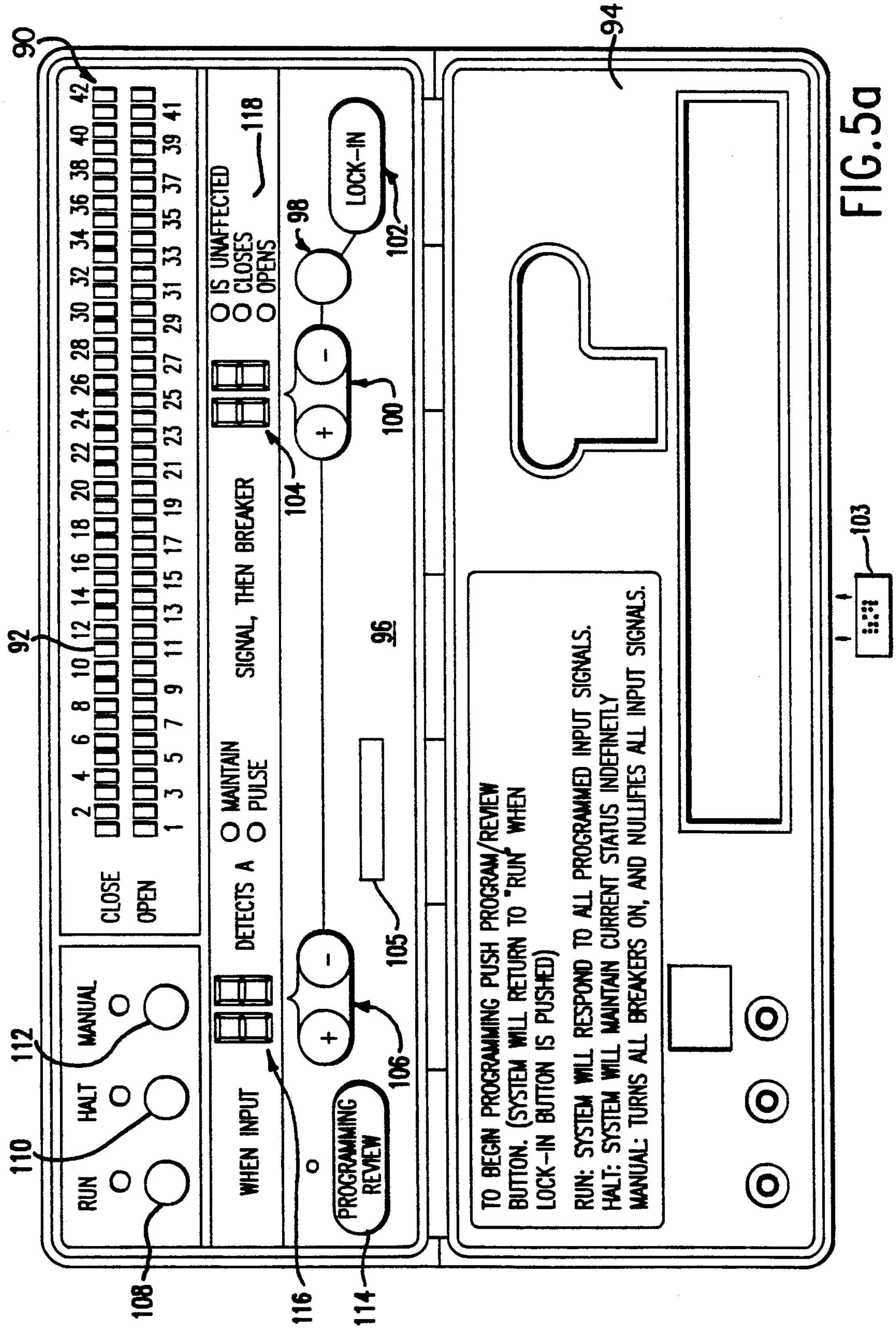
FIG. 5*a* is a perspective view of the display for the controller shown in FIGS. 1-4.

Yet another advantage provided by this controller arrangement is the additional access it provides for operator interface. By using an informationally sophisticated monitor/control panel, such as is shown in FIG. 5*a*, within the load-center enclosure 10, an operator will need complete access to the various displays and control keys on the monitor/control panel.

Further, this arrangement allows an operator to easily replace or upgrade the controller without removing the deadfront panel and thereby exposing the operator to the power lines.

In order to allow removal of the deadfront panel 70 without disconnecting the electronics between the controller 32 and the interface module 24, the controller 32 may be coupled to the interface module 24 by a hinged pivot. In the operating position, the controller 32 would be held in position by a connector which attaches to the interface module 24. The opposite side of the controller would be attached by the hinged pivot such that the controller 32 could be perpendicularly pivoted away from the panel to allow for removal of the deadfront panel 70.

Figure 4:
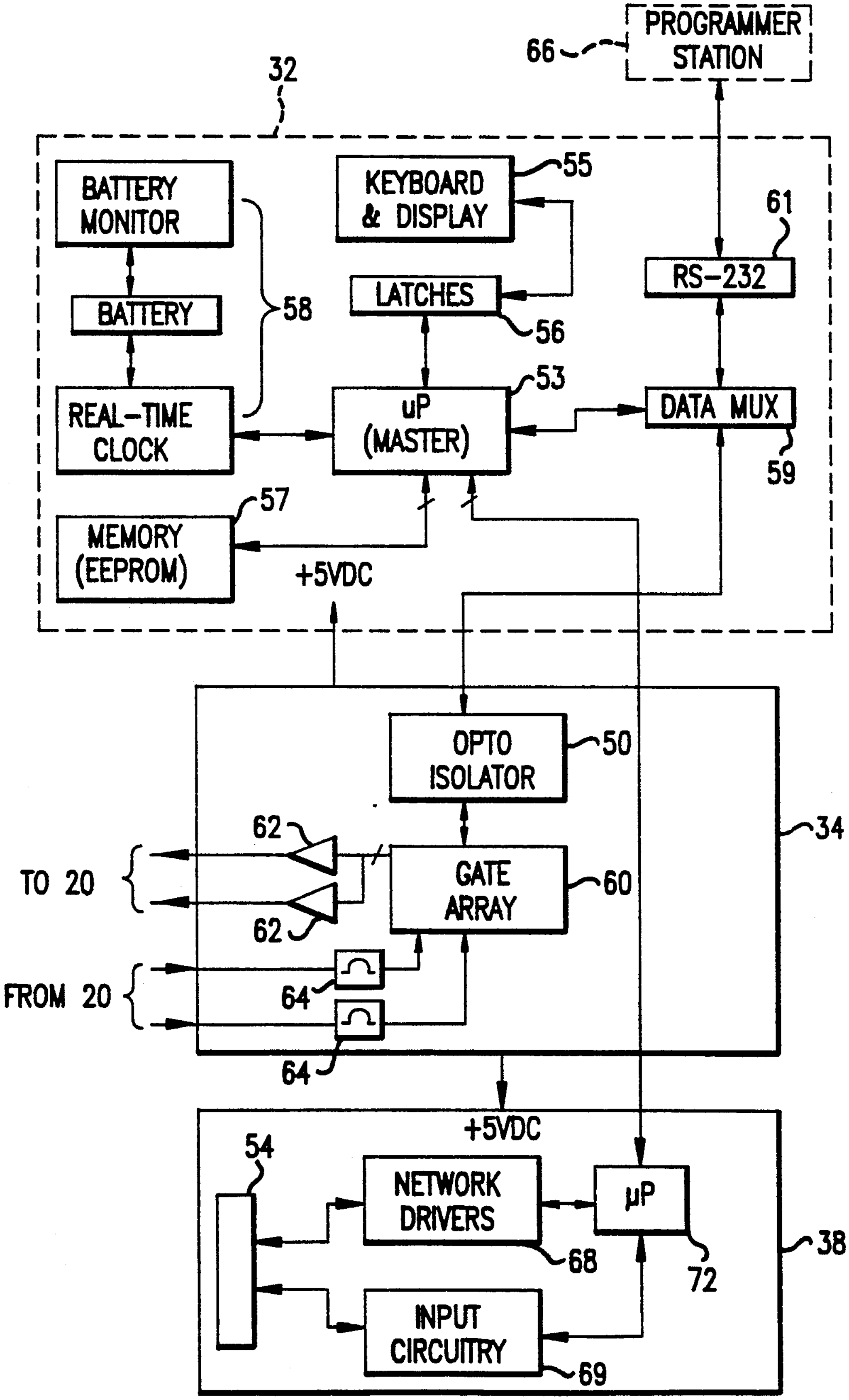
FIG. 4 is a more specific block diagram of the controller, the interface module and the termination board of FIG. 2.

In FIG. 4, an electrical block diagram of the controller 32, the interface driver board 34 and the termination board 38 is illustrated. The controller 32 includes a microcomputer 53, preferably an MC68HC05C4 (or C8) type available from Motorola, Inc., which communicates with a keyboard and display panel 55 through data latch circuitry 56. The user or operator is provided complete control over, and status of, the circuit breakers 20 through the keyboard and display panel 55.

The controller 32 also includes electrically alterable nonvolatile memory 57, which may be programmed by the user to contain specific information for operating each of the system's circuit breakers 20. Preferably, the memory 57 does not store the present state of the circuit breakers, since their state may be regularly accessed from the circuit breakers 20 themselves. However, a history of the circuit breaker activity may be recorded in the memory 57 for maintenance purposes.

In order to prevent memory endurance problems from limiting the life of the system, writes to the memory 57 are limited. Variable data is stored in the system RAM (internal to the microcomputer 53) as long as possible before any writes to the memory 57 are performed. Data is only written to the memory 57 at prescribed times during the programming mode of the controller 32. During the system run mode, data is not written to the memory 57 so as to prolong the life of the memory.

In order to prevent charge-drain off from the gates of the individual memory transistors (internal to the memory 57), the microcomputer 53 checks for valid data each time that the memory is read. Charge-drain off occurs to only one transistor at a time and is corrected by a single bit error code that determines the validity of the data in the memory. Normally, the data is valid and no further action with respect to the memory is required. However, if an error is detected, an algorithm is run to determine if the error is a charge drain-off error or a noise error. If it is an error due to noise, the correct data is read again from the memory and used. The erroneous bit will be corrected if the error is a hard error, and the corrected data will then be written to the memory. This is the only instance where the memory is written during the run mode rather than during the program mode.

Conventional circuitry 58 may be optionally provided to provide reliable, battery-backed real-time clock functions for the system. For example, this may be used to allow time-phased events to trigger certain ones of the circuit breakers 20.

The interface driver board 34 is shown as interfacing with the controller 32, through a data multiplexer 59, using an optical isolator 50 to maintain voltage isolation between the circuits and protect the circuits from power-line transients. The data multiplexer 59 also provides electronic programming capabilities from a programming computer or station 66 for accessing the controller functions. This is preferably accomplished using serial interface circuitry 61, e.g., for an RS-232 type protocol, between the data multiplexer 59 and the station 66. The interface driver board 34 and the controller 32 may be coupled in this manner using a serial protocol to reduce the number of pins required for communication therebetween.

The interface driver board 34 further includes a gate array 60 which couples the interface driver board 34 through amplifiers 62 to the motors of the remotely controlled circuit breakers 20 in order to significantly reduce the number of required driver transistors and PC board traces. When the interface driver circuitry is commanded to engage a breaker (i.e., open or close the breaker contacts), the gate array 60 essentially maps the address of the circuit breaker into a form which will turn on any two of a plurality of power output transistors associated with the gate array 60. Timers within the gate array 60 drive power transistors 62 external to the gate array 60 to control the circuit breaker motor engagement time and status read times. For example, a pair of power transistors may drive the circuit breaker motor in either of two directions for a controlled time period in order to turn the circuit breaker on or off by closing or opening the contacts. After the motor drive time period elapses, the status of the selected circuit breaker is automatically read after a specified settle time and is passed to the communications circuitry of the gate array 60. Only one circuit breaker can be switched at a time, and sets of breakers must be turned on or off sequentially.

Because of the limited physical space available for the power driver circuitry of the gate array 60, a minimum circuit breaker cycle time, i.e., the time period to complete the tasks and communications associated with a single command, is observed. This cycle time allows the power supply to sufficiently recharge the power supply storage capacitors (which may be located at the input of the −24 Volt regulator) to supply full voltage to the circuit breaker motors.

The status signals provided by the selected circuit breaker 20 are filtered by noise filters 64 before being provided to the gate array 60, which transmits the circuit breaker status to the controller 32 through the optical isolator 50.

In addition to controlling and monitoring the circuit breakers 20 from the keyboard and display panel 55, the circuit breakers 20 may be accessed using the microcomputer 53 of the controller through the termination board 38. For such communication with the controller 32, the termination board 38 includes a microcomputer 72 to communicate directly with the microcomputer 53. A significant advantage of this arrangement is that it allows a multitude of remote devices to control and monitor the circuit breakers in the same manner as with the keyboard and display panel 55.

The termination board 38 includes a communication or input terminal port 54 for remote device access to the controller 32. As previously indicated, such remote access may be provided by hard-wiring the devices to the input terminal port 54 with common, positive and negative leads at the respective terminals. A set of network drivers 68 may be used to provide the requisite network interface, and additional input circuitry 69 may be used to custom-program interface specifications.

The input circuitry 69 may include, for example, trinary DIP switches mounted to the termination board 38 which are utilized to program pulsed and maintained control modes of the plurality of inputs at terminal port 54. A single switch may be included for each of the plurality of input terminals 54. Each of the switches preferably have both pulsed and maintained labels to allow the system operator set the DIP switches according to whether the connected inputs are pulsed or maintained.

In one application, a pulsed input may refer to any of the plurality of input terminals at terminal port 5 which remains active for less than sixty seconds. Using this sixty second limitation, a maintained input then refers to an input signal which does not make two state transitions within a time period of less than sixty seconds, a transition being an input change between a pair of prescribed high and low voltage levels. The microcomputer 72 then uses the DIP switch setting to determine if an input is pulsed or maintained.

Common, positive and negative leads may be used to control either pulsed or maintained modes. For a maintained input, only two of the three terminals (common, positive and negative) are used and the DIP switch is set to its maintained position. The common terminal is always connected for any input. The positive terminal is connected to normally open contacts, the negative terminal is connected to normally closed contacts. If a closing contact is to cause an associated circuit breaker to switch, the two wires from the contacts connect between the positive and common terminals. If an opening contact is to cause a circuit breaker to switch, the wires connect between the negative and common terminals. If the DIP switch associated with a given input is set to the pulsed position, the input will be programmed to pulse mode operation. Two or three wires are connected to the terminals in the pulsed mode. When a positive terminal is connected, a closing contact causes each selected circuit breaker, or group of circuit breakers, to open or close according to the user program. When a negative terminal is connected, the closing contact causes each selected circuit breaker, or group of circuit breakers, to do the opposite of the positive terminal.

The pulsed mode is useful for normally open momentary wall switches used to override the automatic operation of the system. A first input is programmed to turn off a selected circuit breaker at a selected time. Next, a momentary, normally open two position wall switch is programmed to control the same circuit breaker using a second input. The system turns the selected circuit breaker on automatically when the contact of the first input is closed. The circuit breaker turns off when the contacts of the first input are open. The momentary switch of the second input may override the state of the contacts. If the switch is placed in the on position, the circuit breaker turns on regardless of the state of the contacts. Likewise, if the switch is pushed off, the associated circuit breaker would turn off regardless of the state of the contacts.

The contractor may optionally include a feature in the system while setting the input terminals wherein the system may autostep to used inputs while skipping unused inputs during programming. To enable this feature, the contractor sets the corresponding trinary DIP switch to the center position. When in program mode, the system looks for these shorts and does not display them on the front panel of the controller such that the user cannot program them. If this condition is not present, the system shows the inputs on its display during normal programming. The programmer may choose not to program these inputs thereby achieving the same result. If the condition is not present, the pulsed or maintained DIP switch settings are ignored.

The controller 32 initiates all communications to the gate array 60 by sending a two byte message which minimizes communications protocol errors. The first byte of the two transmitted bytes is equivalent for communications either to or from the interface driver board 34 or controller 32. A byte number is placed in the least significant bit position of all transmitted bytes to reduce the chance of unsynchronized messages. Accordingly, bit zero of the first byte always has a value of zero because it indicates the byte number. Bits one through four indicate the circuit breaker address and are the least significant bits of a particular circuit breaker address. Bits five through seven are check bits which are generated to check bits one through four. The format for the second byte of a message differs depending on whether it is sent from the interface driver board 34 or the controller 32. Messages sent from the controller 32 are command bytes. In the second command byte, bit zero is always one because it signifies byte two of the message. Bits one and two are the most significant two bits of the circuit breaker address. Bits five through seven are generated to check bits one through four. Bits three and four are encoded with four possible commands to the interface driver board 34. The controller commands are to read the motor, read the contact status, open a selected breaker or close a selected breaker. When the most significant bit of the command code is a zero, the interface driver board 34 only sends back a status. If the most significant of the two bits is a one, a switch command is sent to the interface driver board 34.

Messages sent from the interface driver board 34 are status bytes. The second byte of a status message may differ from the second byte of a command message in bit positions three and four. In a status byte, bit four is a status and bit three is always zero. These bits indicate the presence of a motor in the circuit breaker, the status of the contact, i.e., whether a selected breaker has been opened or closed.

If the interface driver board 34 detects an error in either byte one or byte two, no circuit breaker switching or status reading occurs. An all 1's error message is returned and the interface module is reset to wait for the first byte of the next command. The controller 32 then retransmits the previous message. Accordingly, if the controller 32 sends a read status message, the interface driver board 34 reads the circuit breaker status and returns the results to the controller 32. If the controller message is a switch command, the interface driver board 34 carries out the command by switching the breaker. It then reads and returns the contact status of the selected breaker. The interface module response to a read status message is the desired status of the contacts of the selected circuit breaker. The interface module response to a switch command is the actual status of the contact after the switch has occurred. The controller 32 uses the returned information to ascertain whether the selected circuit breaker has switched. If the returned status shows that the contacts are in the wrong state, the controller 32 may be programmed to attempt to correct the problem.

A seven bit cyclic hamming code detects errors in the most significant seven bits of a message byte. The byte number bit is excluded because there is no available hamming code which will detect seven bits with three check bits. The exclusion is insignificant since parity detects any odd bit error in any bit position. If a two bit error occurs in any message byte which includes bit zero, the hamming code will detect it because the other seven bits of the byte are checked by the code. If a controller command is retransmitted multiple times and an unexpected status is received from the gate array 60, the controller may be programmed to display the error and may then discontinue transmitting the command thereby assuming that the circuit breaker has failed.

As can be seen in FIG. 5*a*, the keyboard and display panel which is shown in FIG. 4 is preferably implemented as part of a flip-open housing which encloses the controller circuitry of FIG. 4, except for portions of the keyboard and display panel 55. The controller 32 comprises a system display which provides an interface to allow a user to program the system responses according to the programming provided at the input circuitry 69 of the termination board 38.

The system may operate in any of four modes: run, halt, manual or program. The run mode represents the normal operation of the system, including provision of the primary functions of controlling and displaying the status of the circuit breakers. When the system is first powered on or comes up after a power down, it may enter the run mode. In this mode, the controller 32 may drive the system display, scan the control buttons, and look for changes at the plurality of inputs.

The system regularly scans all of the circuit breaker status lines and displays the results on a plurality of LEDs 90. The LEDs 90, which indicate the open or closed status position of the circuit breakers 20 are conveniently arranged to correspond to the arrangement of the circuit breakers 20 as viewed from the front of the load center (as shown in FIG. 1*a*). When the system commands a circuit breaker to switch, the actual status of the circuit breaker will be displayed on a status indicator display 92. The status of all of the remotely controlled circuit breakers appears in the same configuration as the breakers are arranged in the load-center. The breaker statuses may be polled only periodically, rather than constantly, to avoid communications protocol traffic and reduce panel temperatures. Preferably, however, the breaker statuses are polled as fast as possible so as to provide immediate responses.

When the front cover 94 of the front panel 96 is closed, the status indicator 92, the breaker status button 98 and the breaker select button 100 are accessible to the user. While the enter button 102 is accessible to the user only when the front panel 96 is open, these buttons 98 and 100 allow a user to switch a selected circuit breaker and display the breaker status on the status indicator 92 while in the run mode. Instructions (not shown) may be affixed to the exterior of the front cover 94 to instruct the user as to operations for switching circuit breakers during the run mode.

The display will display the number of the last circuit breaker which the user programmed or manually switched. The status display 92 indicates whether that breaker is open, closed or unaffected by the switch. If the breaker statuses are polled only periodically, the breaker status indicator 92 is blank in order to limit the amount of power continuously dissipated in the circuit breaker status read circuitry. If the status LEDs 90 were on continuously, power would be dissipated in the opto-isolator drive circuitry raising the temperature inside the breaker to that which may exceed the opto-isolator specifications.

In order to manually open or close a selected circuit breaker, the user selects the desired circuit breaker by pressing the breaker select button 100 until the number of the desired circuit breaker appears in the breaker display 104. Each time that the breaker select button 100 is pressed, the system automatically scans for the next installed circuit breaker. The position of the circuit breaker that is found is displayed in the breaker display 104. The user continues to press the circuit breaker select button 100 until the number of the selected circuit breaker appears in the breaker display 104. The circuit breaker that is manually switched will remain in the desired state until another manual or automatic signal causes it to switch.

Alternatively, the status indicator display 92 and the breakers status button 98 may be replaced by status indicator lights and a breaker status button located on the front of the load-center dead front 70 next to each circuit breaker 20. When the system is in operation, the indicator light of each breaker is lit when the breaker is on, and is unlit when the breaker is off. When the programmer selects an input by using the input select button 106, the desired circuit breaker is selected by pressing the button next to that breaker.

When the front cover 94 is opened, additional buttons and display become accessible. The system mode is selected using the run mode button 108, the halt mode button 110, the manual mode button 112 or the program/review mode button 114. When the system first enters the run mode from either the halt or manual modes, it scans the terminals at input terminal port 54. Since pulsed inputs are lost in both the half and manual modes only the maintained inputs are available for scanning. As the inputs are scanned, the equations for all of the available circuit breakers are solved, and the breakers are switched accordingly. After this initial scan, the system reverts to normal run mode operation and scans both pulsed and maintained inputs. The system regularly scans the inputs and display buttons while driving the various display devices. There are no other controller actions until an input transition occurs, or a button is pressed.

If an input transition occurs, the microcomputer on the termination board will debounce and interpret the input. The microcomputer on the controller receives the interpretted input from the termination board and then switches the circuit breakers accordingly. Similarly, if a button on the front of the controller is pressed, the microcomputer on the controller will debounce, process, and act on the user input according to the function of the button. As the circuit breakers are switched, their actual status is displayed on the status indicator 92. Additionally, the last input which goes through a transition is displayed on the input display 116.

The system enters the halt mode when the halt mode button 110 is pressed by the user. The halt mode ignores the plurality of input terminals 54 and leaves the system in its present state. Once the halt mode is entered, the system remains there until the user presses another mode button. System status information is not stored while in the halt mode such that if a pulse occurs it will be missed. To exit the halt mode, the user presses any of the other three mode buttons. If the system is halted and either the manual or program/review button is pressed, the selected mode is entered with no further action from the controller 32. If however, the run mode is entered after the halt mode, the system will scan all programmed inputs and set the system circuit breaker 20 according to the values present on the maintained inputs. Pulsed inputs that occurred prior to entering the run mode are not acted upon.

The manual mode is entered by pressing the manual mode button 112. In the manual mode, the system sequentially switches all circuit breaker motors to their on state and then displays the current status on the status indicator 92. This action places the circuit breakers in a mode which emulates standard manual circuit breakers. While in this mode, the circuit breakers can only be controlled by the handles of the individual breakers because all inputs are ignored as in the halt mode. The manual mode differs from the halt mode in that it changes the state of the circuit breakers to their on position. When the system is in the manual mode and either the halt or program/review buttons are pressed, the system immediately enters the new mode without further action by the controller. If the run mode button is pressed, the system scans the maintained inputs and sets the affected breakers accordingly.

The program/review mode is one means by which the system may be programmed. This mode is used to enter, modify or review circuit breaker control programs. The user presses the program/review button 114 to enter the program/review mode. When this mode is entered, the system remains in the run mode from the standpoint of the system's reaction to input transitions. The system continues to process input transitions even if the user is programming the circuit breakers. Unlike the other operating modes, the program/review mode has an auto exit feature. If no button is pressed for a selected time period while the system is in the program/review mode, the system reverts to its previous mode.

Upon entering the program/review mode, the input channel to be programmed is displayed in the input display 116 and the circuit breaker to be programmed is displayed in the breaker display 104. The input display 116 and breaker display 104 are incremented or decremented by using the input select button 106 and breaker select button 100, respectively. As described above, the system automatically scans for the next installed selection as either of these buttons is pressed. If no circuit breakers are installed in the system, the system display is blank in order to prevent a never ending loop. When the + button of the respective buttons 106 or 100 is pressed, the inputs or breakers are scanned in ascending order and the next available input or breaker is displayed. Conversely, if the—button of the buttons 106 or 100 is pressed, the next available input or breaker is displayed after scanning the inputs or breakers in descending order. In program/review mode, the status indicator 92 will display how the circuit breaker on the breaker display 104 will respond to the input on the input display 116 rather than displaying the actual circuit breaker status. The input signal type is displayed on the signal display 118 as maintained or pulsed.

To aid the programmer in configuring the system, a technique is employed to ease understanding of the logical connections. The programmer completes a sentence for each input, wherein the sentence is "When input (number) detects a (pulse or maintained) signal, the breaker (number) (opens, closes or is unaffected)." This sentence is printed on the input and breaker display area of the display panel. The programmer simply enters the input number, signal type, breaker number and desired circuit breaker status and presses the enter button to program the system. No permanent program saving function occurs until the enter button is pressed. If enter is not pressed, the front panel button can be pressed without permanently changing the program. This method is used to review the program content.

An input which overrides all other inputs for a given circuit breaker may be programmed by the user as a pulse input. This input is defined as an override off and is represented on the display panel 55 by an open circuit breaker status light on the status indicator 92 while in program mode. An override off input opens a given circuit breaker regardless of the status of the other inputs. If a selected input is not programmed as an override off, it remains unprogrammed or is programmed as a normal input.

The circuit breakers 20 of FIG. 1*a* are numbered in two columns: circuit breakers in the left column start at one and are odd numbered, and circuit breakers in the right column start at two and are even numbered. The LEDs 90 are preferably arranged and numbered in the display of FIG. 5*a* to correspond physically to the arrangement of the circuit breakers 20 of FIG. 1*a*.

An example may be helpful to explain the convenient manner in which the display of FIG. 5*a* may be programmed and monitored to control the circuit breakers 20 of FIG. 1*a*. In this example, a user is to program a three pole circuit breaker occupying circuit breaker positions numbered 7, 9 and 11 and a single pole breaker in circuit breaker position 16 to be in the same states at the same time. Assume that inputs A, B and C are connected to terminals 1, 2 and 3 (of the eight input terminals of the termination board 38) respectively, and the override off input is connected to terminal 12. Inputs A, B and C will be normally open maintained contacts. An override off will be a pulsed input. The first three terminals have one contact wire connected to its positive terminal, and one wire connected to its common terminal. The DIP switches associated with inputs 1, 2 and 3 are set to the positions corresponding to the maintain mode. The override off input wires are connected to the positive and common terminals and the DIP switch is set to its pulsed position. The motor pole of the three pole breaker is in the center and is in circuit breaker position number 9, and the single pole breaker motor will be in circuit breaker position number 16.

Proceeding from left to right on the front display panel, input 1 is selected by pressing the input select + button until a 01 appears in the input display. Next, the user selects the desired circuit breaker by pressing the breaker select + button until a 09 appears in the breaker display 104. Each time the + button is pressed, the system automatically searches for the next breaker motor. This method eliminates the possibility of a user programming an unused circuit breaker position since empty circuit breaker positions do not appear in the display. When the 09 appears in the breaker display 104, the status appears on the status display and MAINTAIN appears on the signal display signifying that the input is maintained. An appearance of a maintained signal is to cause a circuit breaker to close; therefore, the breaker status button 98 will be pressed until the LED next to "CLOSES" is lit and the CLOSE LED associated with breaker in position 9 in the open/close LED array also lights. While in this programming mode, all LEDs associated with the circuit breakers to be controlled by the displayed input will light as either an open or close.

At this point, the programmer can press any of the buttons without danger of changing any of the programming. If the operator presses the halt mode button, the system will enter the halt mode without changing anything. If the operator fails to press a button for a given controlled time, the system will revert to its previous state automatically. However, if the enter button is pressed, the information on the current display will be permanently stored in memory. The status display will momentarily flash to signify that the breaker is now permanently programmed.

After breaker 9 is programmed using input 1, breaker 16 is programmed by pressing the breaker select button until a 16 appears in the breaker display. When the 16 appears in the breaker display, the current breaker program appears in the status display and MAINTAIN appears signifying that the input is maintained. The breaker select button is pressed until the LED next to "CLOSES" lights. After the enter button is pressed, the input display will display a 01. The breaker display will contain a 16, and the status display close lights will be on in the 9 and 16 positions. Note that while in program/review mode the status indicator display displays the affect that one input has on all of the breakers. After programming all breakers associated with a given input, the next input is selected by pressing the input + button once so that a 02 appears in the input display. The breaker and breaker status are selected as described above. The same procedure is followed for input 3.

Now that the three inputs A, B, and C are programmed, the override off input is programmed to complete the programming operation. The input + button is pressed until a 12 appear in the input display and the pulse light appears on the signal display to signify that the input is a pulse. The breaker number is then selected as described above. Programming proceeds as described above except that status open is selected instead of status closed. When the enter button is pressed, the status indicator display shows a closed light under circuit breakers at positions 9 and 16 to signify that the input and breakers are programmed. Note that the override off input will override any of the other inputs regardless of their states to open the circuit breakers at positions 9 and 16.

Figure 5B:
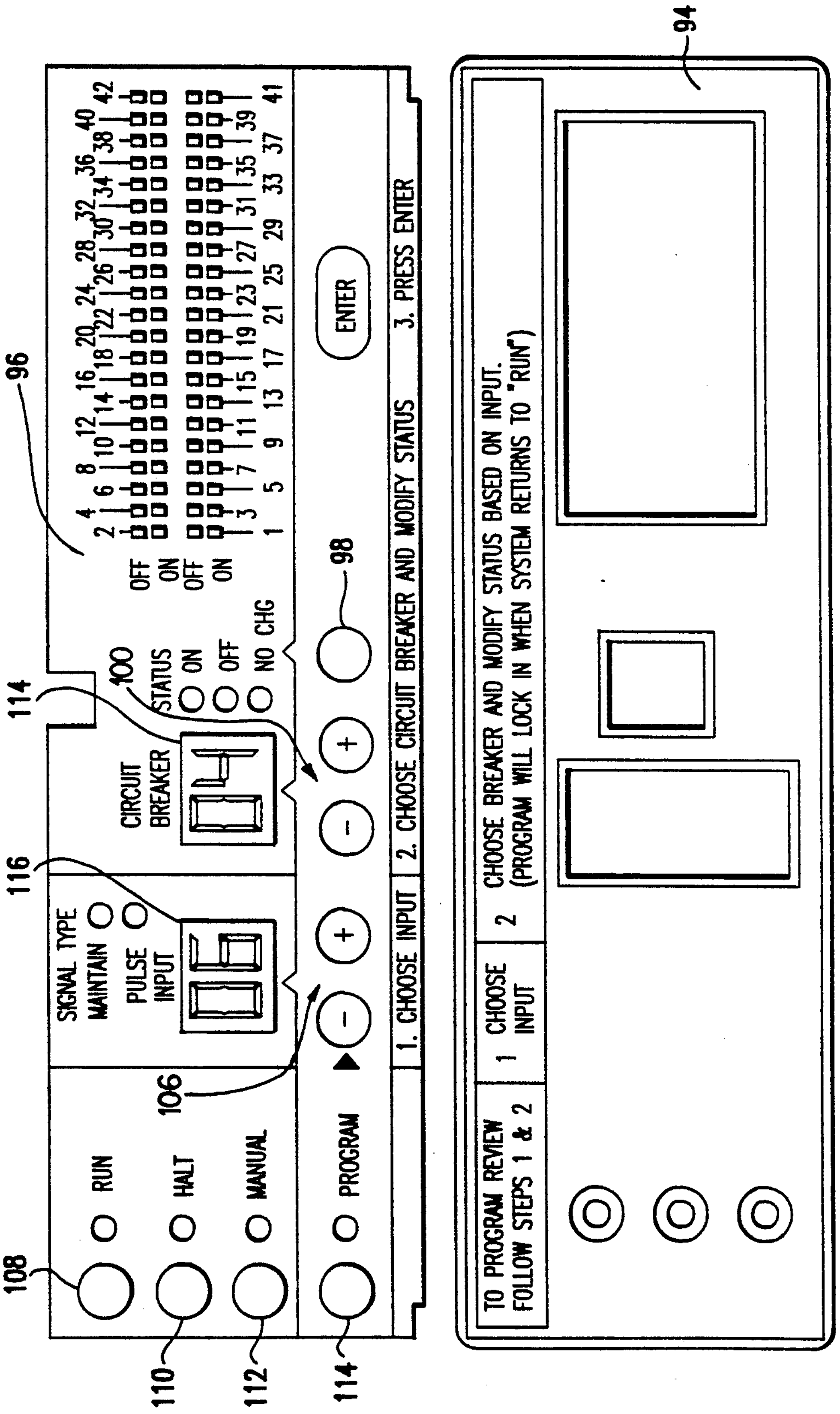
FIG. 5*b* is a perspective view of an alternate display for the controller shown in FIGS. 1-4.

An alternative display embodiment of the present invention is illustrated in FIG. 5*b*. In this embodiment, a three-step programming configuration is used in place of the sentence-programming configuration discussed above in connection with the embodiment of FIG. 5*a*. In terms of function, this display embodiment is the same as the display shown FIG. 5*a*; thus, the reference numerals depicting the various components in FIG. 5*a* are used to depict the corresponding components in FIG. 5*b*.

The primary difference between the respective embodiments of FIGS. 5*a* and 5*b* is that the enter or "LOCK-IN" button of FIG. 5*a* is replaced by the "enter" buttom in FIG. 5*b*. Rather, the display of FIG. 5*b* locks in the programmed inputs when the system returns to the RUN mode via button 108.

As a controller circuit option, unauthorized access to the programming function of the controller 32 may be prevented using a key card mechanism 103 (FIG. 5*a*) to lock out the programming function. The key card 103 comprises a small durable card having a pattern of holes wherein the card is designed to be placed into a card slot 105 in the front of the controller 32. An LED/-photo detector combination located within the controller 32 detects the presence of the key and determines the particular function from the key card pattern. The key card allows access to particular modes of operation thereby providing security for the system. An exemplary key card mechanism is described in U.S. Pat. No. 4,489,359, incorporated herein by reference.

Figure 6:
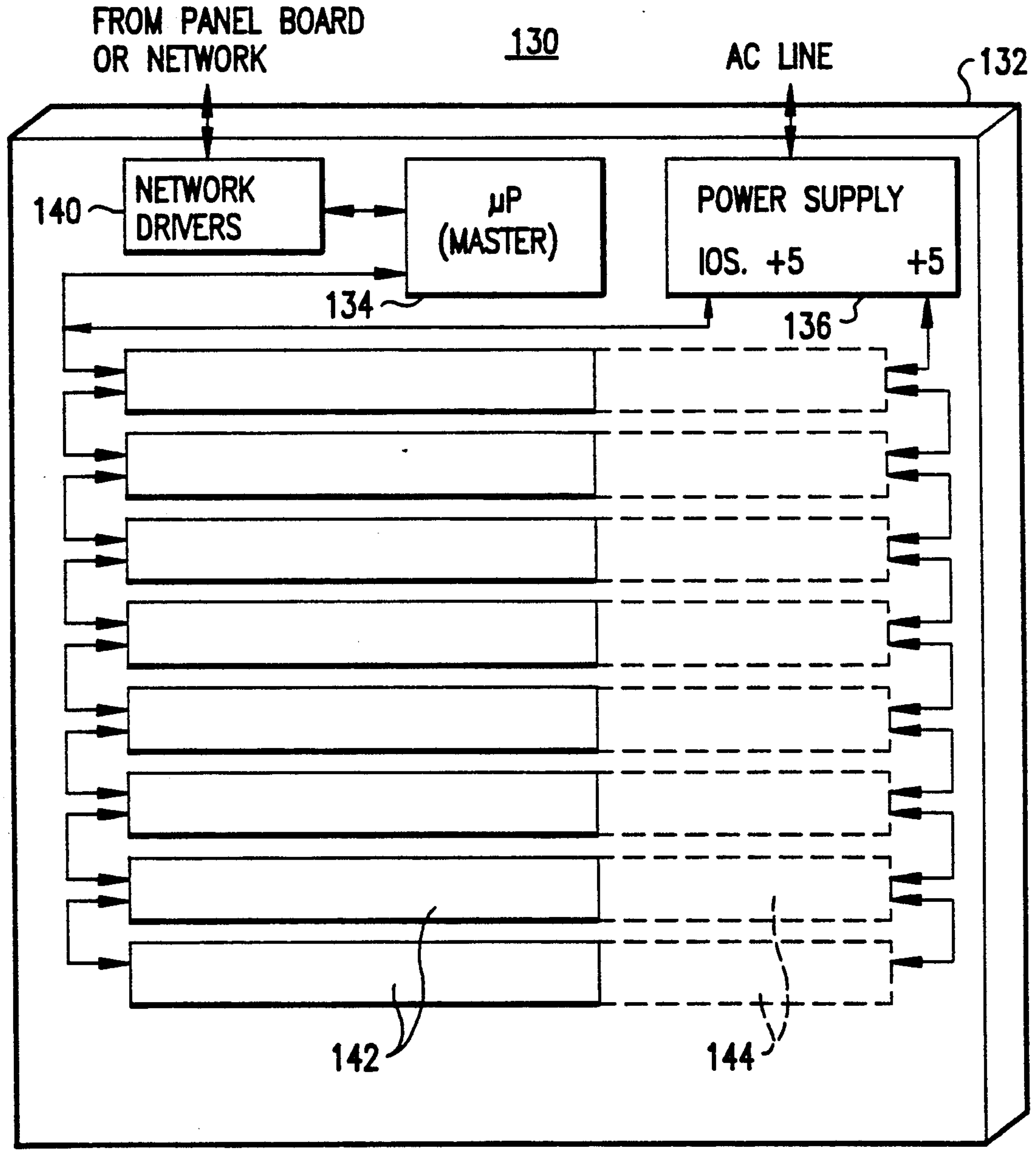

FIG. 6 illustrates an expander panel 130 which may be optionally coupled to one or more load centers, such as the load center 10 shown in FIG. 1*a*, to provide a number of communication-related features to the load center shown in FIG. 1*a*. The expander panel 130 is enclosed in a housing 132 and may include a microcomputer 134 for controlling communication with the load centers. A power supply 136, fed by a conventional AC line, may be used to provide power to the circuits contained within the housing 132, and a network driver circuit 140 may be used to interface the microcomputer 134 with a communication network or protocol required for communication with the load centers.

By employing one or more terminal ports 142 within the housing 132, external devices may be electrically coupled to the microcomputer 134 for additional kinds of remote control and monitoring of the circuit breakers, their associated current paths and other equipment associated with the controller. Ideally, the microcomputer 134 communicates through the network driver circuit 140 of FIG. 6 to the controller 32, via the network drivers 68 of the termination board 38 (FIG. 4). LAN or other types of conventional communication protocols may be used to implement this kind of interface, as previously discussed.

The expander panel 130 may also include one or more option cards (or circuits) 144 for providing customized functions. In a preferred embodiment, one of the option cards 144 is a telephone interface circuit, which is designed using conventional techniques to provide access to the controller 32 (FIG. 4) through standard telephone lines. Other option cards 144 may include, for example, an input expander card for allowing additional devices to be coupled into the system, an isolated RS232 computer interface, data logging memory with battery back-up, data logging printer interfaces, telephone network access card, telephone modem cards, wireless (FM) communication links and fiber optic repeater cards. The functions described in the expander panel may be built and installed as separate functional elements.

The expander panel, which has plug-in modularity, may be used to provide a number of network-communication type features. Although multiple load center (such as 10 of FIG. 1*a*) may be networked without the expander panel, FIG. 7 exemplifies an application in which a plurality of load centers may be connected in a LAN by networking the load-centers 10 with one of the expander panels 130 of FIG. 6. This kind of arrangement can provide significant maintenance-related savings when used in an industrial-type application.

Figure 8:
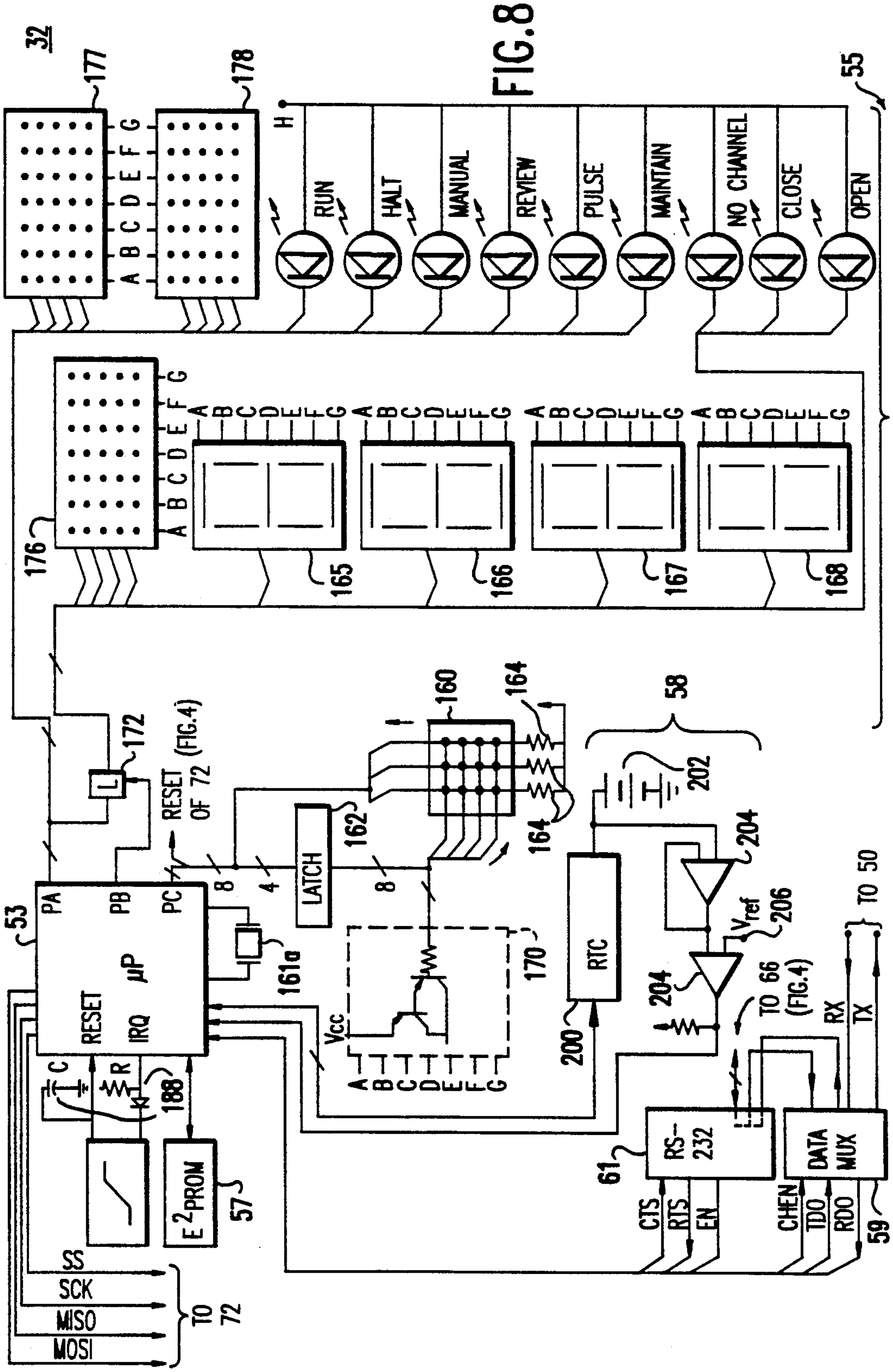
FIG. 8 is a schematic diagram of the controller shown in FIGS. 1-4.

Turning now to the schematic diagram of FIG. 8, the controller 32 (from FIG. 4) is shown with the keyboard and display 55 (FIG. 4), the real-time clock circuitry 58, the data multiplexer 59 and the RS-232 interface circuitry in detail. The keyboard and display 55 includes a 10-key membrane keypad 160 which is regularly scanned using a four-by-three switch matrix. To determine which, if any, of the membrane keys have been depressed, the microcomputer 53 latches logic "0"s from each of four bits from the microcomputer's C port into a latch 162, and it polls three bits from the same port to determine if any of the three bits are shorted to one of the latched four bits by the depression of the associated membrane switch. Pull-up resistors 164 bias the three polled bits so that a logic "1" is read at each polled bit if the associated four switches are not depressed.

The latch 162 and the microcomputer's C port are used in combination with the microcomputer's A port to control all of displays on the controller 32, including four 7-segment LED package displays 165–168. As discussed in connection with the breaker display 104 and input display 116 of FIG. 5*a*, the displays 165–168 are used to identify for the user or operator the particular input (at the termination block 38) and circuit breakers being addressed by the keypad. A network of eight Darlington transistors 170 is coupled to the output of the latch 162 to provide the proper drive level for display matrix for which the outputs (A-H) of the transistors 70 drive the row side of the matrix. The column side of the display matrix is driven by 8 bits which are provided directly from the A port of the microcomputer 53 and 8 bits which are provided indirectly from the A port, via latch 172, to enable each LED of the displays. Because the display does not require being display-refreshed more than 40 times per second, the microcomputer 53 is able to use its C port to monitor the keypad 160 and control the displays 165–168 without conflict.

The microcomputer 53 employs the latch 172 at the output of its A port to control stand-alone NO CHANGE, CLOSE and OPEN LEDs and four columns of a 7-by-5 dot matrix display 176, The A port of the microcomputer 53 directly controls stand-alone RUN, HALT, MANUAL, REVIEW, PULSE AND MAINTAIN LEDs and four columns each of 7-by-5 dot matrix displays 177 and 178. The displays 176–178 are used to indicate the contact positions of the 42 circuit breakers represented by the status indicator display 92 of FIG. 5*a*. The three displays 176–178 are configured so that only four columns of each are used; thereby providing 28 LEDs on each part so that the 84 required displays (two per circuit breaker) are accommodated.

A variety of staple components may be used to implement the circuit illustrated in FIG, 8. For example, the latch 162 may be implemented using a 3–8 74HC137 encoder-type IC, while the latch 172 may be implemented using a 74HC373-type IC. The displays 165–168 may be implemented using a HDSP7503-type part, and the displays 176–178 may be implemented using a HDSP4701-type part. The RUN LED is preferably implemented using a green HLMP-1790 part, and all other stand-alone LEDs are preferably implemented using a red HLMP-1700 part. Each LED type is available from Hewlett Packard Co.

Conventionally, displays are controlled by sequentially turning on one digit or display group at a time, but repetitiously and sufficiently rapid so that all devices appear to be on simultaneously. The requisite driving current (or power) for such conventional displays is proportional to the number of segments that are turned on in each display device. Accordingly, as each display is sequentially switched, the amount of current drawn from the power supply can vary significantly. For example, no current flows if all segments are off, while the maximum current flows if all segments are on. The power supply in such conventional displays must, therefore, be able to supply the peak value of the current, even if the average value is much less.

The display design of the present invention provides a significant improvement over this deficiency of the prior art. The display on the controller 32 is preferably designed and controlled to provide a significant reduction of peak power usage. This design multiplexes the display elements by grouping segments together from different displays, rather than treating each display as a group. If the variation from minimum to maximum is kept as small as possible, the peak value of current is reduced, allowing a smaller and lower cost power supply to be used.

In accordance with the display design described above, attached hereto is an Appendix A which illustrates a table for controlling the LEDs of the display.

The table includes 128 status entries defined by 16 rows and 8 columns. The entries are grouped to multiplex the display elements by grouping LED segments together from different displays to lessen power usage as described above. Preferably, two pairs of rows at a time are read by the microcomputer and written out the parallel buses to update the status of each corresponding LED. For example, the first row includes: two bits to designate the proper status of circuit breaker 16—one bit is for its OPEN LED and the second bit is for its CLOSED LED; two bits to designate the proper status of circuit breaker 15—one bit is for its OPEN LED and the second bit is for its CLOSED LED; etc. The OPEN and CLOSED LEDs are either both off or one of them is on; therefore, only three of the four states provided by each pair of circuit breaker status entries are used.

The second row of the table includes: a bit to designate the proper status of segment A of the 7-segment display 4 (D4Sa) (display 4, e.g., corresponds to display 168 of FIG. 8); a bit to designate the proper status of segment A of display 3 (D3Sa); . . . ; two bits to designate the proper status of circuit breaker 30—one bit is for its OPEN LED and the second bit is for its CLOSED LED; etc. The bottom two rows of the table include the proper status of the labeled LEDs on the display, such as Maintain, Pulse, Review, etc. Since all segments in these groups will never by on, arranging the devices in this manner results in a lower peak current for the worst-case condition.

Also within the Appendix A and below the table is a program written in MC68HC05 assembly language code which may be used as a basis for controlling the display using the table of Appendix A in the above described manner, and with the microcomputer updating the LEDs at about 40 Hertz.

Certain ones of the C port peripheral bits may be used to program and read the EEPROM 57, which may be implemented using an X24C16 type IC and to reset the microcomputer 72 of the termination board when necessary. Also, a reset IC 174, such as an MC34164 IC, along with conventional RC timing circuitry may be used to reset and interrupt the microcomputer 53 upon power-up and when power decays during power down or due to other low voltage occurrences.

The real-time clock circuitry 58 is optional to the remaining circuitry of the controller 32 and may be used to provide time-based circuit breaker control functions. For example, the microcomputer 53 and the real-time clock circuitry 58 may be programmed by the programmer station 66 (FIG. 4) so that the real-time clock is polled by, or interrupts, the microcomputer at one or more prescribed periods to inform the microcomputer 53 that it is time to open or close a current path associated with a certain circuit breaker. In response to this type of prompt, the microcomputer 53 commands the designated circuit breaker to open or close its associated current path, provided that a command of a higher priority for the same circuit breaker was not received by the microcomputer 5 before the prompt occurred.

Commands of various priorities which may be received by the microcomputer 53 for the same circuit breaker, in addition to the aforementioned programmed prompt from the real-time clock, include a variety of commands sent through the termination board 38 (FIG. 4), commands received from the programmer station 66 (FIG. 4) and commands received from the keyboard and display 55 (FIG. 4). It is preferred that the order of priority for conflicting commands is that: commands received from the keyboard and display 55 are treated as the most important due to servicing requirements; commands received from the programmer station 66 are treated as the second most important since servicing may also be performed from the programmer station 66; commands sent through the termination board 38 are treated as the next most important; and commands prompted by the real-time clock are treated as the least important since they are likely to be representative of a previously desired mode and, therefore, requiring an override via one of the higher priority command paths.

The real-time clock circuitry 58 is preferably implemented using a 3.0 Volt Lithium battery 202 to backup an MC68HC68T1-type real-time clock IC (integrated circuit) 200. A pair of LM393A-type amplifiers 204 may be used to monitor the battery 202 by comparing the voltage level of the battery 202 to a stable reference voltage level (Vref), e.g., about 2.3 Volts, at lead 206. For additional information concerning the implementation of the real-time clock circuitry 58, reference may be made to the data sheets and application notes for the MC68HC68T1 IC, available from Motorola, Inc.

The data multiplexer 59 is used by the microcomputer 53 to route data to and from both the programmer station 66 and the gate array 60 of the interface driver board 34. Data is passed to and from the programmer station 66 using a conventional RS-232 interface circuit 61, e.g., using a LT1180-type IC, while the data passed to and from the gate array 60 is processed using an asynchronous, serial-data protocol. As depicted in FIG. 8, data is passed to and from the microcomputer 53 via its RDO and TDO ports through the data multiplexer 59, which is preferably implemented using a 74HC4052-type IC. A peripheral bit on the microcomputer 53, depicted as CHEN, is used to select (or "enable") one of two channels through the data multiplexer 59. The first channel couples the TDO and RDO ports of the microcomputer 53 with comparable ports of the gate array 60 of the termination board 38, and the second channel couples the TDO and RDO ports with the transmit and receive ports of the RS-232 interface circuit 61. Another peripheral bit on the microcomputer 53, depicted as EN, is used to enable the RS-232 interface circuit 61 so that its CTS and RTS signals are inactive when the RS-232 interface circuit 61 is not being used.

The microcomputer 53 communicates with the microcomputer 72, with the former acting as the master and the latter acting as the slave and with each microcomputer 53 and 72 employing a conventional crystal oscillator circuit 161*a* or 161*b* which drives the respective microcomputer at 3.6864 Mega-Hertz. Three of the bits from the D port of the microcomputer 53 may be respectively employed as the data transmit, data receive and synchronous clock paths for communication with the microcomputer 72 of the termination board. For example, using the MC68HC05-type microcomputers to implement the microcomputers 53 and 72, the MISO (master-in-slave-out), MOSI (master-out-slave-in), SCK (synchronous clock) and SS (slave select) microcomputer pin-outs (FIGS. 8 and 11*a*) provide an adequate interface. The protocol preferably includes error detection and error correction schemes to prevent erroneous messages from causing the interface driver board 34 to execute an incorrect command. For example, if an erroneous message is received by the interface driver board 34, the protocol detects the error and corrects it in a subsequent message from the controller.

Figure 9A:
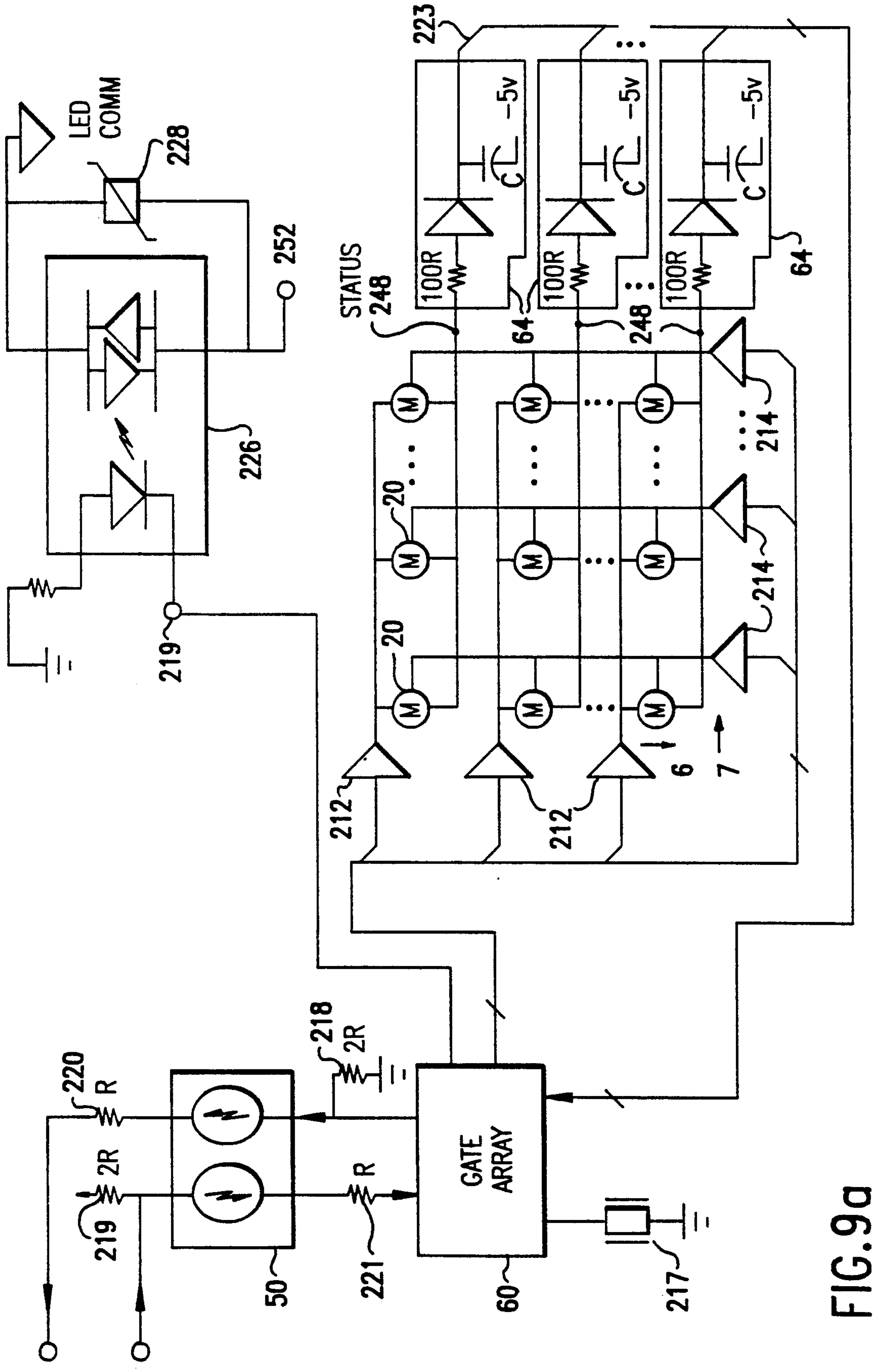
FIGS. 9a-9c comprise a schematic diagram of the interface driver board shown in FIG. 4.
Figure 9B:
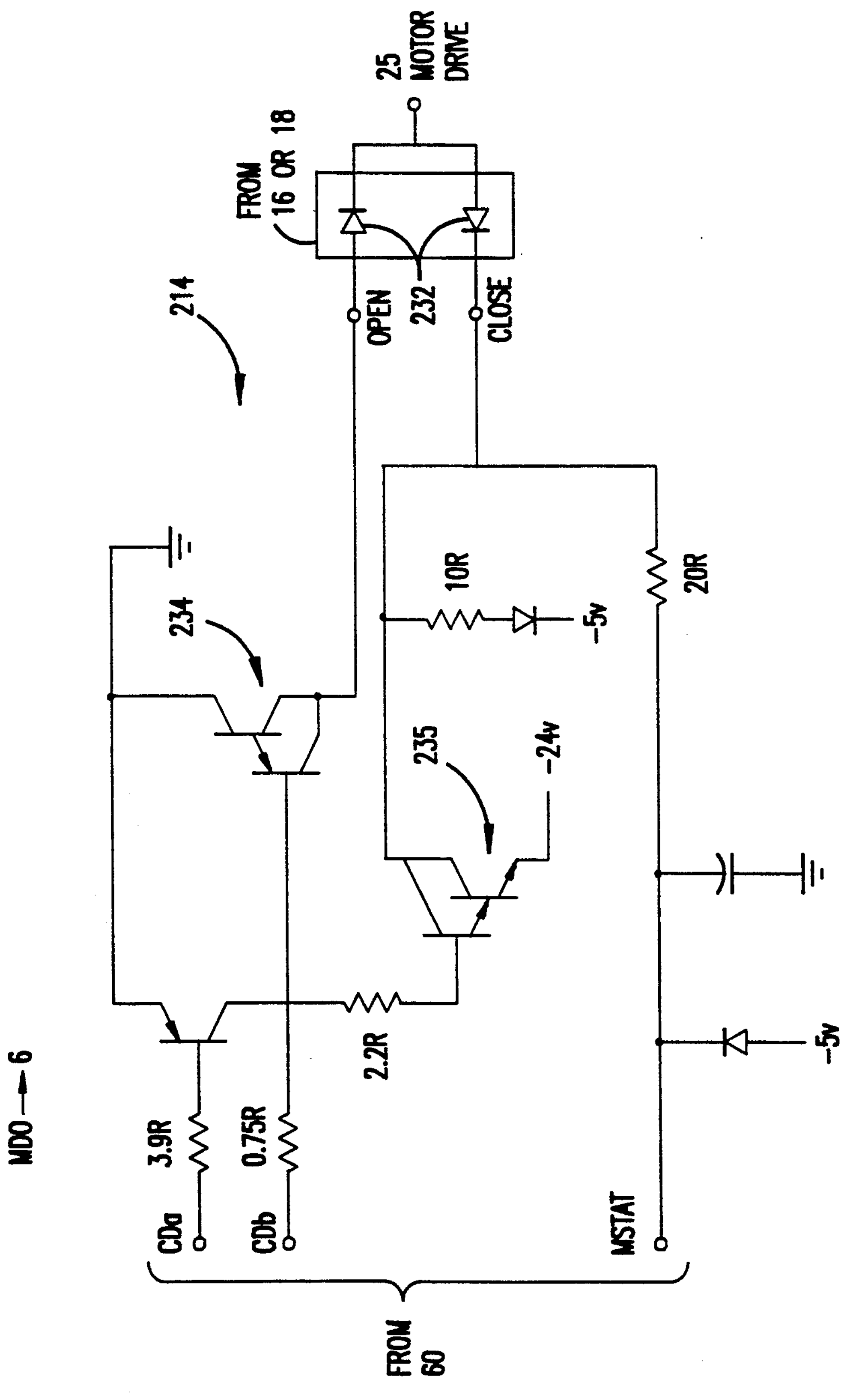
Figure 9C:
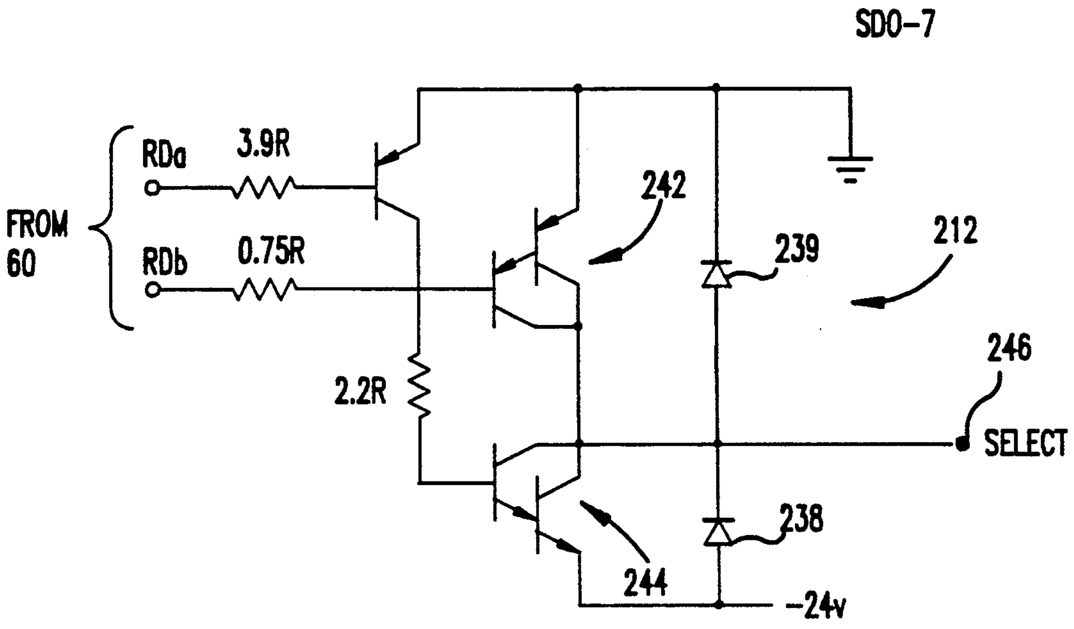

FIGS. 9*a*–9*c* illustrate the interface driver board 34 of FIG. 4 schematically. The optical isolator 50, the gate array 60 and the status filters 64 are depicted as in FIG. 4. However, the representative amplifiers 62 from FIG. 4 are shown as circuit breaker row drivers 212 and circuit breaker column drivers 214. The other elements shown will be introduced and discussed in turn.

The interface driver board also includes a conventional oscillation circuit 217 which is used to provide the appropriate clock (e.g., a 455 kHz clock) for the gate array. For further information regarding the gate array 60, reference may be made to the data sheets published and made available by ACTEL, Inc. of Sunnyvale, Calif.

The optical isolator 50 is preferably implemented using two NEC2501-1 type parts with resistors 218-221 (R=1k Ohm in FIGS. 9*a*–9*d*) providing the appropriate bias at the inputs and outputs of the optical isolator 50.

The circuit breaker row and column drivers 212 and 214 are configured seven down and six across, respectively, for controlling the motors of the forty-two circuit breakers 20 of FIG. 1*a*. Each row driver 212 is used to select (or enable) the circuits of six circuit breakers, while each column driver 214 is used to actuate the circuit breaker motor which is selected by the intersecting row driver 212.

Each status filter 64, which is used to report whether the contacts of the circuit breaker are open or closed, are operative when two conditions are present: the corresponding column driver 214 must select the column of circuit breakers in which the status filter 64 is associated; and the gate array 60 must actuate a triac circuit (e.g., a Siemens IL420) to provide, simultaneously, a momentary common path (LED COMM on the bus boards 16 and 18) for the input ports of the optical isolators 230 (FIG. 9*d*) of all forty-two of the circuit breakers 20. The gate array 60 then reads all six statuses and determines which of these statuses are to be sent to the controller 32. The circuit breaker contacts are preferably monitored using a lead 231 (FIG. 9*d*) connected to the load terminal of the circuit breaker 20.

A varistor 228, such as a GE-V30DLA2, is coupled across the output ports of the triac circuit 226 to provide circuit protection against voltage and current transients.

In FIG. 9*b*, the column driver 214 is shown as being controlled by the gate array 60 using CDa, CDb and MSTAT leads so as to drive the motor on the selected circuit breaker 20. The diodes 232 through which the motor drive signal passes are located on the bus board 16 or 18 to allow a current path through only one circuit breaker 20. The CDa and CDb signals from the gate array 60 are controlled in a polarized manner between −5 Volts and common so that if either signal is absent, the designated circuit breaker 20 cannot be commanded to open or close its contacts.

The MSTAT signal is used to indicate whether or not a motor is present. This type of status check operates in substantially the same manner as the statuses from the associated circuit breaker load, as described above. The MSTAT signal is operative when the corresponding column driver 214 selects the column of circuit breakers associated with the circuit breaker under test. The gate array 60 then reads all six MSTAT signals and determines which of these signals are to be sent to the controller 32.

In FIG. 9*c*, the row driver 212 is shown as being controlled by the gate array 60 using RDa and RDb leads so as to select the appropriate row of circuit breakers 20. The diodes 238 and 239 are used to mitigate the effect of transient signals received from the bus boards 16 and 18.

Figure 9D:
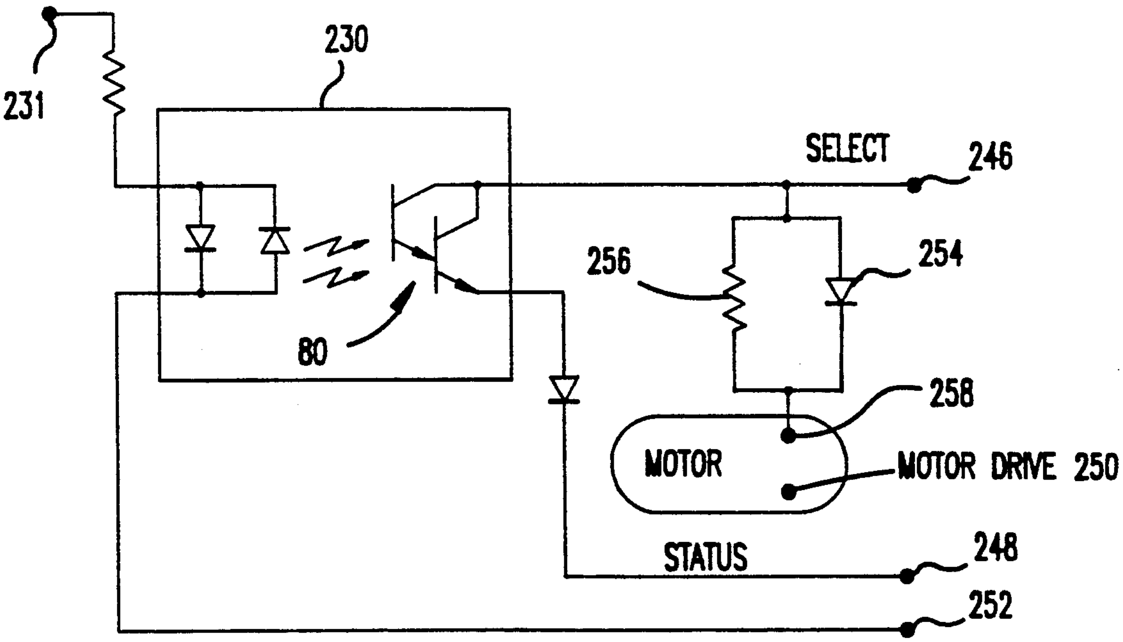

FIG. 9*d*, which illustrates the electrical control portion of the preferred remote control circuit breaker 20, depicts four leads carried by each plug-in connector 22 of the bus boards 16 and 18. They include: the select lead 246, status lead 248, motor drive lead 250 and an isolator enable lead 252; the signals of each lead performing the previously described functions.

A parallel resistor/diode arrangement 254/256 serves two functions. The diode 254 may be used to provide current flow in a unilateral direction, while the resistor 256 is used to control the power provided from lead 258 to the motor of the circuit breaker 20. The value of the resistor 256 is selected according to the necessary current specified to operate the motor. In the event that the lead 258 is used to control a plurality of poles, e.g., for controlling two or three circuit breaker poles, the resistance required will vary. For single pole operation by the FK130S-10300 Mabuchi motor exemplified in the above referenced copending application, the value of the resistor 256 is preferably 12 Ohms.

Figure 9E:
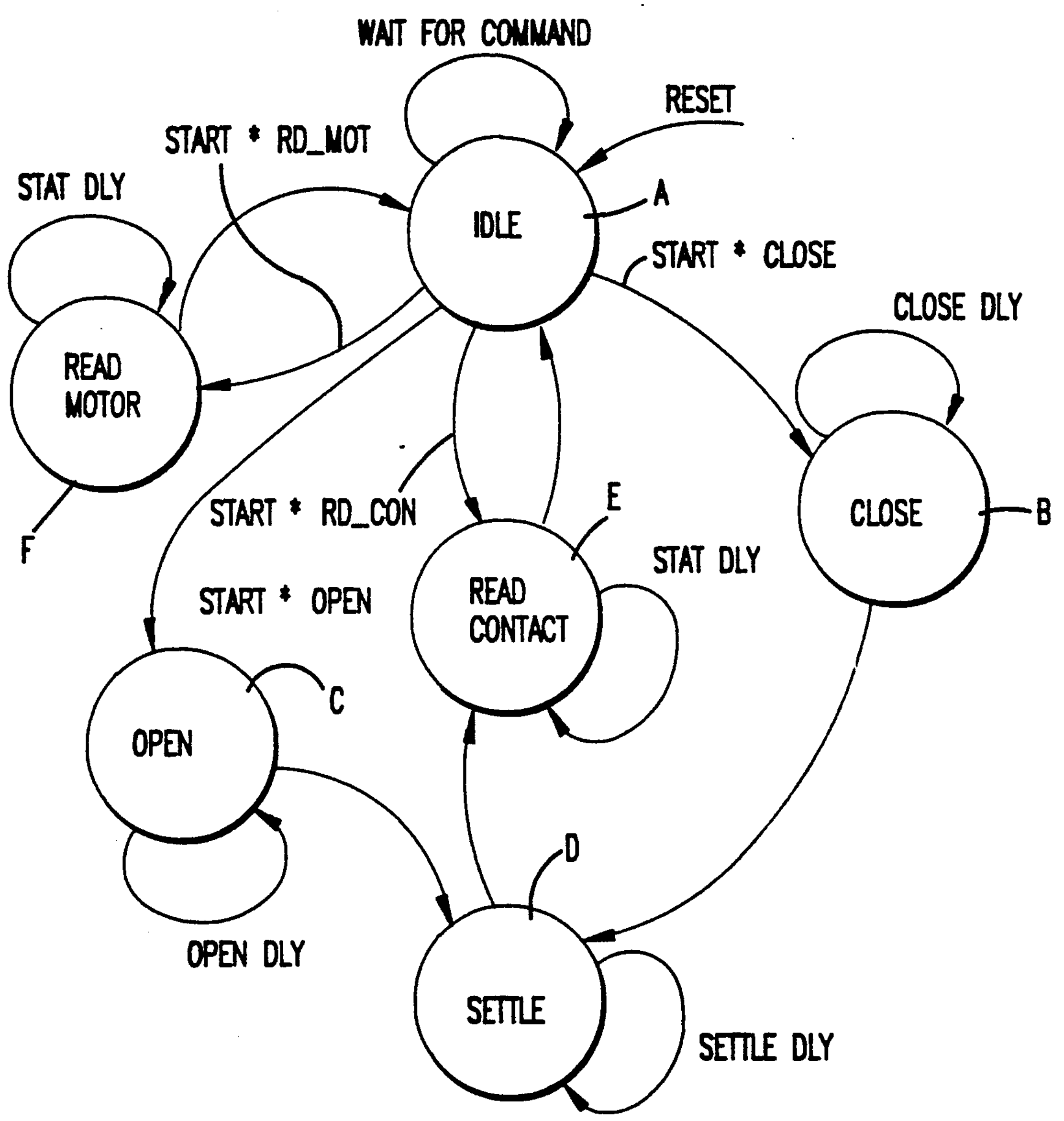

FIG. 9*e* is a state diagram which depicts the power driver operation of the gate array illustrated in FIG. 9*a*. The diagram includes six states, depicted A-F. Beginning at state A, the gate array waits for a command from the controller. The command may be one of four commands: a close contacts command which instructs a particular circuit breaker to close its contacts, depicted by the sequence of states A-B-D-E-A; an open contacts command which instructs a particular circuit breaker to open its contacts, depicted by the sequence of states A-C-D-E-A; a read contacts command to determine if a particular circuit breaker's contacts are closed or open, depicted by the sequence of states A-E-A; and a read motor command to determine if the motor is present, depicted by the sequence of states A-F-A. The state delay associated with state D is to allow the contacts sufficient time to settle before reading the status of the contacts at state E. The state delays associated with states B and C are to allow the contacts sufficient time to react before commencing the settling-time delay of state D. The state delays associated with states E and F are to provide the gate array with the appropriate timing response before reporting to the controller with the requested status.

Figure 9F:
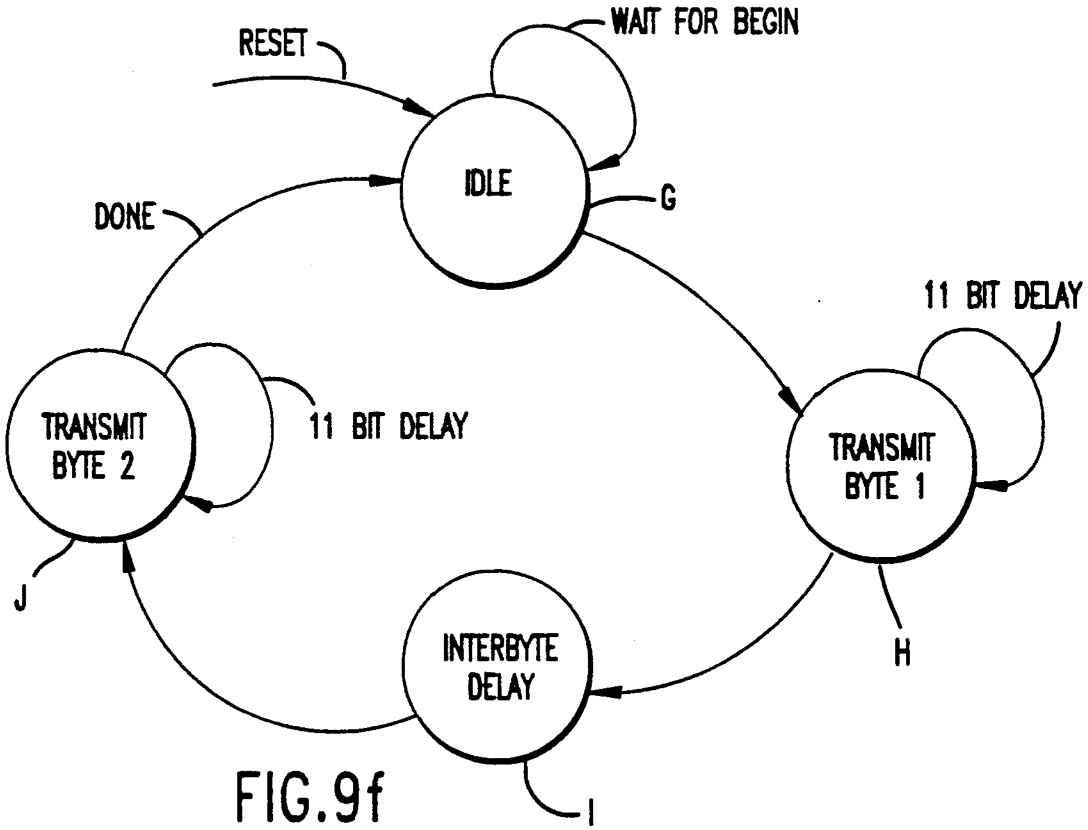

FIG. 9*f* depicts the message transmit operation of the gate array illustrated in FIG. 9*a* in state diagram form. The diagram includes four states, depicted G-J. Beginning at state G, the gate array waits for flow from states E and F for transmitting a contact status or motor status response. Once received, flow proceeds to block H where the first of the two bytes is transmitted. Since each byte consists of a start bit, 8 data bits, a stop bit and a parity bit, an 11 bit delay is illustrated. From state H, flow proceeds to state I where the gate array waits for prescribed interbyte delay before moving to state J. At state J, the second of the two bytes is transmitted, and, after the 11 bit delay, the transmission is complete.

Figure 9G:
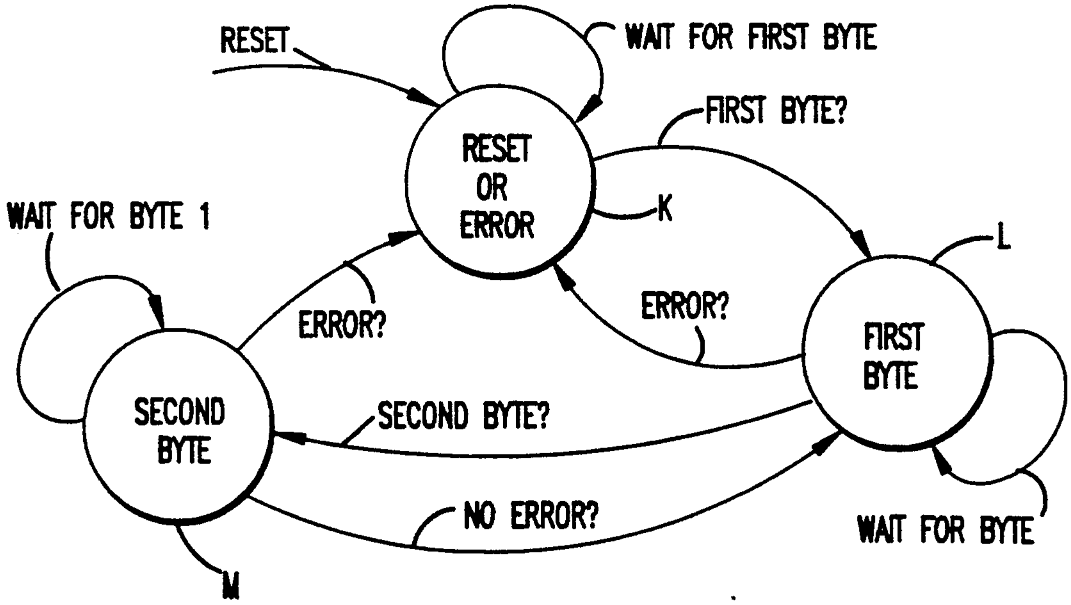

FIG. 9*g* depicts the message receive operation of the gate array illustrated in FIG. 9*a* in state diagram form. The diagram includes states K, L and M. Beginning at state K, the gate array is reset and flow proceeds to state L to wait for reception of the first byte of the two-byte message from the controller. If the first byte is received with an error, flow returns to state K for corrective action (e.g., a reset and a communication to the controller that an error occurred). Once the first byte is received, flow proceeds to state M where the gate array waits for the second of the two bytes. Once the second byte is received, the gate array determines whether or not the second byte was received with an error. If the second byte is received with an error, flow returns to state K once again for corrective action. Otherwise, the reception of the second byte completes the reception mode for a two-byte message and flow returns to state L.

The gate array 60 is preferably implemented using an ACTEL A1020APL84I-type gate array which is fused according to lo the information attached hereto in Appendix B, which includes parts I–IV. Part I is the fuse file, which constitutes the main input to the ACTEL fusing program for the subject part. To save space, the file is presented with seven parallel columns of fusing data, which is read top to bottom/left to right. To actually use the file, the seven columns of data on each page must be converted to a single column on the far left of the page. Part II is a definition file which is also required to program the subject ACTEL device. Part III is a gate array pin list which is also presented to the ACTEL fusing program so that the program can determine which pins correspond to which device circuits. The parenthetical comments to the right of the PIN numbers may be used to correlate the listed PIN numbers to the schematics of FIGS. 9*a*, 9*b* and 9*c*.

Part IV consists of four sheets of commands sent from the controller and proper responses from the gate array. The first sheet includes 42 commands which may be used to instruct each of the 42 circuit breakers to report as to whether or not a motor (or circuit breaker) is present in the load center. The second sheet includes 42 commands which may be used to instruct each of the 42 circuit breakers to report as to whether the associated circuit breaker contacts are open or closed. The third sheet includes 42 commands which may be used to instruct each of the 42 circuit breakers to open the associated contacts; the response by the gate array is one which indicates whether the contacts are open or closed after the controller command is executed. The fourth sheet includes 42 commands which may be used to instruct each of the 42 circuit breakers to close the associated contacts; the response is similar to that for the open command in that the gate array indicates whether the contacts are open or closed after the controller command is executed.

FIGS. 9*h*–9*k* comprise a series of timing diagrams which respectively depict the receive message, open contacts, read status and read motor timing operations of the gate array. There are fourteen signals shown in the figures: RCV is the receive signal (and gate array pin) which is used by the gate array to receive a two byte message from the controller; ENABLE SAMPLE is an internal signal to the gate array which tracks the timing for receive data sent between the controller and the gate array; XMIT is the send signal (and gate array pin) which is used by the gate array to transmit a two byte message to the controller; DRVTRIAC corresponds to the isolator enable lead 252 and is an active low signal (and gate array pin) which is used to drive the triac circuit 226 when the gate array is preparing for a status read; DRVCOND corresponds to the signal 219 of FIG. 9A and is driven low when the status is not actually being read—when this signal is low, the status filters drive the inputs to the gate array; PSEL#-DRV and NSEL#-DRV are active low signals which are respectively used to drive the select or row drivers 212 during status/motor read and open command execution (where # designates one of the six rows); PMOT#-DRV and NMOT#-DRV are active low signals which are respectively used to drive the PNP and NPN motor or column drivers 214 during open command execution and close command execution (where # designates one of the seven columns); PS[] represents the combination of all PNP select or row power transistor drivers 212; NS[] represents the combination of all NPN select or row power transistor drivers 212; PM[] represents the combination of all PNP motor or column power transistor drivers 214; and NM[] represents the combination of all NPN motor or column power transistor drivers 214. The PS[], NS[], PM[] AND NM[] are denoted in hexidecimal form in each of the diagrams.

Figure 9H:
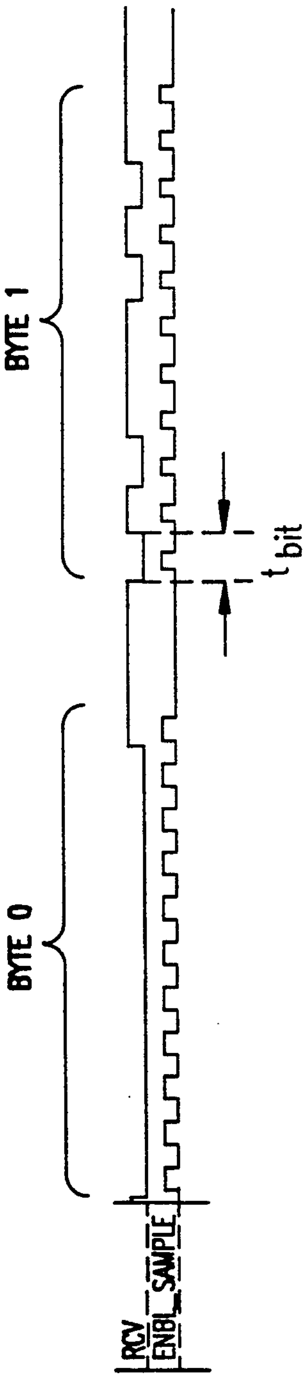

FIG. 9*h* illustrates byte 0 and byte 1 being received by the gate array from left to right, with the least significant bit being on the left and the most significant bit being on the right. The enable sample signal being high indicates when the gate array latches in a bit from the receive signal. The bit definitions for each byte are the same. Each includes an active low start bit, a byte number bit (0 for byte 0 and 1 for byte 1), four data bits for the message, three check bits for detecting communication errors, a parity bit and an active high stop bit. The notation $t_{bit}$ represents 1/1200 second bit width for a 1200 baud rate transmission.

Figure 9I:
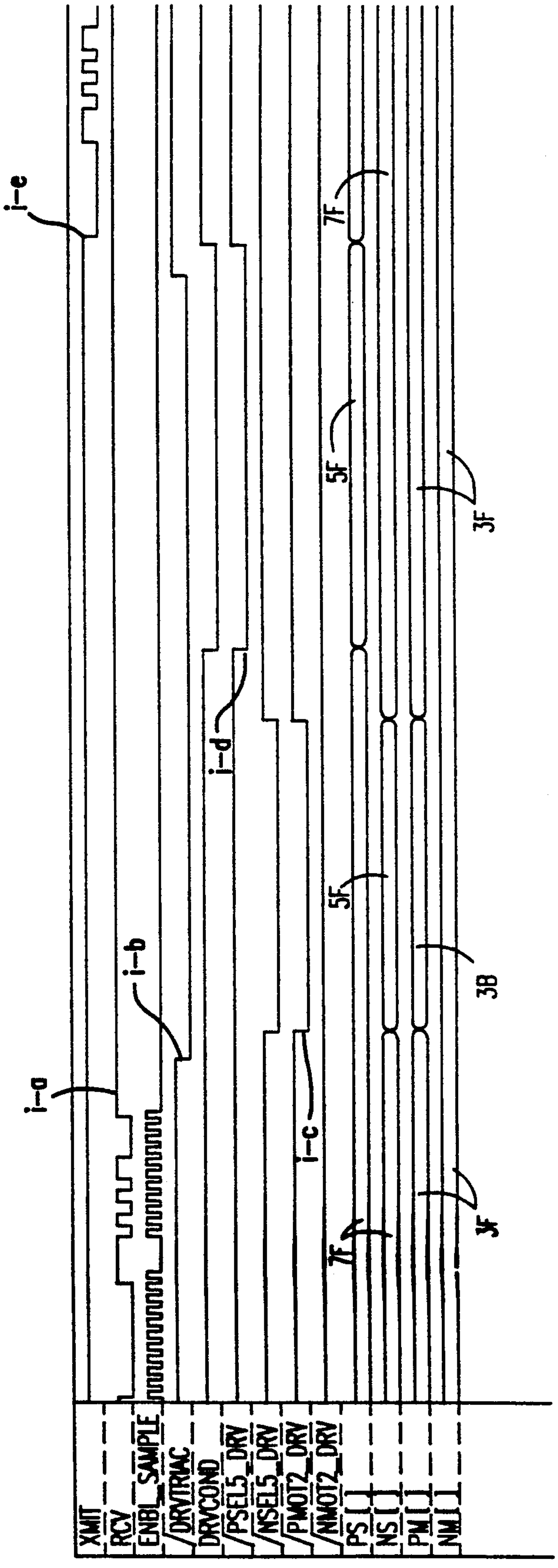

FIG. 9*i* illustrates the gate array timing when an open contacts command is being received and executed. At point i-a of the diagram, the two byte message or command is received by the gate array. At point i-b, the triac is enabled, and at point i-c the particular column and row drivers for the designated circuit breaker are enabled to open the circuit breaker contacts. The hexidecimal representation of NS[] and PM[] (5F and 3B) reflect one bit of the row drivers and one bit of the column drivers being low so as to select the correct circuit breaker from the circuit breaker array. At point i-d, the gate array prepares to read the status of the circuit breaker contacts, and at point i-e the gate array begins reporting the status of the circuit breaker contacts to the controller.

Figure 9J:
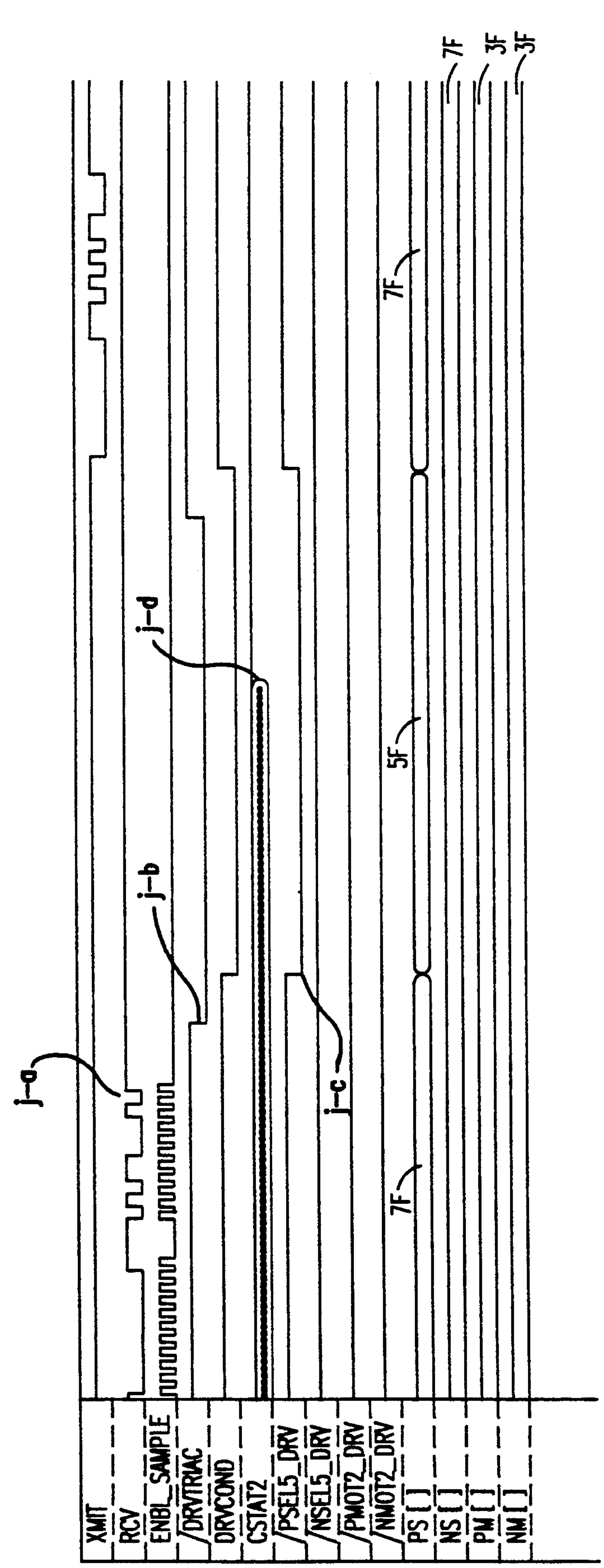

FIG. 9*j* illustrates the gate array timing when a read status command is being received and executed. A point j-a of the diagram, the two byte message or command is received by the gate array. At point j-b, the triac is enabled, and at point j-c the particular column driver for the designated circuit breaker is enabled to allow the CSTAT signal to read the selected filter. At point j-d, the gate array begins reading the status of the circuit breaker contacts, and at point j-e the gate array begins reporting the status of the circuit breaker contacts to the controller.

Figure 9K:
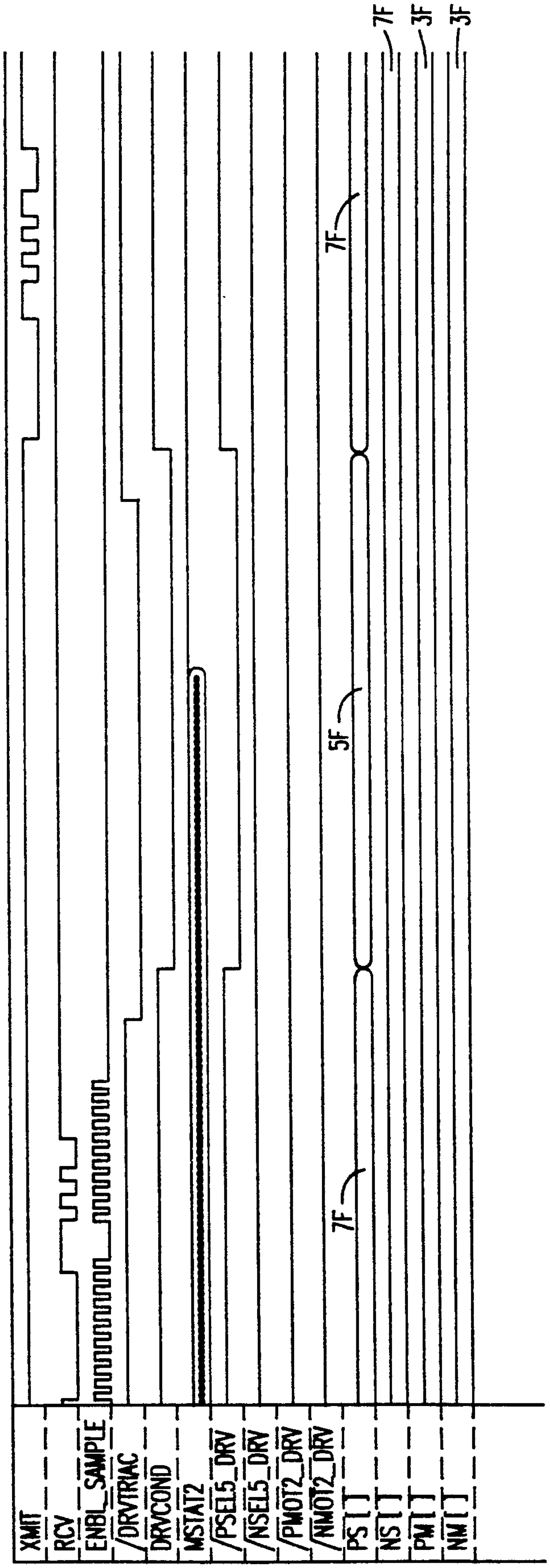
Figure 10A:
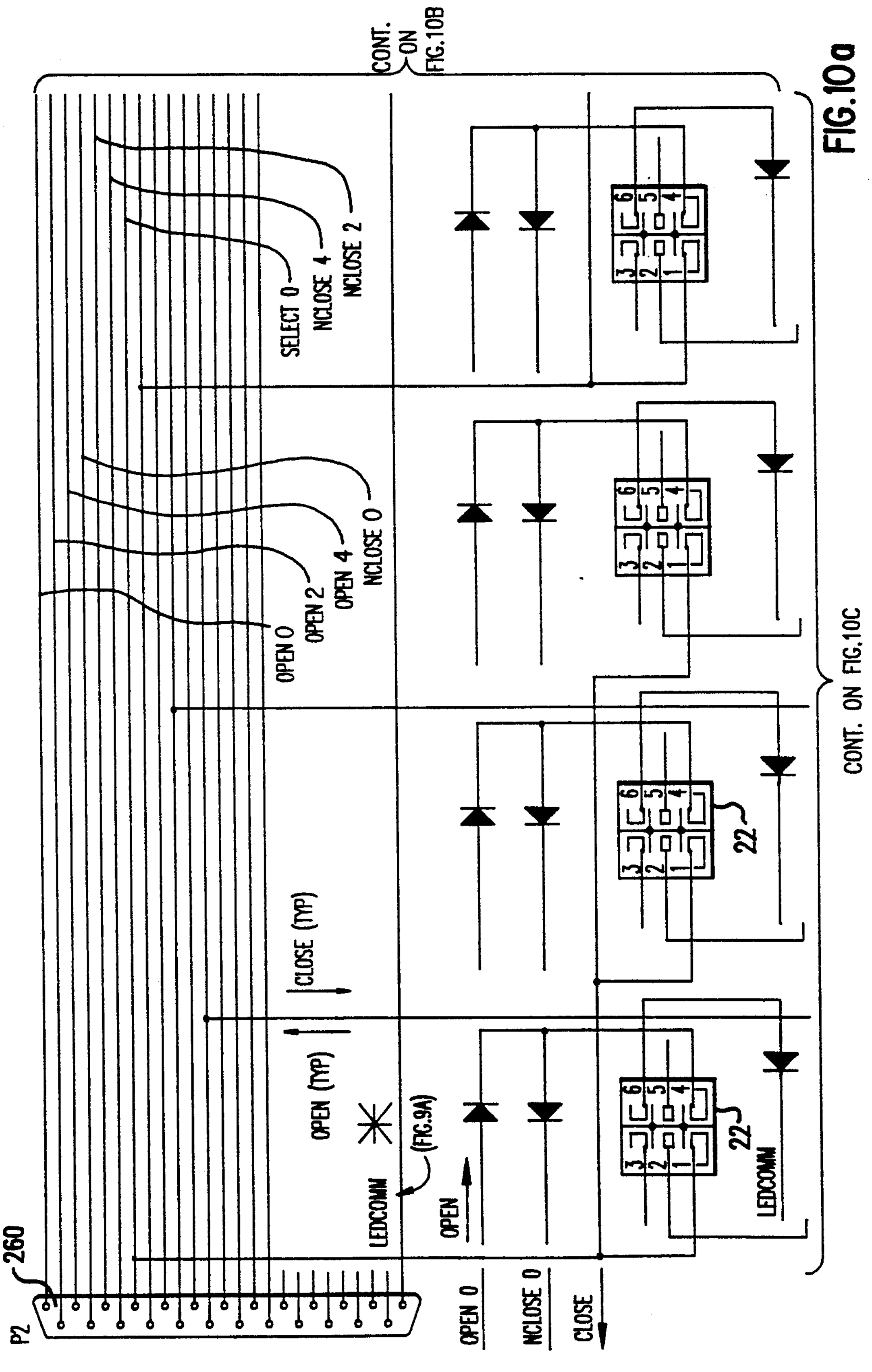
FIGS. 10a-10d represent a schematic diagram of a control bus shown in FIG. 2.
Figure 10B:
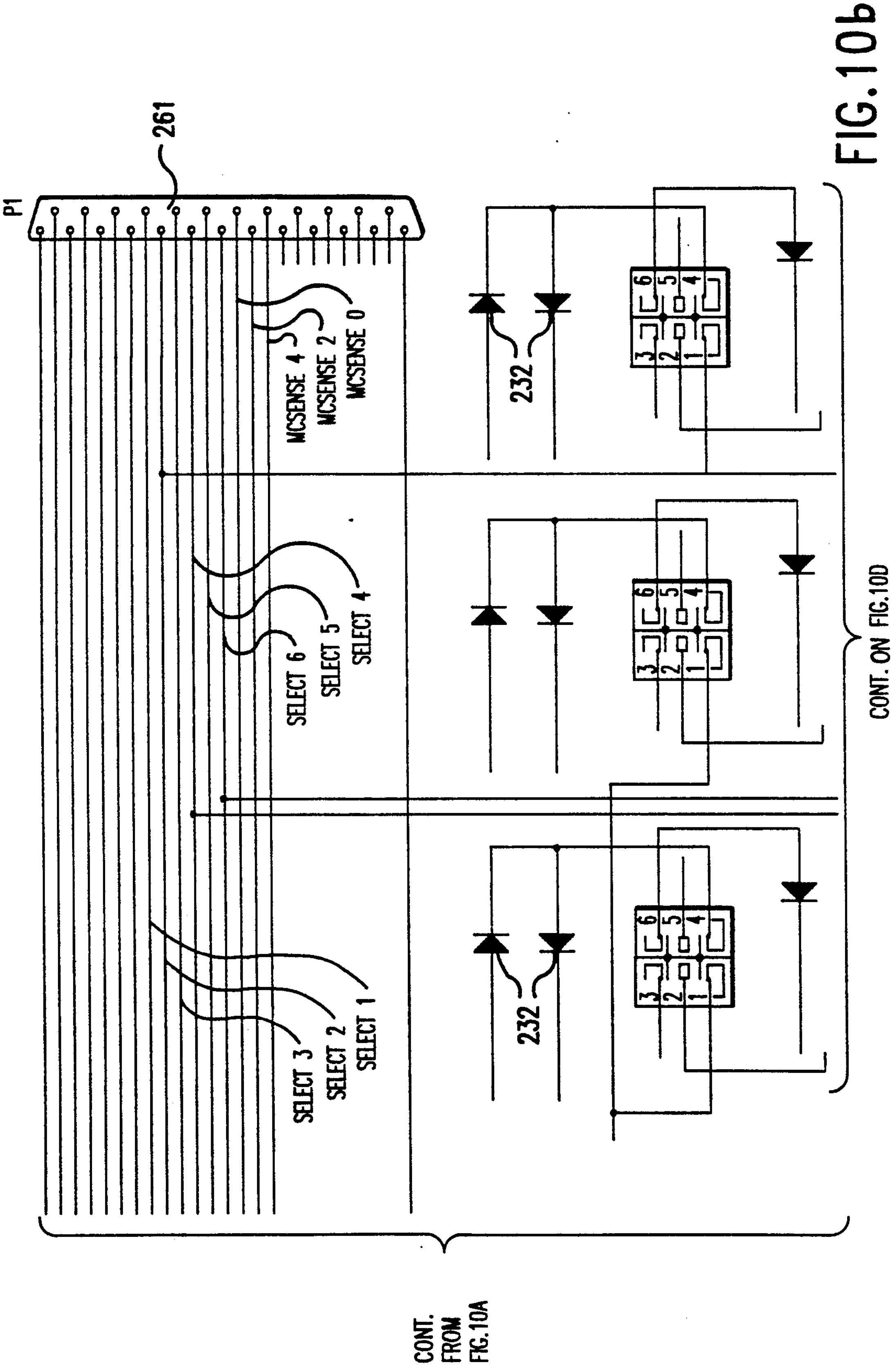
Figure 10C:
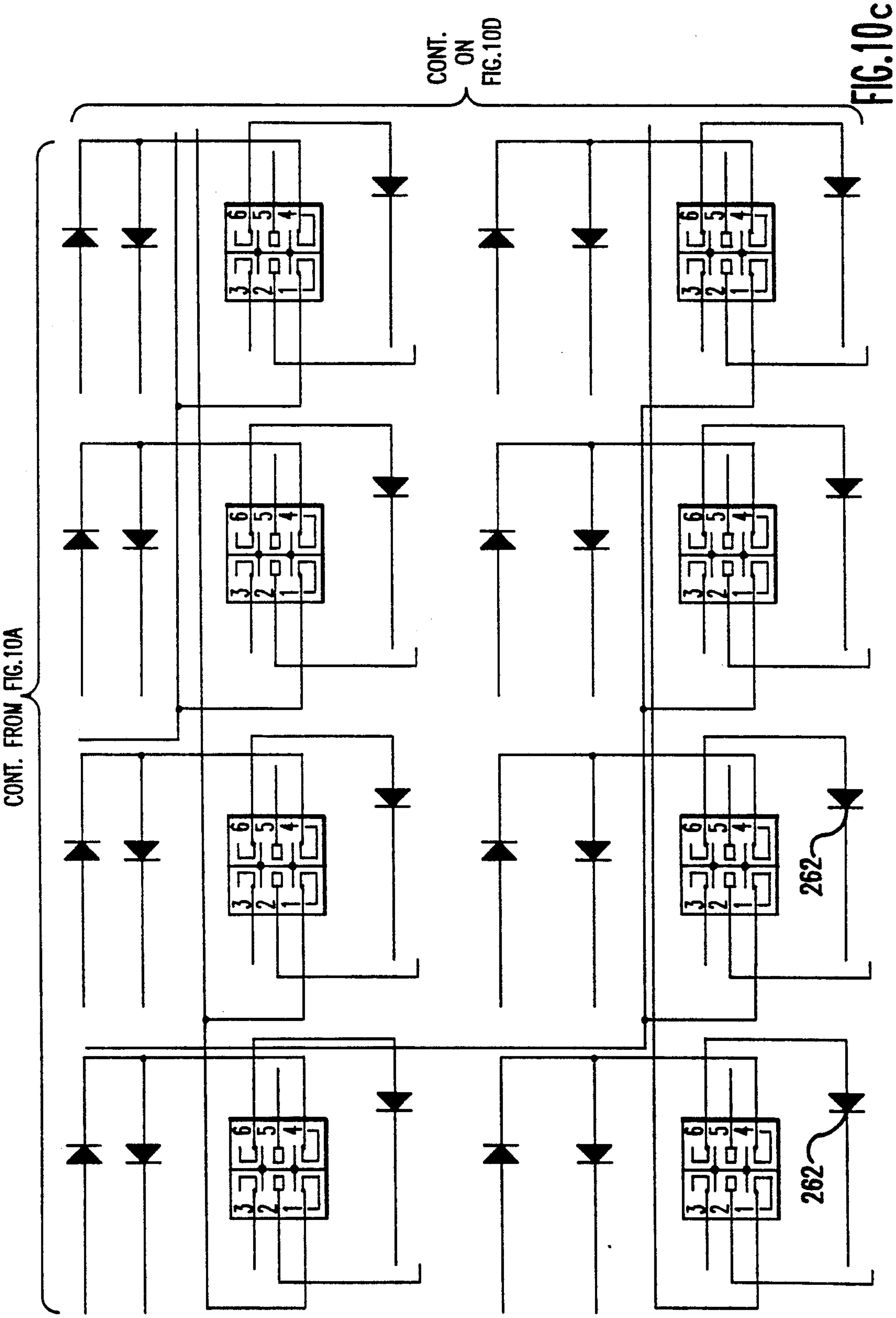
Figure 10D:
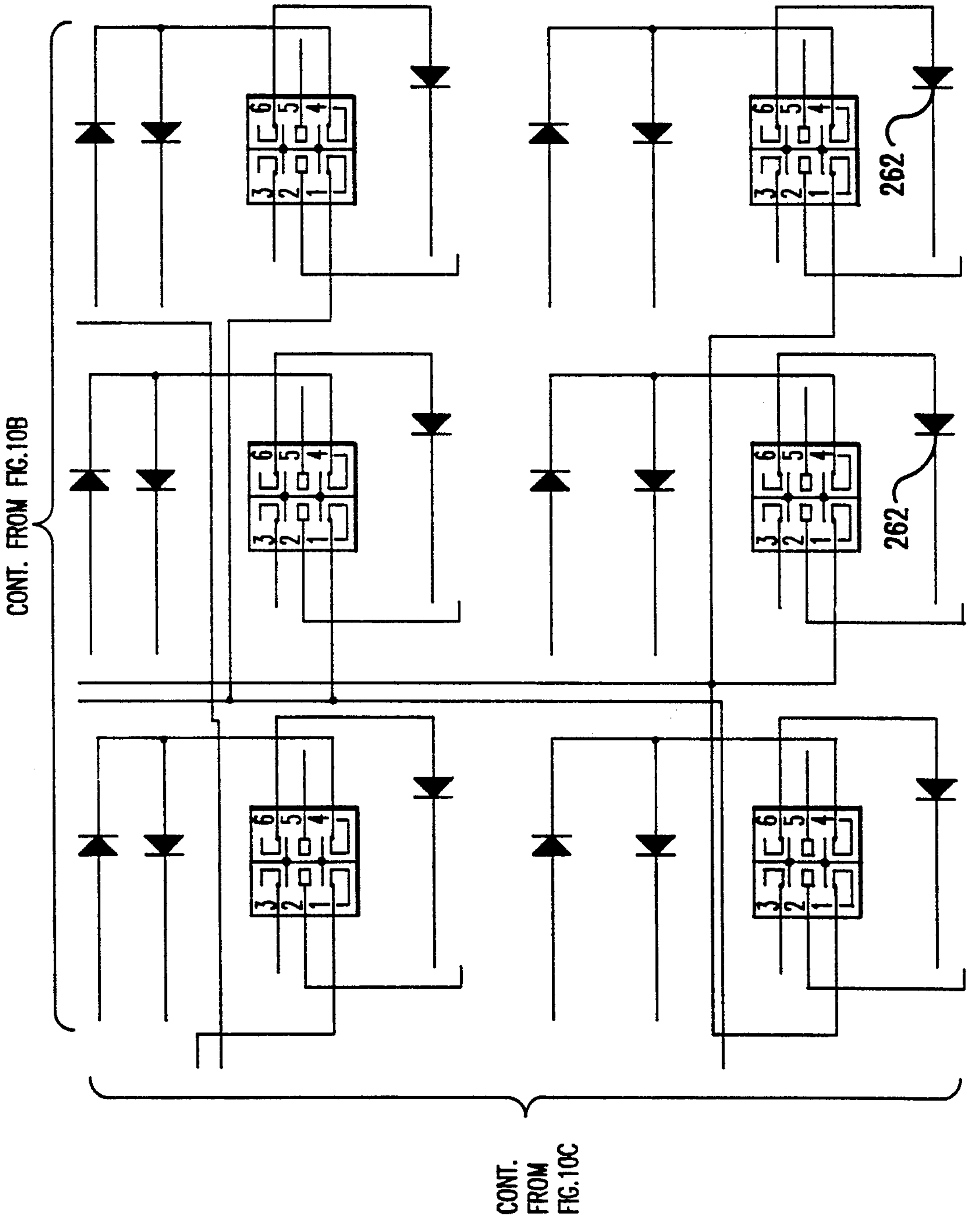

FIG. 9*k* illustrates the gate array timing when a motor read command is being received and executed. The only substantive difference between the signal transitions of the diagrams FIGS. 9*j* and 9*k* is MSTAT is used in place of CSTAT.

FIG. 10 illustrates one of the identical bus boards 16 and 18 of FIG. 4 from a schematic perspective. Shown are twenty-one connectors 22 for each of the twenty-one remote control circuit breakers 20. Each connector 22 carries each of the four signals (the select lead 246, status lead 248, motor drive lead 250 and the isolator common lead 252) between the interface driver board 34 and the circuit breaker 20. The diodes 232 are also illustrated and discussed in connection with the circuit in FIG. 9*b*. The connectors 260 or 261 may be used to connect the bus board 16 or 18 with the interface driver board 34 at either the top or the bottom, respectively, of the load center 10. The diodes 232 are used to provide current blocking so that only one motor can be selected at a time, and the diode 262 is used to provide current blocking so that all the current must flow through the opto triac circuit 226, rather than through the other various available paths.

Figure 11A:
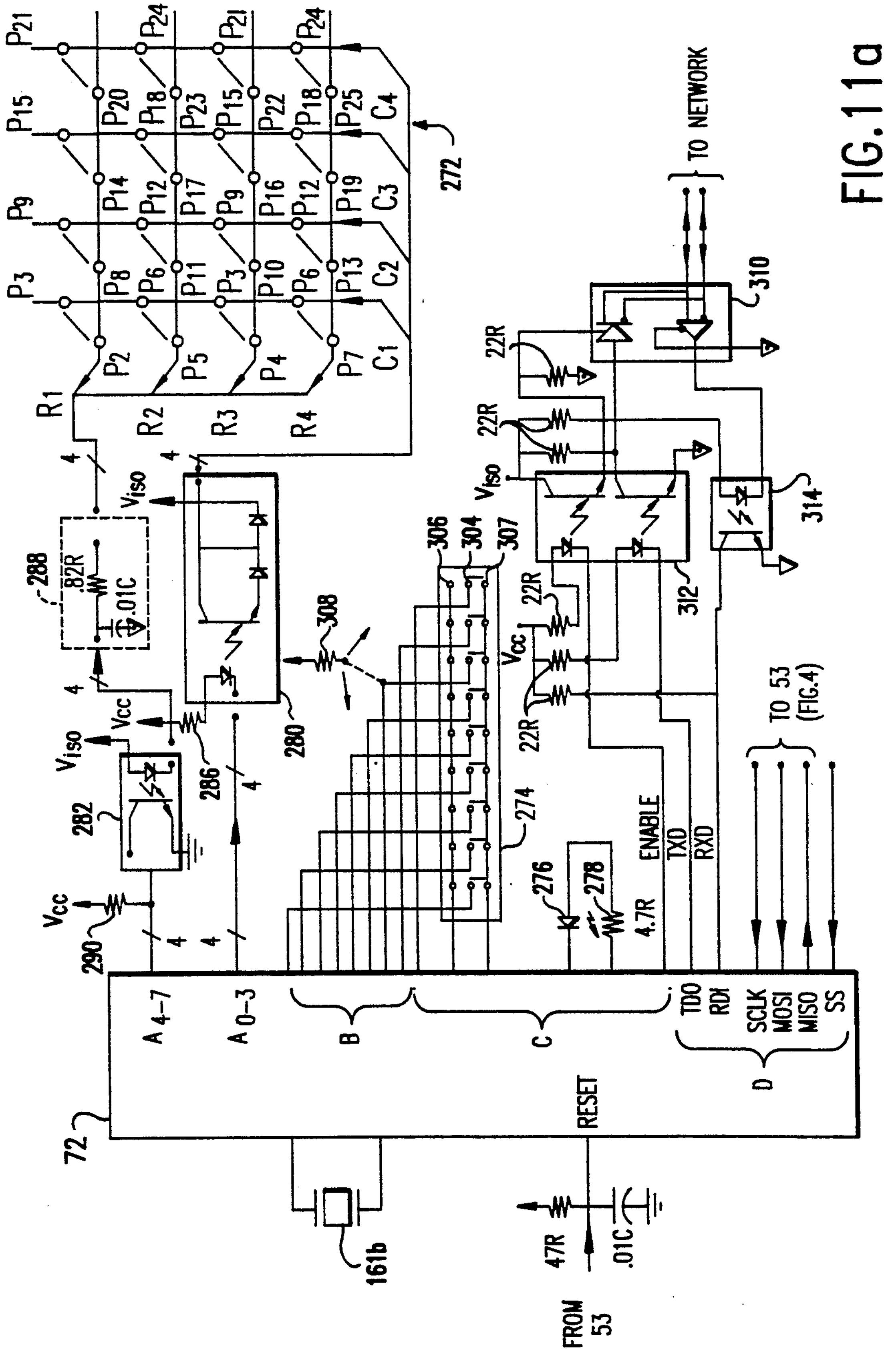
FIGS. 11a-11d represent various implementations of the termination board shown in FIG. 2 from a schematic perspective.
Figure 11C:
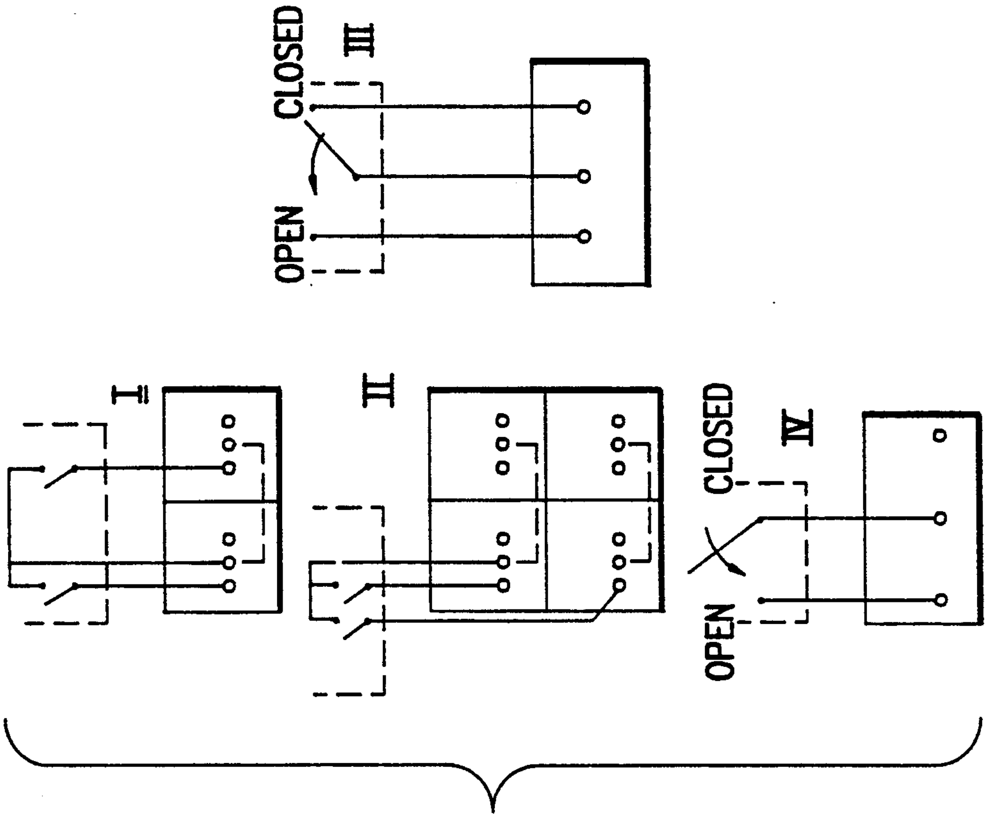
Figure 11B:
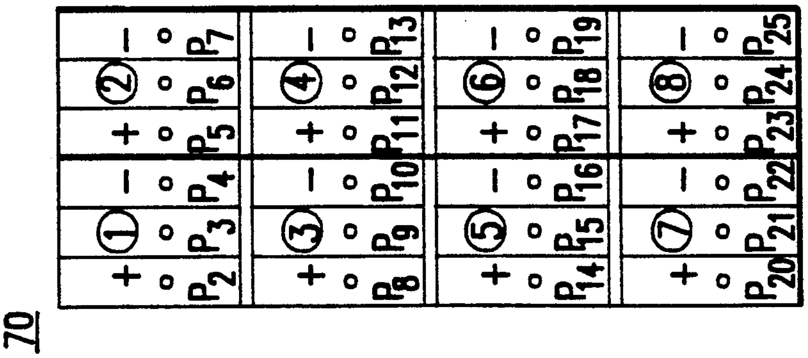

FIGS. 11*a*–11*d* represent various aspects of the termination board 38 in considerably more detail than FIG. 4. FIG. 11*a*, by itself, illustrates each of the components of the termination board 38 in schematic form, except for certain matrix circuitry 272 which is shown schematically in FIG. 11*d*. FIGS. 11*b* and 11*c* illustrate terminal blocks 270 (implementing the input terminals 54 of FIG. 4), which may be used for connecting dry-contact switches or relays to the termination board 38.

The microcomputer 72 of FIG. 11*a*, which may be implemented using the same type of IC as that used for the microcomputer 53 of FIG. 8, controls the termination board using ports A, B and C, along with certain designated bits from the D port for serial communication. The A port is used to scan or read the terminal blocks 270 (illustrated as part of the matrix circuitry 272) in a highly efficient manner, as will be discussed. The B port and the first three bits of the C port are used to read a set of nine trinary DIP switches 274. The C port may also be used for controlling a multi-color LED 276, via resistor 278, to provide diagnostic-related information regarding the operation of the termination board.

The matrix circuitry 272 is optically isolated from the remainder of the termination board 38 using a pair of quad NEC PS2501-4 ICs, opto-couplers 280 and 282, so as to isolate Vcc (and its common) from Viso (and its common) to protect the termination board circuitry from induced electrical noise received from the remote control devices connected to the terminal blocks 272 and to block the radiation of noise into the wiring. The A port bits A:0-3 are individually received at the anode side of the four inputs of the opto-coupler 280 and coupled past a pair of transient protecting diodes 284 to provide four optically isolated control bits C1 through C4, which are used to drive four columns of the matrix circuitry 272. The cathode side of each of the four inputs of the optocoupler coupler 280 is preferably connected to Vcc (+5 Volts) through a 820 Ohm pull-up resistor.

Four rows of the matrix circuitry 272 are read by the A port bits A:4-7 via four optically isolated control bits R1 through R4. Each of the control bits R1 through R4 is individually received at the collector side of an associated one of the four outputs of the opto-coupler 282 and coupled from a low pass filter circuit 288, which removes high frequency noise. From the low pass filter circuit 288, each control bit R1 through R4 is received at the anode side of a respective one of the four inputs of the opto-coupler 282, which couples R1 through R4 to the A port bits A:0-3. Each of the collector outputs of the opto-coupler 282 are pulled to Vcc via 1k Ohm resistors 290.

In the matrix circuitry 272, C1 through C4, which are normally at a logic high, are alternately set low (0 Volts) while the microcomputer 72 scans each of R1 through R4 for each C1 through C4. If any switch input, e.g., defined by P2–P3 in the upper left corner of the matrix circuitry 272, is shorted, the microcomputer 72 is then able to detect that short by scanning R1 through R4.

Figure 11D:
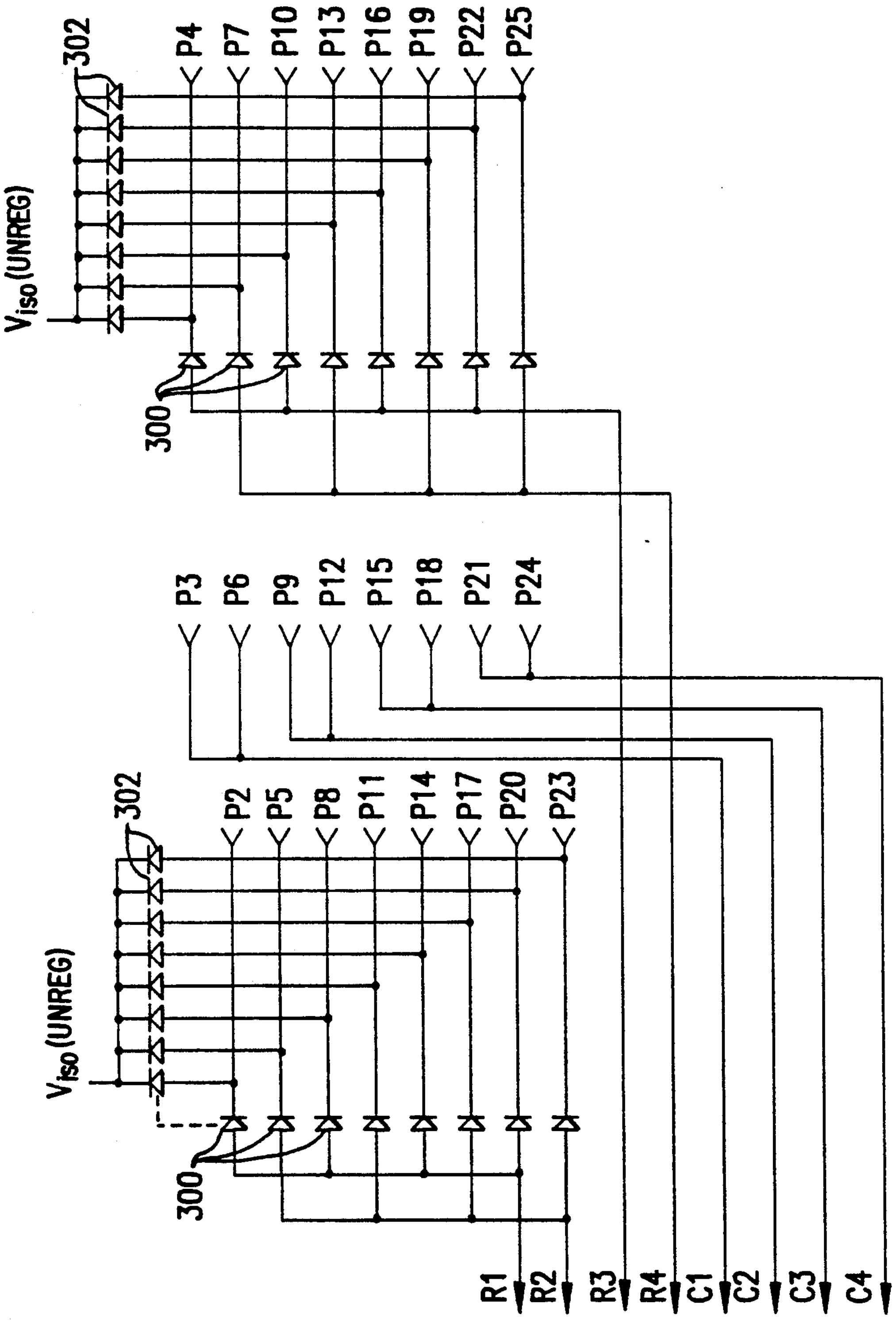

FIG. 11*d* illustrates the matrix circuitry 272 schematically, with each of the switch pairs (e.g., P2–P3, P8–P9, P17–P18, etc.) shown separated out for illustrative purposes. The diodes 300 are selectively placed to prevent the microcomputer 72 from falsely determining that one of the switch inputs is in the shorted state. Without the diodes 300, such a condition could occur if, for example, the adjacent three switch inputs (forming a square in the matrix) were each shorted simultaneously. The diodes 302 are used to provide transient protection.

FIG. 11*b* illustrates a preferred manner of arranging the switch inputs, each of which is labeled with a circle around the respective number 1–8, such that a three-wire signal, having positive, common and negative (as previously discussed), may be received by each of the switch inputs to control one, or a set, of the circuit breakers 20. The terminals of each switch input, e.g., P2, P3 and P4, are designated in FIG. 11*b* to indicate the corresponding switch input in FIGS. 11*a* and 11*d*.

FIG. 11*c* is used to illustrate the proper manner of connecting the signal wires to the switch inputs. Embodiment III illustrates a preferred way of wiring a three-wire pulsed (momentary) or maintained signal at a single one of the eight switch inputs, while embodiment IV illustrates a preferred way of wiring a two-wire maintained signal at a single one of the eight switch inputs. The embodiments depicted I and II respectively illustrate an acceptable manner of connecting two two-wire signals and an unacceptable manner of connecting a three-wire signal (or two two-wire signals) to the switch inputs. In order to avoid false switching or undetected switching, no three-wire signals should be connected across vertical terminal blocks 270; thus, embodiment I is proper and embodiment II is improper. The dotted lines in each terminal block depict a shared common between the wire terminals, and each terminal block includes only three wires terminals for a total of 24 possible wire terminals.

Eight of the nine trinary DIP switches 274 are used to program the microcomputer 72 for the kind of remote control signal (e.g., pulsed or maintained) which is to be received at each of eight input terminals (FIGS. 11*b* and 11*c*), as previously discussed. As an alternative, the function of the first eight trinary DIP switches 274 may be implemented by programming the microcomputer 72 through the controller 32 (e.g., via the programmer station 66) or through one of the input terminals (assuming that the microcomputer 72 has a known default mode for receiving this information). The remaining one of the trinary switches 274 is used to program the microcomputer 72 for the network configuration. For example, each of the three positions of the remaining trinary switch can be used to indicate point-to-point, multidrop (e.g., RS485-type) and a disable network communication mode, respectively.

Each of the trinary DIP switches 274 is read by the microcomputer 72 by scanning the center terminal 304 of the switches 274, while, alternately, driving a logic low on each outside terminal 306 or 307. By pulling up to Vcc each of the center terminals 304 using pull-up resistors 308, the microcomputer 72 is able to determine the position of each trinary switch 274.

As previously discussed in connection with the microcomputer 53 of FIG. 8, the SCLK, MOSI, MISO and SS ports of the microcomputer 72 are directly connected with the corresponding ports of the microcomputer 53 of FIG. 8 to provide synchronous serial communication therebetween. Although not shown, a pair of diodes may be situated on each of the lines emanating from the SCLK, MOSI, MISO and SS ports to provide protection from both high and low level power transients.

The network drivers 68 of FIG. 4 are preferably implemented using an LTC-485 type IC 310, which is optically isolated from the microcomputer-related circuitry using NEC PS2501 type opto-couplers. The purpose of the optical isolation is to eliminate noise and ground-loop related problems. This conventional arrangement may include transient-resistant diodes to provide reliable an efficient RS485 type network capabilities for the system.

Figure 12D:
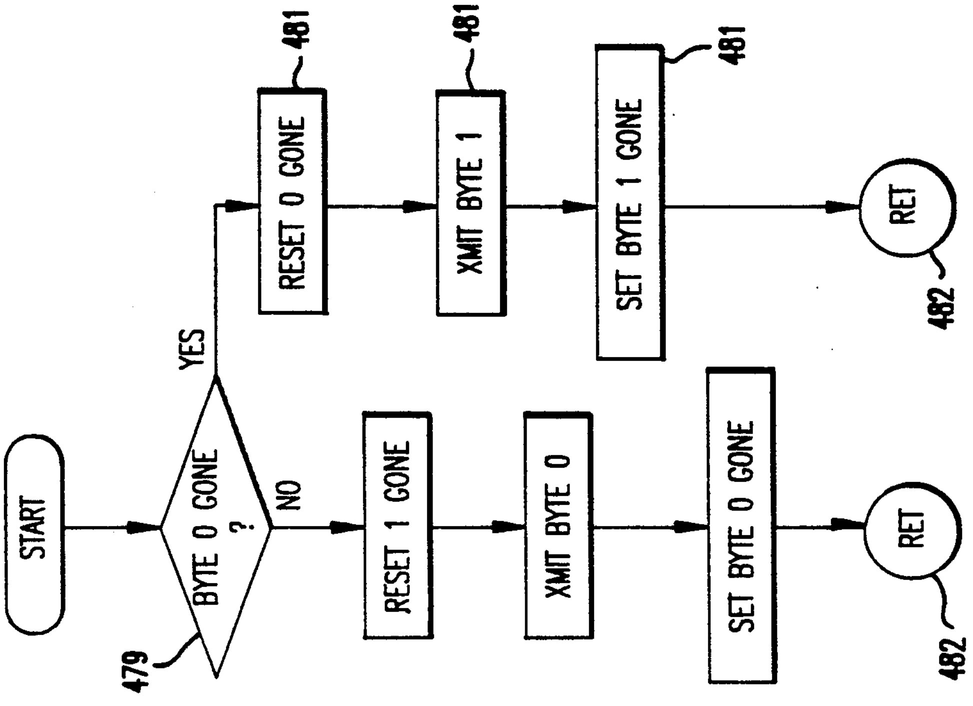
FIGS. 12a-12d comprise a flow chart which may be used to program the microcomputer shown in FIG. 8.
Figure 12A:
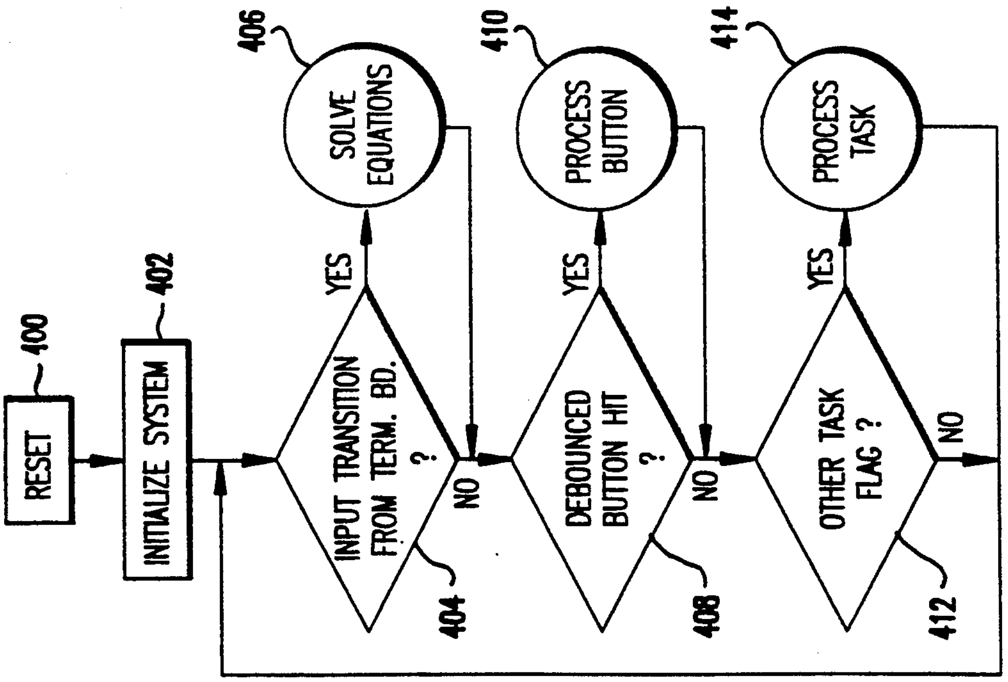

FIG. 12*a* illustrates a preferred flow chart which may be used to implement the operating program for the microcomputer of the controller 32 of FIG. 4. The flow chart begins at blocks 400 and 402 where the microcomputer is depicted transitioning from the reset to system initialization stage. At block 404, a test is performed to determine if any signal transitions have been detected at the input terminals of the termination board. As previously discussed, any such signal transitions are interpreted by the termination board 38 and passed to the microcomputer of the controller 32 via the synchronous link. Once the microcomputer of the controller 32 receives notification of such a signal transition, flow proceeds from block 404 to block 406 where the microcomputer determines which circuit breakers are associated with the signal transition and which tasks must be scheduled in accordance with the signal transition. From block 406, or if no signal transition was detected at block 404, flow proceeds to block 408.

Figure 12B:
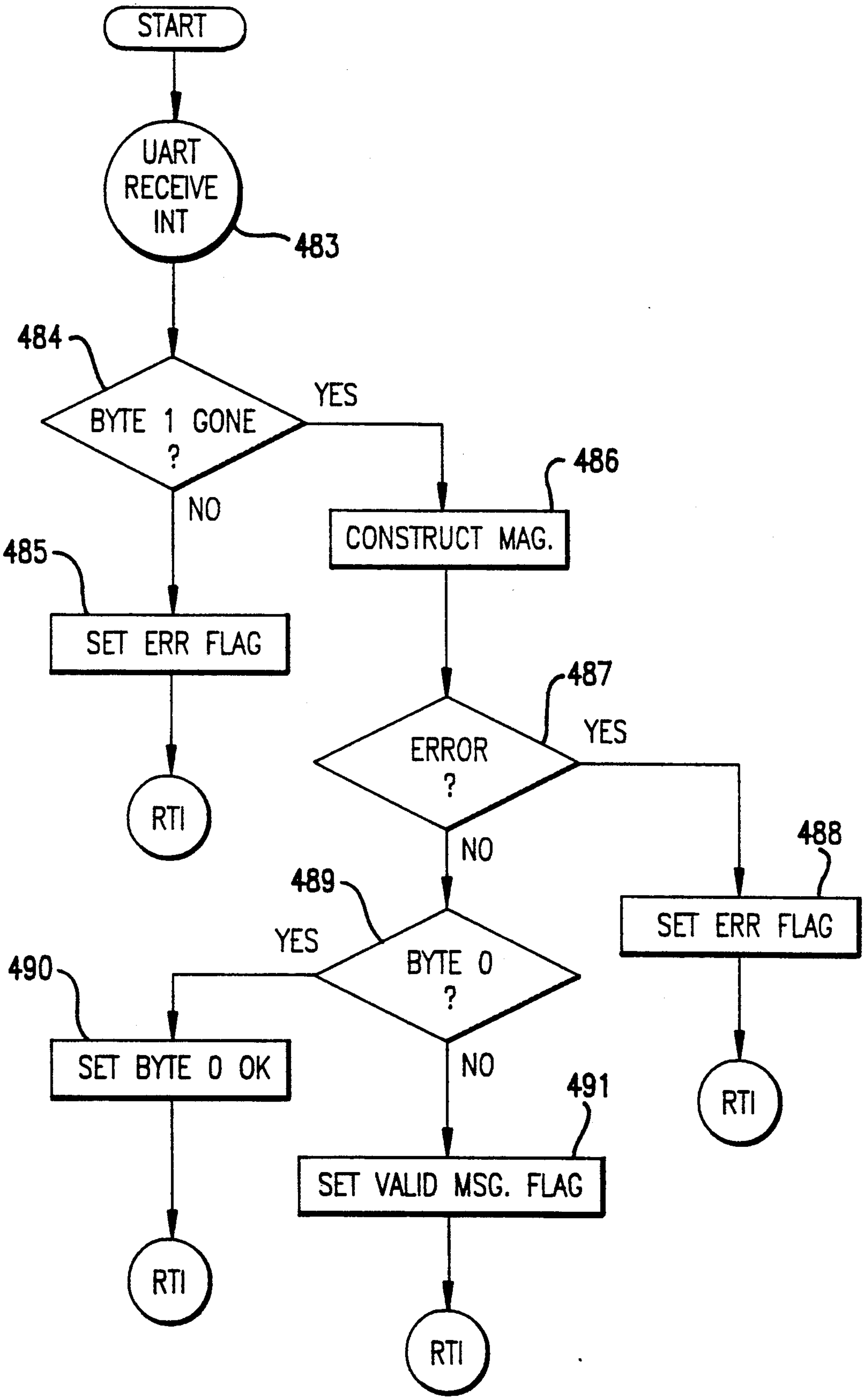
Figure 12C:
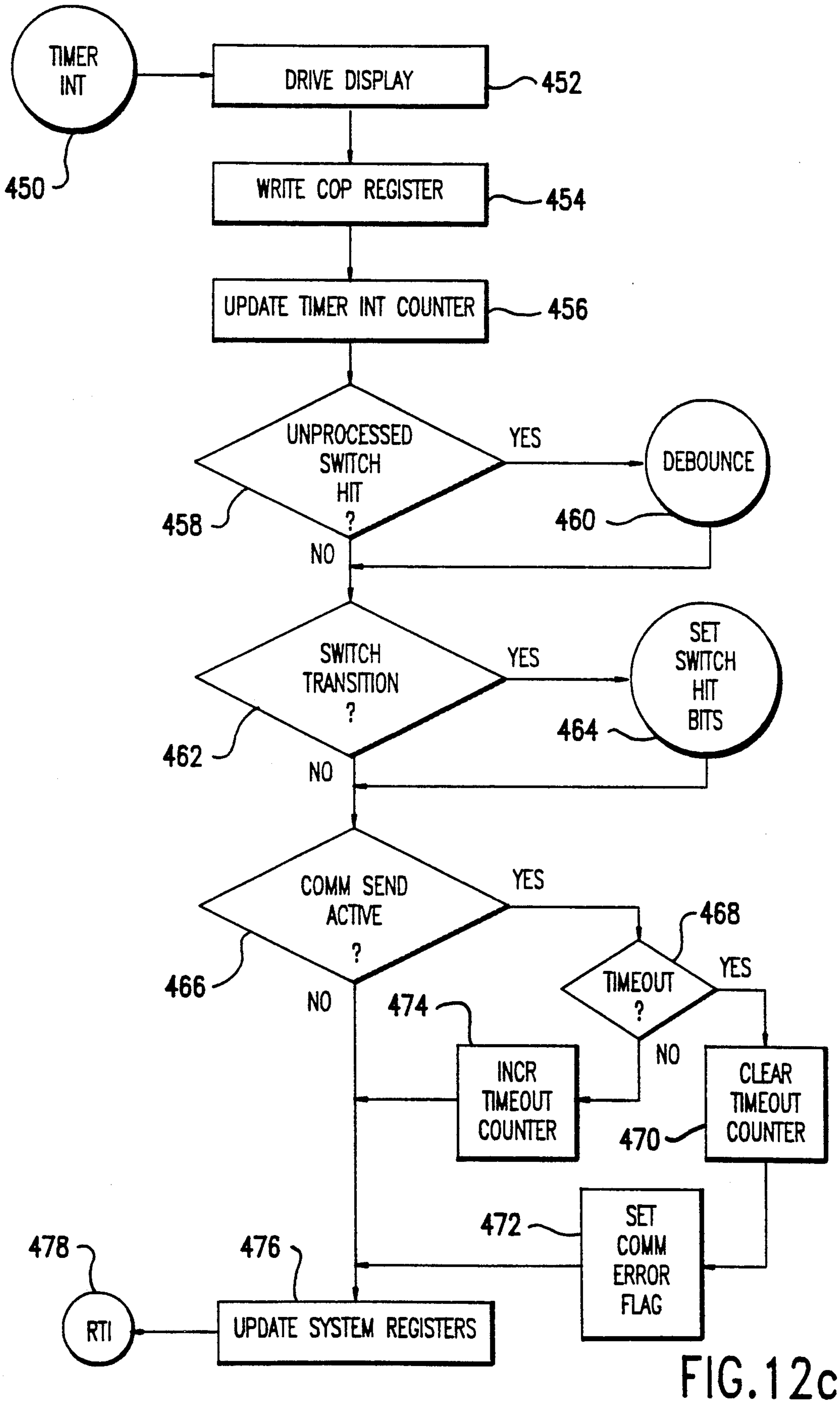

At block 408, the microcomputer performs a test to determine if any manual inputs have been received and debounced via the timer interrupt routine of FIG. 12*c*. In response to the reception of such an input, flow proceeds from block 408 to block 410 where the requisite tasks associated with that input are processed. From block 410, or if no manual input was received at block 408, flow proceeds to blocks 412 and 414 where the microcomputer performs any tasks which have been scheduled for execution; for example, such a task would include any automatic action to be taken as a result of a prompt from the real time clock. From blocks 412 and 414, flow returns to block 404 for additional monitoring of the signal inputs at the termination board and the manual inputs at the front panel of the controller 32.

FIG. 12*b* illustrates a preferred manner of receiving the two-byte message from the gate array. The flow chart begins at block 483 where the microcomputer receives a byte via an interrupt. At block 484, the microcomputer determines if the second byte (byte 1) has been sent to the gate array for a proper response. If not, flow proceeds to block 485 where the microcomputer sets a flag indicating an error (e.g., both bytes must be transmitted before a valid response can be received) and that corrective action needs to be taken. Otherwise, flow proceeds to block 486 where the microcomputer constructs and interprets the received message from the gate array. At block 487, the microcomputer checks for errors. If an erroneous response was received, flow proceeds to block 488 where an appropriate error flag is set for subsequent action. Otherwise, flow proceeds to block 489 where the microcomputer determines whether byte 0 or byte 1 has been received. If byte 0 was received, a flag is set (block 490) to indicate that another byte is forthcoming. If byte 1 was received, a flag is set (block 491) to indicate that a valid message was received and, if needed, further action taken. From blocks 485, 488, 490 and 491, a return from interrupt command is executed.

FIG. 12*c* illustrates a flow chart which may be used to implement a timer interrupt routine for the microcomputer 32. This routine services, upon the receipt of the timer interrupt, various inputs to the controller including the switches on its front panel. The routine starts at block 450 where the microcomputer of the controller is depicted being interrupted from its normal flow. From block 450, flow proceeds to block 452 where the microcontroller updates the display as previously described. At block 454 the microcomputer refreshes its internal COP (computer operating properly) register to prevent a reset from occurring. Block 456 depicts the microcomputer presetting the counter which is used to generate the next timer interrupt.

From block 456, flow proceeds to block 458 where the microcomputer performs a test to determine if there are any switch inputs at the front panel of the controller that have to be processed. If there are any switch inputs that have to be processed, flow proceeds from block 458 to block 460 where the microcomputer debounces the next unprocessed switch input. Any such manual input is preferably debounced using conventional software debouncing steps. If there are no switch inputs that have to be processed, or from block 460, flow proceeds to block 462.

At block 462, the microcomputer performs a test to detect switch transitions caused by manual inputs at the front panel. If such transitions have occurred, flow proceeds to block 464 where flags (bits) are set to record which switches have been selected. Otherwise, flow proceeds to block 466.

Blocks 466 through 476 represent a timeout procedure to ensure that the gate array is responding to the commands sent from the controller. If the gate array does not respond within a certain time limit (block 468) by returning the requisite acknowledgement or status report, the associated timer is cleared and an error flag is set (block 472) for appropriate action during the main flow chart (block 412 of FIG. 12*a*). If the gate array responds within the time limit, flow proceeds from block 468 to block 474 where the timer counter is incremented for the next pass through block 468. Before exiting the routine at block 478, any restoration of system registers occurs at block 476.

FIG. 12*d* illustrates a more detailed perspective of a preferred manner of sending the two-byte message from the controller to the gate array. The flow chart begins at block 479 where the microcomputer determines if the first byte (byte 0) has been sent yet. If not, flow proceeds to blocks 480 where the microcomputer resets a flag indicating that byte 1 has been transmitted, then transmits byte 0, and then sets a flag indicating that byte 0 has been transmitted. If the microcomputer determines that the first byte has been sent, the opposite occurs at blocks 481; the microcomputer resets a flag indicating that byte 0 has been transmitted, then transmits byte 1, and then sets a flag indicating that byte 1 has been transmitted. This subroutine, which may be called from block 412 of FIG. 12*a*, is exited at block 482.

Figure 13A:
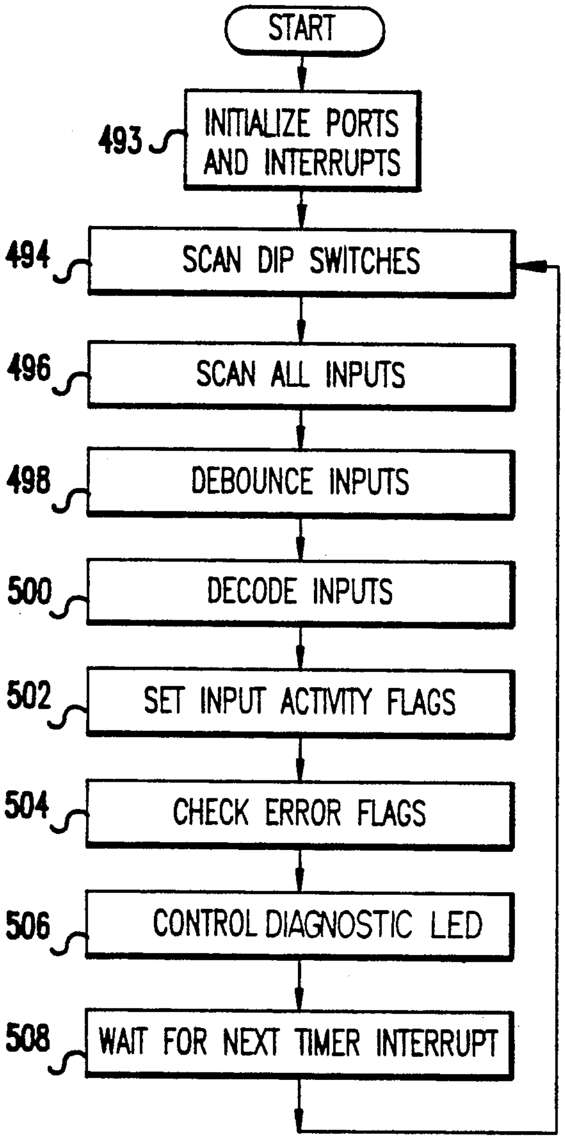

FIGS. 13*a*–13*d* respectively illustrate a main routine, a timer interrupt routine, a serial communications interrupt routine, and a serial peripheral interrupt routine as a preferred manner of programming the microcomputer of the termination board 38 (FIG. 11*d*). FIG. 13*a* begins at block 493 where the microcomputer is depicted transitioning from the reset to initialization stage. At block 494, the microcomputer scan the trinary DIP switches to determine the configuration set by the operator.

At blocks 496 through 500, the microcomputer scans, debounces and decodes all inputs to determine which tasks must be executed. Activity flags, as depicted at block 502, may be set to record the types of tasks to be performed. Blocks 504 and 506 depict the microcomputer checking for and displaying errors that may have transpired via the scanned inputs. Other tasks may also be processed at this point in response to messages or flags being sent from any of the other routines.

From block 506, flow proceeds to block 508 where the microcomputer waits for the timer interrupt routine to prompt another reading of the DIP switches and other inputs to the microcomputer.

Figure 13B:
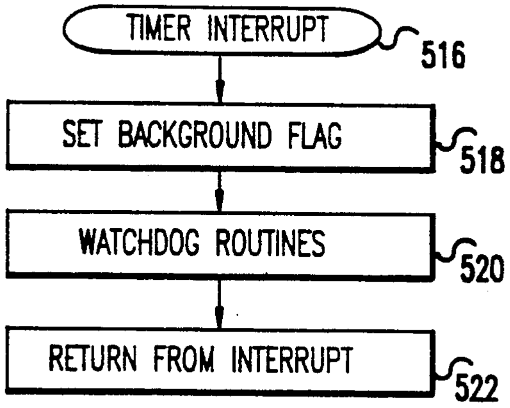

The timer interrupt routine, illustrated in FIG. 13*b* and beginning at block 516, comprises two basic steps, depicted at blocks 518 and 520. At block 518, the microcomputer sets a background flag to indicate that the time has come to once again scan the DIP switches and other inputs to the microcomputer. Thus, when the microcomputer returns from block 508, it proceeds to block 494.

From block 518, flow proceeds to block 520 where the microcomputer refreshes an internal conventional watchdog timer circuit (e.g., an internal COP register), which protects the microcomputer from entering into nonprogrammed modes. Other watchdog routines may also be implemented at this point to ensure proper operation external to the microcomputer. The interrupt routine is exited via block 522.

Figure 13C:
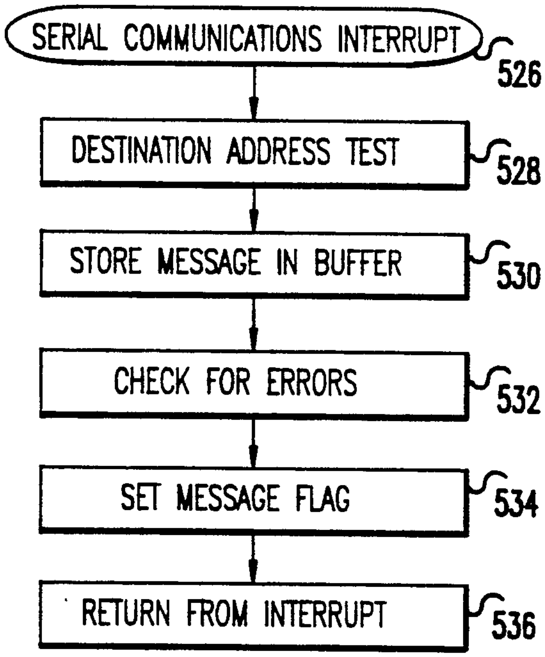

The serial communications interrupt routine, illustrated in FIG. 13*c*, illustrates a preferred manner for the termination board to communicate with external devices via the network drivers. The routine begins at blocks 526 and 528 where the microcomputer enters the routine and checks the network address to determine if the communication over the network contains the destination address of the subject termination board. At blocks 530, 532 and 534, the microcomputer stores, validates and flags the communication. The message flag set at block 534 may be executed, for example, in the main routine of FIG. 13*a* or the interrupt routine of FIG. 13*d*, depending on the particular type of message. The routine is exited at block 536 via a return from interrupt command.

Figure 13D:
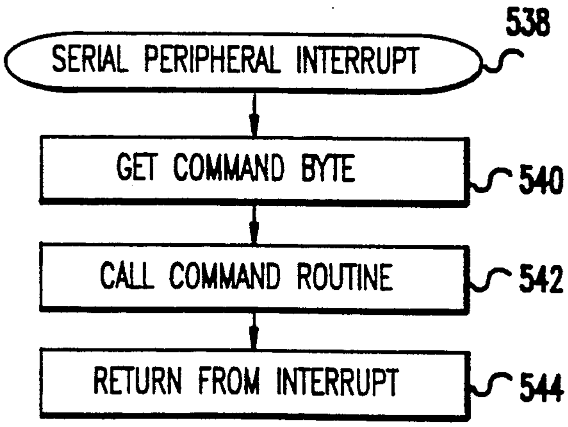

FIG. 13*d* illustrates a preferred manner for the termination board to communicate with the controller board via the previously discussed master/slave interface. The routine begins at blocks 538 and 540 where the microcomputer enters the routine and retrieves the command being sent from the controller. At block 542, the microcomputer calls the appropriate subroutine for executing the command sent from the controller. For example, the microcomputer may be instructed to send the current status of each of the eight input switches to the controller. In this instance, the microcomputer would call a subroutine which reads the status of each switch and transmits that data to the controller. The routine is exited at block 544 via a return from interrupt command.

While the invention has been particularly shown and described with reference to a few particular embodiments, it will be recognized by those skilled in the art that modifications and changes may be made to the present invention described above without departing from the spirit and scope thereof. For instance, the termination board 38 may be used as one of several types of circuit boards used to interface with various types of outside devices and/or to provide varying levels of control to the circuit breakers.

APPENDIX A

```
* ************************************************************
* DISPLAY TABLE
* distab is a 1 to 1 map of the display LED's.  Bits in this table are sent
* directly to PORTS A and B to drive the control panel LED's.

*       The table format is:

*       -------------------------------------------------
*       | 16 O | 16 C | 15 C | 15 O | 02 O | 02 C | 01 C | 01 O |
*       -------------------------------------------------
*       | D4SA | D3SA | D2SA | D1SA | 30 O | 30 C | 29 C | 29 O |
*       -------------------------------------------------
*       | 18 O | 18 C | 17 C | 17 O | 04 O | 04 C | 03 C | 03 O |
*       -------------------------------------------------
*       | D4SB | D3SB | D2SB | D1SB | 32 O | 32 C | 31 C | 31 O |
*       -------------------------------------------------
*       | 20 O | 20 C | 19 C | 19 O | 06 O | 06 C | 05 C | 05.O |
*       -------------------------------------------------
*       | D4SC | D3SC | D2SC | D1SC | 34 O | 34 C | 33 C | 33 O |
*       -------------------------------------------------
*       | 22 O | 22 C | 21 C | 21 O | 08 O | 08 C | 07 C | 07 O |
*       -------------------------------------------------
*       | D4SD | D3SD | D2SD | D1SD | 36 O | 36 C | 35 C | 35 O |
        -------------------------------------------------
*       | 24 O | 24 C | 23 C | 23 O | 10 O | 10 C | 09 C | 09 O |
*       -------------------------------------------------
*       | D4SE | D3SE | D2SE | D1SE | 38 O | 38 C | 37 C | 37 O |
*       -------------------------------------------------
*       | 26 O | 26 C | 25 C | 25 O | 12 O | 12 C | 11 C | 11 O |
*       -------------------------------------------------
*       | D4SF | D3SF | D2SF | D1SF | 40 O | 40 C | 39 C | 39 O |
*       -------------------------------------------------
*       | 28 O | 28 C | 27 C | 27 O | 14 O | 14 C | 13 C | 13 O |
*       -------------------------------------------------
*       | D4SG | D3SG | D2SG | D1SG | 42 O | 42 C | 41 C | 41 O |
*       -------------------------------------------------
*       |  X   |  X   | MNTN | PULS | REVW | MANL | HALT | RUN  |
*       -------------------------------------------------
*       | D4DP | D3DP | D2DP | D1DP |  X   | OPEN | CLOS | NOCHG|
*       -------------------------------------------------
```

```
*       ## O means => breaker open
*       ## C means => breaker closed
*       D#Sx means => display #, segment x
*       D#DP means => display #, decimal point

**************************************************
* DIGFORM
*
* Maps input BCD digit to bits in display table
* A zero means segment ON

* The column # in the EM2000 varies between columns 4 through 7 on odd bytes
* in the DISPTAB table.  The routine takes the row formatted info in table
* DIGPAT and converts it to the column format required in DIGPAT.
*
* INPUTS:  BCD Digit @ [varptr-1], column # @ [varptr-2]
* RETURNS: None
* LOCALS:  Segment pattern [varptr], disptab index [varptr+1], !ColMask [varptr+2]
* CHANGES: None
*
*                            -----------------
*             varptr-2       | Col. mask       | Mask of column to fix passed from caller
*                            -----------------
*             varptr-1       | BCD #           | BCD digit to format passed from caller
*                            -----------------
* entry/exit ptr>    varptr  | Segment Pattern |     From table digpat
*                            -----------------
*             varptr+1       | Current disptab | Index into disptab array
*                            -----------------
*             varptr+2       | Comp. col. mask | Compliment of column mask
*                            -----------------

digform ldx     varptr  * get stack ptr
        lda     #1
        sta     1,x     * save disptab byte counter
        ldx     -1,x    * get BCD digit (or DP)
        lda     digpat,x        * get segment pattern
        ldx     varptr  * restore x
        sta     ,x      * save segment pattern on stack
        ldX     -2,x    * get column mask
        com             * compliment pattern mask
        sta     2,x     * save it

        lsr     ,x      * digit bit = 0?
        bcc     df1     * yes, put 0 in table
        lda     -2,x    * else, get column mask
        ldx     1,x     * load index into disptab
        ora     disptab,x       * set table bit to 1
        bra     df2

1       lda     2,x     * get complimented column mask
        ldx     1,x     * get disptab index
        and     disptab,x       * clear table bit

2       sta     disptab,x       * fix table
        ldx     varptr  * restore stack frame
        inc     1,x
        inc     1,x     * prepare for next digit segment
        lda     #16
        cmp     1,x     * past table end?
        bcc     df3     * no, loop
        rts             * else, return

**************************************************
BKR2DISP

converts breaker slot # (0 to 41) in [varptr-1] to byte # and doublet #
dublets are the even numbered bits in each byte which signify the first
bit of the two ON/OFF bits for each breaker in the status display

byte# = (slot# % 14) & 0xfe)) + int(chan / 28)
doublet# = ((slot# % 2) * 2) + (4 * (slot# / 14)) - (8 * (slot# / 28))

INPUTS:  at entry, Slot# @ [varptr-1]
RETURNS: at exit, byte# @ [varptr], doublet# @ [varptr+1]
LOCALS:  none

X and A trashed

                             -----------
              varptr-5       | Slot#     | Slot number passed from caller
                             -----------
entry/exit ptr>     varptr-4       | Byte#     | Byte# returned on exit
                             -----------
              varptr-3       | Doublet#  | Doublet# returned on exit
                             -----------
              varptr-2       | Dividend  | passed to divide
                             -----------
              varptr-1       | Divisor   | passed to divide
                             -----------
ptr after fixup>    varptr   | Quotient  | varptr on entry to divide, Quotient returned
                             -----------
                             | Remainder | Remainder returned from divide
*                            -----------

* solve byte# = (slot# % 14) & 0xfe)) + int(slot# / 28)
bkr2disp        ldx     varptr  * get stack pointer
        lda     #4      * number of local, returned, passed variables
```

```
        add     varptr
        sta     varptr
        tax
* from here on, x points to quotient of divide routine

        lda     -5,x     * slot# = dividend
        sta     -2,x
        lda     #14
        sta     -1,x     * divisor = 14

        bsr     divide

        lda     #$fe
        and     1,x      * fixup remainder
        sta     -4,x     * [x] = (slot# % 14) & 0xfe

        lda     -5,x     * get slot number
        sta     -2,x
        lda     #28
        sta     -1,x
        bsr     divide   * [x+2] = slot# / 28

        lda     -4,x
        add     ,x       * byte# = [x] = [x] + (slot# / 28)
        sta     -4,x     * save for return

 now solve for doublet number
 doublet# = ((slot# % 2) * 2) + (4 * (slot# / 14)) - (8 * (slot# / 28))

        lda     -5,x     * get slot #
        and     #1
        lsla             * (slot# % 2) * 2
        sta     -3,x     * store partial doublet

        lda     -5,x     * get slot#
        sta     -2,x     * to psuedo stack dividend
        lda     #14      * get divisor
        sta     -1,x     * to psuedo stack
        bsr     divide

        lda     ,x       * get quotient
        lsla
        lsla
        add     -3,x
        sta     -3,x     *((slot# % 2) * 2) + (4 * (slot# / 14))

        lda     -5,x
        sta     -2,x
        lda     #28
        sta     -1,x
        bsr     divide

        lda     ,x       * get slot# / 28
        lsla
        lsla
        lsla             * 8 * (slot# / 28)
        nega
        add     -3,x     * doublet# -= 8 * (slot# / 28)
        sta     -3,x     * doublet# to psuedo stack

        lda     varptr
        sub     #4
        sta     varptr
        tax              * fix psuedo stack pointer
        rts

*************************************************
DIVIDE
                            -----------
               varptr-2         | Dividend  | passed variable from caller
                            -----------
               varptr-1         | Divisor   | passed variable from caller
                            -----------
entry/exit ptr>  varptr         | Quotient  | return value to caller
                            -----------
               varptr+1         | Remainder | return value to caller
                            -----------

INPUTS:  dividend=[varptr-2], divisor=[varptr-1]
RETURNS: quotient=[varptr], remainder=[varptr+1]
LOCALS:  temp quotient in [varptr]

divides an 8-bit number by another 8-bit number...[varptr-2]/[varptr-1]
doesn't check for divide by zero
A trashed
divide doesn't call anything, varptr unaffected

ivide   ldx     varptr   * get stack pointer
        clr     ,x       * clear quotient
        lda     -2,x     * get dividend
iv2     sub     -1,x     * dividend < divisor?
        bcs     div1     * yes, calculate remainder
        inc     ,x       * else, increment quotient
        bra     div2

iv1     add     -1,x     * calc remainder
        sta     1,x      * remainder to stack frame [varptr+1]
        rts
```

```
*************************************************
MUXDISP

updates display based on what is in the display table DISPTAB
Takes data from table and writes it directly to the LED's
Lower 3 bits of PORTC contains address of 1-of-8 display mux presently displayed

INPUTS:  PORTC
RETURNS:
LOCALS:  temp data for new PORTC
CHANGES:

A and X trashed


mxdisp ldx    intptr  * set for temp storage
       lda    PORTC
       and    #$f8    * mask out lower bits
       sta    ,x
       lda    PORTC
       inca
       and    #7
       ora    ,x
       clr    PADIR
       clr    PBDIR   * stop driving array
       sta    PORTC   * set next display column

       bclr   3,PORTC
       bset   3,PORTC * strobe MC137

       and    #7
       tax
       lslx           * normalize ([disptab] = 2 * (PORTC * 7))
       lda    disptab,x
       ora    flashmsk        * turn display off if flashmask == 1
       sta    PORTA   * set first LED column
       incx
       lda    disptab,x
       ora    flashmsk
       sta    PORTB   * set second column

       lda    #$ff
       sta    PADIR
       sta    PBDIR   * display rows ON

       tst    flashctr        * flash counter active from procsw routine?
       beq    exmux   * no, exit
       inc    flashctr        * else, increment counter
       lda    flashctr        * get present counter
       cmpa   #FLASHDLY       * counter > delay?
       bcs    exmux   * no, exit

       clr    flashctr        * else, clear flash counter
       clr    flashmsk        * enable display

xmux   rts
```

APPENDIX B (PART I)

```
; HEADER
; FILEID FUSEFUS /designs/em2kact/em2kact.fus 14005bb9
; CHECKSUM 14005bb9
; PROGRAM Action Logic System
; VERSION 1.22
; DEPEND DDFDIE /actel/die1020.ddf 9fe38a0b
; DEPEND FUSEADL /designs/em2kact/em2kact.adl a0fd292e
; DEPEND FUSESEG /designs/em2kact/em2kact.seg 5fc03720
; DEPEND FUSELOC /designs/em2kact/em2kact.loc bdc35912
; DEPEND MODLIB /actel/modlib.lib b0797af4
; VAR DDFDIE /actel/die1020.ddf
; VAR FUSEADL /designs/em2kact/em2kact.adl
; VAR ADLIB /actel/adl04.lib
; VAR DDFPACKAGE /actel/pkg1020.ddf
; VAR ROUTEADL /designs/em2kact/em2kact.adl
; VAR ROUTELOC /designs/em2kact/em2kact.loc
; VAR PLACEPIN /designs/em2kact/em2kact.pin
; VAR PLACECRT /designs/em2kact/em2kact.crt
; VAR FUSESEG /designs/em2kact/em2kact.seg
; VAR PLACEADL /designs/em2kact/em2kact.adl
; VAR FUSELOC /designs/em2kact/em2kact.loc
; VAR FUSEEXTRA 1
; VAR FUSALLLATE 1
; VAR MODLIB /actel/modlib.lib
; ENDHEADER
```

| | | | | | | |
|---|---|---|---|---|---|---|
| X03110b0b0b1012 | X03190b0b08191a | X031b0b0b100b20 | X03270b09092627 | X0b060b0204002b | X0b0d0b0704002b | X0b170b0004002b |
| X0b110b010b1012 | X0b1a0b0308191a | X0b120b07100b20 | X0b270b07092627 | X0b060b0404002b | X0b0e0b0304002b | X0b170b0204002b |
| X0b120b030b1012 | X0b1a0b0508191a | X0b140b01100b20 | X03230b0801222b | X0b060b0504002b | X0b0e0b0504002b | X0b170b0304002b |
| X03110b09131112 | X03170b080c111a | X0b190b06100b20 | X0b230b0701222b | X0b070b0004002b | X0b0e0b0704002b | X0b180b0004002b |
| X0b110b06131112 | X0b140b070c111a | X0b1b0b05100b20 | X0b250b0701222b | X0b070b0504002b | X0b0f0b0104002b | X0b180b0204002b |
| X0b120b06131112 | X0b150b070c111a | X0b1b0b07100b20 | X0b280b0701222b | X0b070b0604002b | X0b0f0b0204002b | X0b190b0004002b |
| X030c0b0b050c0f | X0b170b070c111a | X0b1f0b01100b20 | X0b170b0603002b | X0b080b0404002b | X0b0f0b0304002b | X0b190b0204002b |
| X0b0f0b07050c0f | X0b190b070c111a | X03040b0a06000a | X0b180b0603002b | X0b080b0504002b | X0b0f0b0504002b | X0b190b0304002b |
| X03130b0b061113 | X03060b0c12060f | X0b040b0106000a | X0b000b0004002b | X0b080b0604002b | X0b0f0b0604002b | X0b1b0b0304002b |
| X0b110b03061113 | X0b0f0b0412060f | X0b080b0306000a | X0b000b0104002b | X0b080b0704002b | X0b100b0004002b | X0b1b0b0404002b |
| X0b120b01061113 | X03160b0801101b | X0b090b0106000a | X0b000b0204002b | X0b090b0304002b | X0b100b0104002b | X0b1c0b0304002b |
| X030d0b09060d0c | X0b100b0701101b | X0b0a0b0606000a | X0b000b0304002b | X0b090b0404002b | X0b100b0204002b | X0b1c0b0404002b |
| X0b0e0b06060d0c | X0b110b0701101b | X03080b0a0b0009 | X0b010b0004002b | X0b090b0504002b | X0b100b0304002b | X0b1c0b0604002b |
| X03140b0b131314 | X0b160b0701101b | X0b050b030b0009 | X0b010b0104002b | X0b090b0704002b | X0b100b0504002b | X0b1c0b0704002b |
| X0b130b01131314 | X0b180b0701101b | X0b070b010b0009 | X0b010b0504002b | X0b0a0b0104002b | X0b100b0604002b | X0b1d0b0304002b |
| X03150b0b081516 | X031b0b0c071a1b | X0b090b060b0009 | X0b020b0004002b | X0b0a0b0204002b | X0b110b0004002b | X0b1d0b0404002b |
| X0b160b03081516 | X0b1a0b07071a1b | X03030b0c0c0003 | X0b020b0104002b | X0b0a0b0304002b | X0b110b0204002b | X0b1d0b0604002b |
| X03100b0b180c16 | X03050b0c100506 | X0b020b070c0003 | X0b020b0204002b | X0b0a0b0504002b | X0b110b0504002b | X0b1d0b0704002b |
| X0b130b00180c16 | X0b060b07100506 | X031a0b08111721 | X0b020b0404002b | X0b0a0b0704002b | X0b120b0204002b | X0b1e0b0304002b |
| X03100b09080a14 | X031c0b0c081b1c | X0b1a0b06111721 | X0b020b0504002b | X0b0b0b0104002b | X0b120b0504002b | X0b1e0b0404002b |
| X0b0d0b01080a14 | X0b1c0b01081b1c | X0b1b0b06111721 | X0b030b0104002b | X0b0b0b0204002b | X0b130b0204002b | X0b1e0b0604002b |
| X0b0e0b01080a14 | X03040b0b0c0405 | X0b200b06111721 | X0b030b0204002b | X0b0b0b0304002b | X0b130b0404002b | X0b1f0b0004002b |
| X030a0b0c180a0b | X0b050b010c0405 | X0b210b06111721 | X0b030b0504002b | X0b0b0b0504002b | X0b130b0504002b | X0b1f0b0204002b |
| X0b0a0b04180a0b | X030f0b0b000c1d | X03200b0b182021 | X0b030b0704002b | X0b0b0b0604002b | X0b130b0604002b | X0b1f0b0304002b |
| X0b0b0b04180a0b | X0b1a0b01000c1d | X0b200b01182021 | X0b040b0404002b | X0b0b0b0704002b | X0b130b0704002b | X0b1f0b0404002b |
| X03180b0b0d1618 | X0b1b0b01000c1d | X0b210b05182021 | X0b040b0504002b | X0b0c0b0004002b | X0b140b0004002b | X0b1f0b0704002b |
| X0b160b010d1618 | X03130b09020c1f | X03230b0b002123 | X0b040b0604002b | X0b0c0b0104002b | X0b140b0204002b | X0b200b0404002b |
| X0b170b010d1618 | X0b120b00020c1f | X0b210b07002123 | X0b040b0704002b | X0b0c0b0204002b | X0b140b0304002b | X0b200b0704002b |
| X0b180b030d1618 | X0b140b06020c1f | X03220b0b182223 | X0b050b0004002b | X0b0c0b0304002b | X0b150b0004002b | X0b210b0004002b |
| X03080b0b0c0810 | X0b190b01020c1f | X0b230b01182223 | X0b050b0204002b | X0b0c0b0504002b | X0b150b0104002b | X0b210b0204002b |
| X0b0c0b070c0810 | X0b1a0b00020c1f | X03230b09102324 | X0b050b0404002b | X0b0c0b0604002b | X0b150b0204002b | X0b220b0004002b |
| X03080b0c180809 | X0b1b0b00020c1f | X0b230b00102324 | X0b050b0504002b | X0b0d0b0004002b | X0b150b0304002b | X0b220b0104002b |
| X0b080b00180809 | X0b1c0b07020c1f | X0b240b00102324 | X0b050b0604002b | X0b0d0b0204002b | X0b150b0604002b | X0b220b0204002b |
| X0b090b00180809 | X0b1f0b06020c1f | X03250b0b112526 | X0b050b0704002b | X0b0d0b0304002b | X0b160b0004002b | X0b220b0304002b |
| X03070b0b100708 | X031f0b09071e1f | X0b250b01112526 | X0b060b0004002b | X0b0d0b0404002b | X0b160b0204002b | X0b220b0404002b |
| X0b080b01100708 | X0b1e0b00071e1f | X0b260b05112526 | X0b060b0104002b | X0b0d0b0604002b | X0b160b0604002b | X0b220b0504002b |
| X0b220b0604002b | X0b1e0b050c002b | X0b170a03081718 | X0b050a0009000b | X0b010a0404002b | X0b170a0204002b | X03210a0c05122b |
| X0b220b0704002b | X0b1f0b050c002b | X0b180a03081718 | X0b050a0109000b | X0b020a0404002b | X0b170a0504002b | X0b130a0605122b |
| X0b230b0504002b | X0b200b020c002b | X030e0a090e0810 | X0b090a0109000b | X0b020a0604002b | X0b170a0604002b | X0b140a0105122b |
| X0b230b0604002b | X0b200b030c002b | X0b080a000e0810 | X03030a090b0009 | X0b020a0704002b | X0b170a0704002b | X0b160a0105122b |
| X0b240b0104002b | X0b210b030c002b | X0b0c0a020c0810 | X0b020a050b0009 | X0b030a0404002b | X0b180a0204002b | X0b180a0105122b |
| X0b240b0304002b | X0b210b040c002b | X0b0a0a040c0810 | X0b030a010b0009 | X0b030a0504002b | X0b180a0604002b | X0b1b0a0105122b |
| X0b240b0504002b | X0b230b020c002b | X03090a0c180809 | X0a040a000b0009 | X0b030a0704002b | X0b180a0704002b | X0b1d0a0105122b |
| X0b250b0004002b | X0b230b040c002b | X0b080a04180809 | X0b060a020b0009 | X0b040a0204002b | X0b190a0204002b | X03150a0a06142b |
| X0b250b0204002b | X0b240b020c002b | X0b090a00180809 | X0b090a030b0009 | X0b040a0704002b | X0b190a0504002b | X0b160a0506142b |
| X0b260b0004002b | X0b240b040c002b | X03070a09100708 | X030f0a0b0d0013 | X0b050a0204002b | X0b190a0604002b | X0b1a0a0706142b |
| X0b260b0204002b | X0b250b030c002b | X0b070a01100708 | X0b060a070d0013 | X0b050a0504002b | X0b190a0704002b | X0b1d0a0606142b |
| X0b270b0104002b | X0b250b040c002b | X0b080a03100708 | X0b0b0a010d0013 | X0b050a0704002b | X0b1a0a0004002b | X0b200a0606142b |
| X0b270b0404002b | X0b260b030c002b | X03190a090e111a | X0b0c0a010d0013 | X0b060a0104002b | X0b1a0a0204002b | X0b210a0106142b |
| X0b270b0504002b | X0b260b040c002b | X0b140a030e111a | X0b0f0a060d0013 | X0b060a0304002b | X0b1a0a0404002b | X03210a0908212b |
| X0b280b0004002b | X0b270b020c002b | X0b190a030e111a | X0b120a010d0013 | X0b060a0404002b | X0b1a0a0504002b | X0b270a0108212b |
| X0b280b0104002b | X0b270b060c002b | X03090a0b12060f | X0b130a010d0013 | X0b060a0604002b | X0b1a0a0604002b | X032b0a040a002b |
| X0b280b0204002b | X0b280b040c002b | X0b0d0a0412060f | X03020a0c0e0003 | X0b070a0004002b | X0b1b0a0004002b | X0b010a070a002b |
| X0b280b0504002b | X0b280b060c002b | X0b0d0a0512060f | X0b020a030e0003 | X0b070a0404002b | X0b1b0a0204002b | X0b230a070a002b |
| X0b290b0004002b | X0b290b040c002b | X0b0e0a0112060f | X030b0a0b110011 | X0b070a0504002b | X0b1b0a0404002b | X0b260a070a002b |
| X0b290b0104002b | X0b290b060c002b | X031a0a0a01101b | X0b080a02110011 | X0b070a0704002b | X0b1b0a0604002b | X03180a0a0b162b |
| X0b290b0204002b | X0b2a0b060c002b | X0b100a0001101b | X03000a05120002 | X0b080a0504002b | X0b1b0a0704002b | X0b180a050b162b |
| X0b290b0504002b | X0b2b0b090c002b | X0b140a0001101b | X0b010a05120002 | X0b080a0704002b | X0b1c0a0204002b | X0b1a0a010b162b |
| X0b2a0b0004002b | X0b2b0b0a0c002b | V021c0a00 | X030c0a0a13000d | X0b090a0404002b | X0b1c0a0504002b | X0a1d0a000b162b |
| X0b2a0b0104002b | X0b2b0b0b0c002b | X031a0a09181a1c | X0a030a0013000d | X0b090a0504002b | X0b1c0a0704002b | X0a200a000b162b |
| X0b2a0b0504002b | X0b2b0b0c0c002b | X0a1c0a00181a1c | X0b050a0613000d | X0b090a0704002b | X0b1d0a0204002b | X0b010a060c002b |
| X03240b0a08212b | X031f0b0c0e1e2b | V02040a00 | X0b0a0a0713000d | X0b0e0a0104002b | X0b1d0a0704002b | X0b020a020c002b |
| X0b230b0308212b | X0b200b050e1e2b | V021d0a00 | X031f0a0b011f21 | X0b0e0a0304002b | X0b1e0a0204002b | X0b030a020c002b |
| X0b240b0608212b | X0b210b010e1e2b | X03060a0c080406 | X0b1f0a00011f21 | X0b0e0a0504002b | X0b1e0a0504002b | X0b040a040c002b |
| X0b250b0608212b | X0b250b050e1e2b | X0b040a03080406 | X0b210a00011f21 | X0b0b0a0204002b | X0b1e0a0604002b | X0b050a040c002b |
| X0b260b0608212b | X0b260b010e1e2b | X031d0a0a000e1d | X03170a0a111721 | X0b0b0a0304002b | X0b1e0a0704002b | X0b060a050c002b |
| X0b010b060c002b | X03240b0b0f1a2b | X0b110a00000e1d | X0b1b0a05111721 | X0b0b0a0704002b | X0b1f0a0204002b | X0b070a060c002b |
| X0b020b060c002b | X0b1a0b040f1a2b | X0b150a00000e1d | X0b1c0a06111721 | X0b0c0a0304002b | X0b1f0a0504002b | X0b090a020c002b |
| X0b030b040c002b | X0b1b0b020f1a2b | X031d0a0b071e1d | X0b200a07111721 | X0b0c0a0404002b | X0b1f0a0704002b | X0b0c0a020c002b |
| X0b030b060c002b | X03250b0818242b | X0b1d0a05071e1d | X0b210a07111721 | X0b0c0a0604002b | X0b200a0204002b | X0b0d0a020c002b |
| X0b040b020c002b | X0b240b0718242b | V02030a00 | X03200a0c182021 | X0b0c0a0704002b | X0b200a0504002b | X0b0d0a030c002b |
| X0b040b030c002b | X0b260b0718242b | V021e0a00 | X0b200a01182021 | X0b0e0a0204002b | X0b210a0204002b | X0b0d0a060c002b |
| X0b060b060c002b | X0b290b0718242b | X03040a0c120305 | V02230a00 | X0b0e0a0504002b | X0b210a0504002b | X0b0e0a000c002b |
| X0b070b030c002b | X03100a09051011 | X0b030a06120305 | V02240a00 | X0b0f0a0504002b | X0b210a0604002b | X0b0e0a030c002b |
| X0b080b020c002b | X0b100a01051011 | X031e0a09081d1e | X03220a0c112224 | X0b0f0a0704002b | X0b220a0204002b | X0b0c0a040c002b |
| X0b090b020c002b | V020f0a00 | X0b1e0a01081d1e | X0b220a07112224 | X0b100a0204002b | X0b220a0304002b | X0b0f0a020c002b |
| X0b0c0b040c002b | V02130a00 | X031b0a0a020c1f | X0b230a01112224 | X0b100a0504002b | X0b230a0204002b | X0b0f0a030c002b |
| X0b0d0b050c002b | X030e0a0c050e0f | X0b160a00020c1f | X0b240a07112224 | X0b100a0604002b | X0b230a0304002b | X0b0f0a040c002b |
| X0b0e0b000c002b | X0a0f0a00050e0f | X0b170a00020c1f | X03250a09112526 | X0b100a0704002b | X0b230a0604002b | X0b100a030c002b |
| X0b0e0b020c002b | X03120a09111213 | X031c0a0913151f | X0b250a00112526 | X0b110a0104002b | X0b240a0204002b | X0b100a040c002b |
| X0b0e0b040c002b | X0b120a05111213 | X0b160a0313151f | X0b260a00112526 | X0b110a0204002b | X0b240a0304002b | X0b110a040c002b |
| X0b100b040c002b | X0b130a05111213 | X0b1c0a0313151f | V02270a00 | X0b110a0304002b | X0b240a0604002b | X0b130a040c002b |
| X0b110b040c002b | X03130a09131314 | V02200a00 | X03280a09152628 | X0b110a0504002b | X0b250a0204002b | X0b140a040c002b |
| X0b120b040c002b | X0b140a05131314 | X031c0a0a100b20 | X0a270a00152628 | X0b110a0604002b | X0b250a0304002b | X0b150a040c002b |
| X0b130b030c002b | X03150a090b1315 | X0b180a00100b20 | X03220a0801222b | X0b110a0704002b | X0b250a0604002b | X0b160a040c002b |
| X0b140b040c002b | X0b130a020b1315 | X0b190a00100b20 | X0b220a0501222b | X0b120a0004002b | X0b260a0204002b | X0b170a040c002b |
| X0b140b050c002b | X0b150a030b1315 | X03080a0a01000f | X0b230a0501222b | X0b120a0204002b | X0b260a0304002b | X0b180a040c002b |
| X0b150b040c002b | V020b0a00 | X0b030a0301000f | X0b240a0501222b | X0b120a0304002b | X0b260a0604002b | X0b190a040c002b |

| | | | | | | |
|---|---|---|---|---|---|---|
| X0b150b050c002b | X030b0a09060b0c | X0b050a0301000f | X0b250a0501222b | X0b120a0404002b | X0b270a0204002b | X0b1a0a030c002b |
| X0b160b040c002b | X0b0b0a05060b0c | X0b070a0301000f | X0b260a0501222b | X0b120a0604002b | X0b270a0504002b | X0b1c0a040c002b |
| X0b160b050c002b | X0b0c0a05060b0c | X0b080a0101000f | X03260a0902262b | X0b120a0704002b | X0b270a0604002b | X0b1d0a030c002b |
| X0b170b040c002b | X03160a0b180c16 | X030b0a0c05000b | X0b280a0002262b | X0b130a0304002b | X0b270a0704002b | X0b1d0a040c002b |
| X0b170b050c002b | X0b0c0a00180c16 | X0b020a0105000b | X0b290a0002262b | X0b130a0704002b | X0b280a0204002b | X0b1e0a030c002b |
| X0b180b040c002b | X0b0d0a00180c16 | X0b040a0105000b | X0b080a0603002b | X0b140a0204002b | X0b280a0504002b | X0b1e0a040c002b |
| X0b180b050c002b | X0b0d0a07180c16 | X0b0b0a0405000b | X0b090a0603002b | X0b140a0604002b | X0b280a0604002b | X0b1f0a030c002b |
| X0b190b040c002b | X0b0e0a07180c16 | X030a0a0a06000a | X0b0a0a0603002b | X0b140a0704002b | X0b280a0704002b | X0b1f0a040c002b |
| X0b190b050c002b | V020a0a00 | X0b020a0006000a | X0b0b0a0603002b | X0b150a0204002b | X0b290a0104002b | X0b1f0a060c002b |
| X0b1a0b020c002b | X030a0a0b080a14 | X0b060a0006000a | X0b0c0a0603002b | X0b150a0504002b | X0b290a0204002b | X0b200a030c002b |
| X0b1c0b020c002b | X0b0d0a01080a14 | X03000a04080003 | X0b000a0004002b | X0b150a0604002b | X0b290a0604002b | X0b200a040c002b |
| X0b1c0b050c002b | X030c0a0b0b0a0c | X0b010a03080003 | X0b000a0104002b | X0b150a0704002b | X0b2a0a0004002b | X0b210a030c002b |
| X0b1d0b020c002b | X0a0a0a000b0a0c | X03050a0909000b | X0b000a0204002b | X0b160a0204002b | X0b2a0a0104002b | X0b210a040c002b |
| X0b1d0b050c002b | X0a0b0a000b0a0c | X0b040a0509000b | X0b000a0304002b | X0b160a0604002b | X0b2a0a0404002b | X0b220a040c002b |
| X0b1e0b020c002b | X03170a09081718 | X0b040a0609000b | X0b010a0004002b | X0b160a0704002b | X0b2b0a0a04002b | X0b220a060c002b |
| X0b230a040c002b | X03180909071819 | X0b170906100b20 | X0b03090004002b | X0b15090704002b | X0b2b090a04002b | X0b100801060f10 |
| X0b240a040c002b | X0b180901071819 | X0b180906100b20 | X0b03090504002b | X0b16090004002b | X0314090b06142b | X0311080b131112 |
| X0b250a040c002b | X0b190903071819 | X0b190906100b20 | X0b04090004002b | X0b16090504002b | X0b1f090606142b | X0b110803131112 |
| X0b260a040c002b | V021a0901 | X0b1b0906100b20 | X0b04090204002b | X0b17090004002b | X0b26090406142b | X0b110805131112 |
| X0b270a030c002b | X0307090b100708 | X0b1c0906100b20 | X0b04090504002b | X0b17090204002b | X0b27090606142b | X0b120801131112 |
| X0b270a040c002b | X0b070900100708 | V02210901 | X0b05090504002b | X0b17090404002b | X0a28090106142b | X030f080a050e0f |
| X0b280a030c002b | X031a090c0e111a | X03020909080003 | X0b05090704002b | X0b17090504002b | X0320090907202b | X0b0e0802050e0f |
| X0b280a040c002b | X0b1209010e111a | X0b020901080003 | X0b06090104002b | X0b17090704002b | X0b24090407202b | X0b0f0800050e0f |
| X0b290a040c002b | X0306090a0e0607 | X0b030901080003 | X0b06090304002b | X0b18090404002b | X0b28090607202b | X030e0809130e10 |
| X0b2a0a060c002b | X0b0609020e0607 | X0308090a0b0009 | X0b06090404002b | X0b18090504002b | X0322090b08212b | X0b100800130e10 |
| X0b2b0a0b0c002b | X0b0709010e0607 | X0b0209030b0009 | X0b06090504002b | X0b18090704002b | X0b22090608212b | V020d0800 |
| X0b2b0a0c0c002b | X0308090912060f | X0b0309030b0009 | X0b06090704002b | X0b19090004002b | X0b24090608212b | X030c080b050c0d |
| X03270a0a0f1a2b | X0b060906120 60f | X0b0409030b0009 | X0b07090404002b | X0b19090504002b | X0b25090608212b | X0b0c0803050c0d |
| X0b1b0a030f1a2b | X0b080903120 60f | X0b0509030b0009 | X0b07090504002b | X0b1a090204002b | X0324090b0a002b | X0b0c0805050c0d |
| X03180a0814182b | X0b0d090012060f | X0b0809010b0009 | X0b08090004002b | X0b1a090304002b | X0a0f09010a002b | X0b0d0801050c0d |
| X0b220a0014182b | V021c0901 | X030009060e0003 | X0b08090204002b | X0b1a090604002b | X0b0409040c002b | X030c0809090c0c |
| X0b250a0714182b | X0305090b000507 | X0b0109030e0003 | X0b08090404002b | X0b1b090204002b | X0b0509020c002b | X0b0d0804090c0c |
| X0b260a0114182b | X0b070907000507 | X03000905100004 | X0b08090504002b | X0b1b090504002b | X0b0509040c002b | X0b0e0801090c0c |
| X03290a0c15292b | X03060909100506 | X0b010904100004 | X0b09090104002b | X0b1c090204002b | X0b0709020c002b | X0313080b0b1315 |
| X0b2b0a0915292b | X0b050900100506 | X03000907120002 | X0b09090304002b | X0b1c090504002b | X0b0709030c002b | X0b1308030b1315 |
| X0310090a051011 | X0b060900100506 | X0b010905120002 | X0b09090404002b | X0b1d090204002b | X0b0b09020c002b | X0b1508040b1315 |
| X0b100900051011 | X031b0909081b1c | X0320090b111721 | X0b09090504002b | X0b1d090504002b | X0b0b09030c002b | X0315080b081516 |
| X0b110900051011 | X0b1b0901081b1c | X0b1a0904111721 | X0b09090604002b | X0b1e090204002b | X0b0c09020c002b | X0b150802081516 |
| V020f0901 | X0b1c0903081b1c | X0b1b0904111721 | X0b09090704002b | X0b1e090504002b | X0b0d09020c002b | X0b150803081516 |
| X030f0909060f10 | X03050909080406 | X0b1c0904111721 | X0b0a090004002b | X0b1f090304002b | X0b0d09050c002b | X030a0809080a14 |
| X0b0f0903060f10 | X0b040907080406 | X0b1d0904111721 | X0b0a090204002b | X0b1f090704002b | X0b0e09020c002b | X03140808080a14 |
| X0b0f0905060f10 | X030409090e0405 | X0b1e0904111721 | X0b0a090404002b | X0b20090304002b | X0b0f09020c002b | X0317080b071617 |
| X0b100901060f10 | X0b0409010e0405 | V02220901 | X0b0a090504002b | X0b20090404002b | X0b1009020c002b | X0b170803071617 |
| X0312090c131112 | X0b0509010e0405 | X0320090a022022 | X0b0a090604002b | X0b20090604002b | X0b1009030c002b | X0b170804071617 |
| X0b110901131112 | X0316090b000e1d | X0b200902022022 | X0b0a090704002b | X0b20090704002b | X0b1109020c002b | X0309080a10090a |
| V02130901 | X0b140903000e1d | X0b220902022022 | X0b0b090404002b | X0b21090004002b | X0b1109030c002b | X0b0a080010090a |
| X030e090a050e0f | X0a150901000e1d | V02240901 | X0b0b090504002b | X0b21090204002b | X0b1209020c002b | X030a080b00080a |
| X0b0e0900050e0f | X0b160903000e1d | X0323090a102324 | X0b0b090704002b | X0b21090304002b | X0b1209030c002b | X0b08080700080a |
| X0b0f0900050e0f | X0a170901000e1d | X0b230902102324 | X0b0c090304002b | X0b21090604002b | X0b1309020c002b | X030c080c0e0810 |
| X0312090a111213 | X0b180903000e1d | X0b240902102324 | X0b0c090404002b | X0b22090304002b | X0b1809020c002b | X0b0908070e0810 |
| X0b120900111213 | X0a190901000e1d | V02250901 | X0b0c090704002b | X0b22090504002b | X0b1a09050c002b | X0308080c180809 |
| X0b130900111213 | X0b1b0903000e1d | X0321090a151c25 | X0b0d090704002b | X0b22090704002b | X0b1d09030c002b | X0b090801180809 |
| X03130909131314 | X0a1c0901000e1d | X0a220901151c25 | X0b0d090304002b | X0b23090104002b | X0b1e09030c002b | X0318080b071819 |
| X0b130905131314 | X031d0908071c1d | X0b230906151c25 | X0b0d090404002b | X0b23090304002b | X0b1f09050c002b | X0b180800071819 |
| V020c0901 | X0b1d0907071c1d | X0a250901151c25 | X0b0d090604002b | X0b23090404002b | X0b2009050c002b | X0b180803071819 |
| V02150901 | X031d0909081d1e | X0325090a112526 | X0b0d090704002b | X0b23090504002b | X0b2109040c002b | V02070800 |
| X031409090d1415 | X0b1d0901081d1e | X0b250902112526 | X0b0e090104002b | X0b23090704002b | X0b2109050c002b | V021a0800 |
| X0b1409010d1415 | X0b1e0901081d1e | X0b260902112526 | X0b0e090304002b | X0b24090304002b | X0b2709050c002b | X031308090e111a |
| X0b1509030d1415 | V021f0901 | V02270901 | X0b0e090404002b | X0b24090504002b | X0b2809020c002b | X0b1408010e111a |
| X030b090a060b0c | X031a090b020c1f | X0327090a092627 | X0b0e090504002b | X0b24090704002b | X0b2809050c002b | X0b1508000e111a |
| X0b0b0900060b0c | X031a0908020c1f | X0b270902092627 | X0b0e090604002b | X0b25090304002b | X0b2909020c002b | X0b1708000e111a |
| X0b0c0900060b0c | X0b120906020c1f | V02280901 | X0b0e090704002b | X0b25090404002b | X0b2909060c002b | X0b1808060e111a |
| V02170901 | X0b130906020c1f | X0327090901222b | X0b0f090404002b | X0b25090504002b | X0b2a09060c002b | V02060800 |
| X030d090a080a14 | X0b1d0906020c1f | X0b22090401222b | X0b0f090704002b | X0b25090704002b | X0b2b090b0c002b | V021b0800 |
| X0b110906080a14 | X0b1e0906020c1f | X0b02090603002b | X0b10090404002b | X0b26090104002b | X0b2b090c0c002b | X0306080b0e0607 |
| X030c09090b0a0c | X031e0909071e1f | X0b03090603002b | X0b10090504002b | X0b26090304002b | X0321090c0e1e2b | X0b0608030e0607 |
| X0b0a09030b0a0c | X0b1f0902071e1f | X0b04090603002b | X0b10090704002b | X0b26090504002b | X0b1f09000e1e2b | X0b0608050e0607 |
| X0b0c09050b0a0c | X031d090b13151f | X0b05090603002b | X0b11090404002b | X0b26090704002b | X0b2209000e1e2b | X0b0708010e0607 |
| X030b090c180a0b | X0b1a090713151f | X0b07090603002b | X0b11090504002b | X0b27090304002b | X0b2409000e1e2b | X030c080a12060f |
| X0b0b0901180a0b | X0b1b090713151f | X0b08090603002b | X0b11090704002b | X0b27090404002b | X0b2609000e1e2b | X0b0b080212060f |
| X03160909071617 | X0b1c090713151f | X0b0b090603002b | X0b12090404002b | X0b27090704002b | X0329090a15292b | X0b0c080012060f |
| X0b160901071617 | X0b1e090713151f | X0b0c090603002b | X0b12090504002b | X0b28090304002b | X0b29090015292b | X0b0e080712060f |
| X0b170903071617 | X031d090c181d1f | X0b0f090603002b | X0b12090704002b | X0b28090404002b | X0320090817002b | V02050800 |
| X0309090b02090b | X0a1f0901181d1f | X0b10090603002b | X0b13090304002b | X0b28090704002b | X0a01090117002b | V021c0800 |
| X0b09090002090b | V02010901 | X0b00090004002b | X0b13090404002b | X0b29090104002b | X0b01090717002b | X0305080a100506 |
| X0309090910090a | V02200901 | X0b00090104002b | X0b13090704002b | X0b29090404002b | X0b18090017002b | X0b050802100506 |
| X0b0a090110090a | X031f0909081f20 | X0b00090204002b | X0b14090004002b | X0b29090504002b | X0b21090717002b | X0b060802100506 |
| V02190901 | X0b1f0904081f20 | X0b00090304002b | X0b14090504002b | X0b29090704002b | X0a24090117002b | X031c0808181a1c |
| X030b09080e0810 | X031e090b100b20 | X0b01090204002b | X0b15090004002b | X0b2a090004002b | X0b26090617002b | X0b1a0806181a1c |
| X0b0809070e0810 | X0b140906100b20 | X0b01090604002b | X0b15090204002b | X0b2a090104002b | X030f080b060f10 | X0b1b0806181a1c |
| X0309090c180809 | X0b150906100b20 | X0b02090004002b | X0b15090404002b | X0b2a090504002b | X0b0f0803060f10 | V021d0800 |
| X0b090902180809 | X0b160906100b20 | X0b02090504002b | X0b15090504002b | X0b2b090904002b | X0b0f0805060f10 | X0304080b0e0405 |
| X0b0408030e0405 | X0326080a092627 | X0b0f080704002b | X0b21080104002b | X0b1708060c002b | V020a0701 | X0b170706100b20 |
| X0b0408050e0405 | X0b260800092627 | X0b10080504002b | X0b21080204002b | X0b1808010c002b | X0310070b080a14 | X0b180706100b20 |
| X0b0508010e0405 | X0b270802092627 | X0b10080704002b | X0b21080304002b | X0b1808020c002b | X0b0a0706080a14 | X0305070b070015 |
| V021e0800 | X0327080c102527 | X0b11080404002b | X0b21080404002b | X0b1908060c002b | X0b0c0705080a14 | X0b040703070015 |
| X03030809120305 | X0b260807102527 | X0b11080704002b | X0b21080604002b | X0b1c08030c002b | X0b0f0703080a14 | X0b050701070015 |
| X0b040806120305 | V02280800 | X0b12080504002b | X0b22080104002b | X0b1f08050c002b | X0b100701080a14 | X0b070707070015 |

X031e080c011c1e
X0b1c0806011c1e
X0b1d0806011c1e
X0b1e0806011c1e
V02010800
V02200800
X031f080e081f20
X0b1f0800081f20
X0b200802081f20
X0313080a100b20
X0b0b0807100b20
X0b0e0804100b20
X0b120802100b20
X0b130800100b20
X030a080806000a
X0b05080606000a
X0b06080606000a
X0b0a080206000a
X0312080b070015
X0b0a0801070015
X0b0b0801070015
X0b0b0804070015
X030108090b0009
X030808080b0009
X030d08090d0013
X0b0408010d0013
X0b0608010d0013
X0b0b08000d0013
X0b0c08010d0013
X0b0e08000d0013
X0b0f08010d0013
X0b1108010d0013
X0b1208000d0013
X0304080a110011
X03100808110011
X0b0d0806110011
X03000804120002
X0b010804120002
X0311080a140017
X0b0a0806140017
X0b100804140017
X0b110800140017
X03210808111721
X0a1a0800111721
X0a1c0800111721
X0b1f0807111721
V02230800
X031f080b091b23
X0a1b0800091b23
X0a1d0800091b23
X0a1e0800091b23
X0322080a182223
X0b220800182223
X0b230802182223
V02250800
X0324080a092425
X0b240800092425
X0b250802092425
X0326080c002426
X0b240807002426
V02270800

X0327080b152628
X0a280800152628
X0329080a02262b
X0b26080102262b
X0b27080102262b
X0b29080302262b
X0b0b080603002b
X0b0c080603002b
X0b0e080603002b
X0b0f080603002b
X0b10080603002b
X0b11080603002b
X0b12080603002b
X0b13080603002b
X0b28080603002b
X0b29080603002b
X0b00080004002b
X0b00080104002b
X0b00080204002b
X0b00080304002b
X0b01080104002b
X0b01080204002b
X0b01080604002b
X0b02080004002b
X0b02080104002b
X0b02080404002b
X0b03080004002b
X0b03080104002b
X0b03080404002b
X0b04080004002b
X0b04080204002b
X0b04080404002b
X0b04080704002b
X0b05080404002b
X0b05080504002b
X0b05080704002b
X0b06080404002b
X0b06080704002b
X0b07080204002b
X0b07080504002b
X0b07080604002b
X0b07080704002b
X0b08080004002b
X0b08080204002b
X0b08080504002b
X0b08080604002b
X0b09080004002b
X0b09080204002b
X0b09080304002b
X0b09080404002b
X0b09080604002b
X0b0a080404002b
X0b0a080504002b
X0b0a080704002b
X0b0b080504002b
X0b0c080404002b
X0b0c080704002b
X0b0d080504002b
X0b0d080704002b
X0b0e080504002b
X0b0f080404002b

X0b12080704002b
X0b13080404002b
X0b13080504002b
X0b13080704002b
X0b14080004002b
X0b14080304002b
X0b14080404002b
X0b14080504002b
X0b14080704002b
X0b15080504002b
X0b15080704002b
X0b16080004002b
X0b16080104002b
X0b16080304002b
X0b16080404002b
X0b16080504002b
X0b17080204002b
X0b17080504002b
X0b17080704002b
X0b18080404002b
X0b18080504002b
X0b18080704002b
X0b19080004002b
X0b19080104002b
X0b19080304002b
X0b19080404002b
X0b19080504002b
X0b1a080104002b
X0b1a080204002b
X0b1a080304002b
X0b1a080404002b
X0b1a080504002b
X0b1a080704002b
X0b1b080104002b
X0b1b080204002b
X0b1b080404002b
X0b1c080204002b
X0b1c080404002b
X0b1c080504002b
X0b1c080704002b
X0b1d080104002b
X0b1d080204002b
X0b1d080304002b
X0b1d080404002b
X0b1d080504002b
X0b1d080704002b
X0b1e080104002b
X0b1e080204002b
X0b1e080304002b
X0b1e080404002b
X0b1e080504002b
X0b1e080704002b
X0b1f080104002b
X0b1f080304002b
X0b1f080404002b
X0b20080104002b
X0b20080304002b
X0b20080404002b
X0b20080504002b
X0b20080704002b
X0b21080004002b

X0b22080304002b
X0b22080404002b
X0b23080104002b
X0b23080404002b
X0b24080404002b
X0b24080504002b
X0b25080404002b
X0b25080504002b
X0b25080704002b
X0b26080304002b
X0b26080404002b
X0b27080404002b
X0b27080504002b
X0b27080704002b
X0b28080104002b
X0b28080304002b
X0b28080504002b
X0b28080704002b
X0b29080404002b
X0b29080504002b
X0b29080704002b
X0b2a080004002b
X0b2a080104002b
X0b2a080404002b
X0b2b080904002b
X0b2b080a04002b
X0b2b080c04002b
X0328080b09282b
X0b29080109282b
X0320080c0a002b
X0a0108000a002b
X0b1908070a002b
X0b1c08010a002b
X0b2108070a002b
X0b2208070a002b
X0b0208060c002b
X0b0308060c002b
X0b0508030c002b
X0b0708030c002b
X0b0708040c002b
X0b0808030c002b
X0b0808040c002b
X0b0908050c002b
X0b0a08030c002b
X0b0b08030c002b
X0b0c08020c002b
X0b0d08020c002b
X0b0d08030c002b
X0b0e08030c002b
X0b0f08020c002b
X0b1008030c002b
X0b1108020c002b
X0b1208030c002b
X0b1308010c002b
X0b1308020c002b
X0b1408060c002b
X0b1508010c002b
X0b1508060c002b
X0b1608060c002b
X0b1608070c002b
X0b1708010c002b

X0b2108050c002b
X0b2208050c002b
X0b2608050c002b
X0a2908020c002b
X0b2a08060c002b
X0b2b080b0c002b
X031e080b0d1c2b
X0b1f08060d1c2b
X0b2008060d1c2b
X0b2208060d1c2b
X0b2308060d1c2b
X0b2408060d1c2b
X0b2508060d1c2b
X0b2608060d1c2b
X0b2708060d1c2b
X0328080c0e1e2b
X0b1f08020e1e2b
X0a2008000e1e2b
X0b2208020e1e2b
X0a2308000e1e2b
X0b2408020e1e2b
X0a2508000e1e2b
X0b2608020e1e2b
X0a2708000e1e2b
X0328080a10282b
X0b28080210282b
X0b28080410282b
X0b29080010282b
X0310080912102b
X0b10080212102b
X0b12080412102b
X0b24080112102b
X0324080818242b
X0b24080318242b
X0b25080318242b
X0b27080318242b
V02110701
V020f0701
X030e070c050e0f
X0b0e0700050e0f
X0311070c061113
X0b110702061113
X0b110704061113
X0b130703061113
X0312070c111213
X0b120702111213
X0b120704111213
V02140701
X030f070a0b0d0f
X0b0d07070b0d0f
X0b0f07050b0d0f
X0314070c131314
X0b140702131314
V020c0701
X0315070b0d1415
X0b1507020d1415
V020b0701
X03150709081516
X0b150704081516
X03110709180c16
X0b140703180c16

X030a070c180a0b
X0b0a0702180a0b
X0316070c071617
X0b160700071617
X0309070c10090a
X0b09070210090a
X03180709081718
X0b180704081718
V02080701
X030b070b0e0810
X0b0807070e0810
X0308070b180809
X0b090706180809
X0319070c071819
X0b190700071819
X0307070a100708
X0a080701100708
X0318070b09181a
X0b1e070209181a
X0312070b0e111a
X0b1107030e111a
X0b1207000e111a
X0b1207010e111a
X0b1807030e111a
V02060701
X030d070b12060f
X0b06070512060f
X0b07070012060f
X0b0b070012060f
X0b0c070312060f
X0b0d070112060f
X0310070c01101b
X0b10070201101b
X0b14070501101b
X0b18070201101b
X031b0709071a1b
X0b1a0704071a1b
V021c0701
X031b070c081b1c
X0b1b0700081b1c
V02040701
X030f070c000e1d
X0b0f0700000e1d
X0b170703000e1d
X031e070b071e1d
X0b1e0704071e1d
X031d0708081d1e
X0b1d0701081d1e
X0313070b020e1f
X0b1f0702020e1f
X0317070913151f
X0b15070713151f
X0b18070713151f
X0b1a070713151f
X0b1c070713151f
X0b1f070713151f
X0320070c081f20
X0b200700081f20
X03140708100b20
X0b130706100b20
X0b150706100b20

X0b0d0700070015
X0b110700070015
X0b110705070015
X0b150703070015
X0307070b0b0009
X0b0407050b0009
X0b0607030b0009
X0b0707010b0009
X0301070a180007
X03070708180007
X0321070b011f21
X0b1f0704011f21
X0317070b111721
X0b1c0702111721
X0321070a182021
X0b210707182021
X03220708022022
X0b200701022022
X0b210704022022
X0b220704022022
X0322070b102122
X0b220707102122
V02240701
V02250701
X0325070c092425
X0b250706092425
V02270701
X03270709092627
X0b270706092627
X0324070801222b
X0b24070501222b
X0b25070501222b
X0b27070501222b
X0b29070401222b
X0329070b02262b
X0b26070002262b
X0b04070603002b
X0b05070603002b
X0b06070603002b
X0b07070603002b
X0b0c070603002b
X0b0d070603002b
X0b0f070603002b
X0b10070603002b
X0b11070603002b
X0b12070603002b
X0b00070004002b
X0b00070104002b
X0b00070204002b
X0b00070304002b
X0b01070004002b
X0b01070104002b
X0b01070504002b
X0b02070004002b
X0b02070104002b
X0b02070504002b
X0b03070004002b
X0b03070104002b
X0b03070504002b
X0b04070004002b
X0b05070004002b

X0b05070504002b
X0b06070004002b
X0b07070404002b
X0b07070504002b
X0b08070304002b
X0b08070404002b
X0b08070604002b
X0b09070104002b
X0b09070304002b
X0b09070404002b
X0b09070504002b
X0b09070704002b
X0b0a070304002b
X0b0a070404002b
X0b0a070704002b
X0b0b070304002b
X0b0b070404002b
X0b0b070604002b
X0b0b070704002b
X0b0c070404002b
X0b0c070704002b
X0b0d070404002b
X0b0d070504002b
X0b0e070104002b
X0b0e070304002b
X0b0e070404002b
X0b0e070504002b

X0b1e070504002b
X0b1e070704002b
X0b1f070104002b
X0b1f070304002b
X0b1f070504002b
X0b1f070604002b
X0b20070404002b
X0b20070504002b
X0b20070704002b
X0b21070104002b
X0b21070204002b
X0b21070304002b
X0b21070504002b
X0b21070604002b
X0b22070104002b
X0b22070204002b
X0b22070304002b
X0b22070504002b
X0b22070604002b
X0b23070104002b
X0b23070404002b
X0b23070504002b
X0b23070704002b
X0b24070304002b
X0b24070404002b
X0b24070604002b
X0b24070704002b

X0b0507030c002b
X0b0707020c002b
X0b0707030c002b
X0b0807020c002b
X0b0807050c002b
X0b0907000c002b
X0b0a07000c002b
X0b0a07050c002b
X0b0b07020c002b
X0b0b07050c002b
X0b0c07020c002b
X0b0d07020c002b
X0b0d07030c002b
X0b0e07020c002b
X0b0f07020c002b
X0b1007000c002b
X0b1007030c002b
X0b1207030c002b
X0b1307000c002b
X0b1307010c002b
X0b1307020c002b
X0b1407060c002b
X0b1507010c002b
X0b1607020c002b
X0b1607050c002b
X0b1707010c002b
X0b1807010c002b

X0b28070118242b
X0b29070018242b
X0b2a070018242b
V02110600
X03110609051011
X0b100605051011
X0b110601051011
V02120600
X030c060c130e10
X0b100602130e10
V020d0600
V02140600
X030d060a060d0c
X0b0d0605060d0c
X0313060c091214
X0b130600091214
X0b140602091214
X03130609131314
X0b130602131314
X0a140600131314
V020e0600
X030d060c050e0d
X0b0e0606050e0d
X030b060c060b0c
X0a0c0600060b0c
X0315060c081516
X0b150604081516

X0b1b0607071a1b
X031a060c0d191b
X0b1a06040d191b
X0b1b06000d191b
X03060609100506
X0b050601100506
X0b060603100506
X031d060c000e1d
X03180608000e1d
X0b1c0602000e1d
X031e060c071e1d
X0b1c0604071e1d
X0b1d0600071e1d
X031c0608011c1e
X0b1d0607011c1e
X0b1e0600011c1e
X031f060b071e1f
X0b1f0607071e1f
X0317060913151f
X0b15060013151f
X0b18060013151f
X0b1a060013151f
X0b1c060013151f
X0b1f060013151f
X031d0608181d1f
X0b1d0601181d1f
X0b1e0607181d1f

X0b250607151c25
X0326060b112526
X0b260600112526
X0327060a092627
X0b270601092627
X0327060a102527
X0b250606102527
X0b260606102527
X0b270607102527
X0328060b152628
X0b270603152628
X0b270605152628
X0b15060603002b
X0b16060603002b
X0b18060603002b
X0b19060603002b
X0b1a060603002b
X0b1b060603002b
X0b1c060603002b
X0b1d060603002b
X0b1f060603002b
X0b20060603002b
X0b23060603002b
X0b24060603002b
X0b29060603002b
X0b2a060603002b
X0b00060104002b

X0b0c060104002b
X0b0c060204002b
X0b0c060304002b
X0b0c060504002b
X0b0c060704002b
X0b0d060204002b
X0b0d060304002b
X0b0d060604002b
X0b0d060704002b
X0b0e060104002b
X0b0e060404002b
X0b0f060104002b
X0b0f060304002b
X0b0f060404002b
X0b0f060504002b
X0b0f060704002b
X0b10060404002b
X0b10060704002b
X0b11060404002b
X0b11060504002b
X0b11060704002b
X0b12060404002b
X0b12060504002b
X0b12060704002b
X0b13060104002b
X0b13060304002b
X0b13060404002b

| | | | | | | |
|---|---|---|---|---|---|---|
| X0b0e070604002b | X0b25070304002b | X0b1907020c002b | X0b160600081516 | X0b1f0601181d1f | X0b00060204002b | X0b13060504002b |
| X0b0e070704002b | X0b25070704002b | X0b1907030c002b | X030e060b180c16 | X031f060c081f20 | X0b00060304002b | X0b13060704002b |
| X0b0f070404002b | X0b26070104002b | X0b1a07030c002b | X0b0e0606180c16 | X0b1f0604081f20 | X0b01060004002b | X0b14060104002b |
| X0b0f070704002b | X0b26070304002b | X0b1a07060c002b | X0b0f0606180c16 | X0b200600081f20 | X0b01060304002b | X0b14060304002b |
| X0b10070404002b | X0b26070404002b | X0b1b07020c002b | X0b110606180c16 | X0309060c06000a | X0b01060404002b | X0b14060404002b |
| X0b10070504002b | X0b26070504002b | X0b1b07060c002b | X0b120606180c16 | X0b07060706000a | X0b01060704002b | X0b14060504002b |
| X0b10070704002b | X0b26070604002b | X0b1c07050c002b | X030d060b080a14 | X0b08060106000a | X0b02060004002b | X0b14060704002b |
| X0b11070704002b | X0b26070704002b | X0b1d07020c002b | X0b0a0602080a14 | X0b09060106000a | X0b02060404002b | X0b15060304002b |
| X0b12070504002b | X0b27070304002b | X0b1d07050c002b | X0b0b0600080a14 | X0b0a060306000a | X0b02060704002b | X0b16060104002b |
| X0b12070704002b | X0b27070404002b | X0b1d07060c002b | X0b0e0600080a14 | X03140608070015 | X0b03060004002b | X0b16060304002b |
| X0b13070404002b | X0b28070004002b | X0b1e07030c002b | X0316060c091517 | X0b090606070015 | X0b03060104002b | X0b16060404002b |
| X0b13070504002b | X0b28070204002b | X0b1e07060c002b | X0b150602091517 | X0b0a0606070015 | X0b03060304002b | X0b17060004002b |
| X0b13070704002b | X0b28070404002b | X0b2007020c002b | X0b150607091517 | X0b100606070015 | X0b03060404002b | X0b17060104002b |
| X0b14070404002b | X0b28070504002b | X0b2007030c002b | X0b160607091517 | X030a060c09000b | X0b03060504002b | X0b17060304002b |
| X0b14070704002b | X0b29070104002b | X0b2007060c002b | V02080600 | X0b07060109000b | X0b03060704002b | X0b17060404002b |
| X0b15070504002b | X0b29070204002b | X0b2307020c002b | X0308060a0e0810 | X0b08060709000b | X0b04060004002b | X0b17060504002b |
| X0b16070104002b | X0b29070304002b | X0b2307060c002b | X0b1006030e0810 | X0b09060709000b | X0b04060104002b | X0b17060704002b |
| X0b16070304002b | X0b29070504002b | X0b2407020c002b | X0319060c071819 | X0b0a060109000b | X0b04060404002b | X0b18060304002b |
| X0b16070404002b | X0b29070604002b | X0b2607020c002b | X0b180602071819 | X0b0b060709000b | X0b05060004002b | X0b19060404002b |
| X0b16070604002b | X0b29070704002b | X0b2707020c002b | X0b180607071819 | X03020609120002 | X0b05060304002b | X0b19060504002b |
| X0b16070704002b | X0b2a070104002b | X0b2807030c002b | X0b190601071819 | X0b010601120002 | X0b05060404002b | X0b1a060104002b |
| X0b17070004002b | X0b2a070404002b | X0b2807070c002b | X0319060b181719 | X0b020603120002 | X0b05060704002b | X0b1a060304002b |
| X0b17070504002b | X0b2a070504002b | X0b2a07020c002b | X0b180601181719 | X0316060a140017 | X0b06060004002b | X0b1a060504002b |
| X0b18070504002b | X0b2a070704002b | X0b2a07060c002b | X0b190607181719 | X030a0608140017 | X0b06060404002b | X0b1b060304002b |
| X0b19070404002b | X0b2b070904002b | X0b2b070a0c002b | V02070600 | X03210609111721 | X0b06060704002b | X0b1b060404002b |
| X0b19070504002b | X0b2b070c04002b | X0b2b070b0c002b | X0307060c100708 | X03170608111721 | X0b07060204002b | X0b1c060104002b |
| X0b19070604002b | X0314070906142b | X031d070c14182b | X0a080600100708 | V02230600 | X0b07060504002b | X0b1d060304002b |
| X0b19070704002b | X0b15070006142b | X0b19070114182b | X0318060c09181a | X0320060b091b23 | X0b07060604002b | X0b1d060404002b |
| X0b1a070504002b | X0b18070006142b | X0b1c070614182b | X0b18060409181a | X0b1d0605091b23 | X0b08060204002b | X0b1e060204002b |
| X0b1b070104002b | X0b1a070006142b | X0b1d070014182b | X0b19060009181a | X0b1e0605091b23 | X0b08060304002b | X0b1e060304002b |
| X0b1b070404002b | X0b1c070006142b | X0b21070014182b | X0318060a0e111a | X0b1f0605091b23 | X0b08060604002b | X0b1f060304002b |
| X0b1b070504002b | X0b1f070006142b | X0b22070014182b | X0b1306060e111a | X0323060c102324 | X0b09060404002b | X0b20060104002b |
| X0b1b070704002b | X0324070c08212b | X0306070917002b | X0b1406060e111a | X0b230602102324 | X0b09060504002b | X0b20060404002b |
| X0b1c070304002b | X0b24070008212b | X0b1a070117002b | X0307060b12060f | X0b230604102324 | X0b0a060404002b | X0b21060004002b |
| X0b1d070304002b | X0a25070108212b | X0b1e070117002b | X0b09060212060f | X0b240600102324 | X0b0a060504002b | X0b21060104002b |
| X0b1d070404002b | X0b27070008212b | X032a070c18242b | X0b0b060612060f | V02250600 | X0b0a060704002b | X0b21060204002b |
| X0b1d070704002b | X0b28070608212b | X0b25070018242b | X0b0f060012060f | X0325060b022325 | X0b0b060104002b | X0b21060304002b |
| X0b1e070004002b | X0b0107060c002b | X0b25070218242b | X031b060c071a1b | X0a230600022325 | X0b0b060204002b | X0b21060404002b |
| X0b1e070204002b | X0b0207060c002b | X0b25070418242b | X0b1a0602071a1b | X0321060c151c25 | X0b0b060304002b | X0b21060504002b |
| X0b1e070404002b | X0b0307060c002b | X0b27070718242b | X0b1a0607071a1b | X0b240607151c25 | X0b0b060504002b | X0b21060704002b |

| | | | | | | |
|---|---|---|---|---|---|---|
| X0b22060004002b | X0b1e06060c002b | X0b180502081718 | X0b010501180007 | X0b0c050504002b | X0b1f050504002b | X0b0d05030c002b |
| X0b22060104002b | X0b2006020c002b | X030805090e0810 | X0b020500180007 | X0b0c050704002b | X0b1f050704002b | X0b0d05050c002b |
| X0b22060204002b | X0b2406020c002b | X0b0f05010e0810 | X0a020501180007 | X0b0d050404002b | X0b20050104002b | X0b0e05060c002b |
| X0b22060404002b | X0b2406050c002b | X0308050a180809 | X0b040500180007 | X0b0d050704002b | X0b20050404002b | X0b1005020c002b |
| X0b23060104002b | X0b2506040c002b | X0b080500180809 | X0b050501180007 | X0b0e050104002b | X0b20050504002b | X0b1105030c002b |
| X0b24060104002b | X0b2506050c002b | X0319050a181719 | X0a060501180007 | X0b0e050404002b | X0b20050704002b | X0b1205010c002b |
| X0b24060304002b | X0b2606020c002b | X0b170506181719 | X03210508111721 | X0b0e050504002b | X0b21050404002b | X0b1305030c002b |
| X0b24060404002b | X0b2706040c002b | X031a050a08191a | X0b1d0506111721 | X0b0e050704002b | X0b21050504002b | X0b1405030c002b |
| X0b25060104002b | X0b2806040c002b | X0b1a050008191a | X0a1e0501111721 | X0b0f050404002b | X0b21050704002b | X0b1405060c002b |
| X0b25060204002b | X0b2906020c002b | X0318050b0e111a | X031d050a091b23 | X0b0f050504002b | X0b22050004002b | X0b1505020c002b |
| X0b25060304002b | X0b2a06020c002b | X0b1305060e111a | X03220508091b23 | X0b0f050704002b | X0b22050104002b | X0b1505030c002b |
| X0b26060104002b | X0b2b060a0c002b | X0b1705000e111a | X0b1d0500091b23 | X0b10050404002b | X0b22050504002b | X0b1605040c002b |
| X0b26060404002b | X0b2b060b0c002b | X0b1805000e111a | X0325050a092425 | X0b11050404002b | X0b23050004002b | X0b1705040c002b |
| X0b27060004002b | X0b2b060c0c002b | V02060501 | X0b250501092425 | X0b11050504002b | X0b23050104002b | X0b1705050c002b |
| X0b27060204002b | X0320060c0e1e2b | V021b0501 | X031c0508151c25 | X0b11050704002b | X0b23050504002b | X0b1805030c002b |
| X0b27060604002b | X032b06040e1e2b | X030a050a12060f | X0b1f0506151c25 | X0b12050404002b | X0b24050304002b | X0b1805040c002b |
| X0b28060004002b | X0b1f06020e1e2b | X0a0d050112060f | V02270501 | X0b12050504002b | X0b24050604002b | X0b1905050c002b |
| X0b28060104002b | X0b2106060e1e2b | X0314050b01101b | X0326050a092627 | X0b12050704002b | X0b25050004002b | X0b1a05020c002b |
| X0b28060204002b | X0329060c15292b | X0b14050101101b | X0b260500092627 | X0b13050004002b | X0b25050204002b | X0b1a05050c002b |
| X0b28060604002b | X0b29060015292b | X0b17050101101b | X0b270500092627 | X0b13050504002b | X0b25050304002b | X0b1b05030c002b |
| X0b29060104002b | X0b2a060015292b | X031905090d191b | X0322050c01222b | X0b14050004002b | X0b25050404002b | X0b1c05020c002b |
| X0b29060404002b | X0324060918242b | X0b1a05060d191b | X0b24050001222b | X0b14050504002b | X0b25050604002b | X0b1c05060c002b |
| X0b2a060104002b | X0b2b060918242b | X0a1b05010d191b | X0b28050701222b | X0b15050404002b | X0b26050104002b | X0b1d05020c002b |
| X0b2a060404002b | V02100501 | X03050509100506 | X0b00050204002b | X0b15050504002b | X0b26050404002b | X0b1f05020c002b |
| X0312060905122b | X0310050b051011 | X0b050503100506 | X0b00050304002b | X0b15050604002b | X0b26050504002b | X0b2005020c002b |
| X0320060805122b | X0b100506051011 | X0b060503100506 | X0b01050204002b | X0b15050704002b | X0b26050704002b | X0b2005060c002b |
| X0b12060305122b | X0b110506051011 | V021e0501 | X0b01050704002b | X0b16050104002b | X0b27050304002b | X0b2105020c002b |
| X0b22060605122b | X0310050a060f10 | X031e050c081d1e | X0b02050704002b | X0b16050304002b | X0b27050404002b | X0b2105030c002b |
| X0b0006000c002b | X0a100501060f10 | X0b1e0506081d1e | X0b03050204002b | X0b16050504002b | X0b27050604002b | X0b2105060c002b |
| X0b0106050c002b | X03100509090f11 | V02020501 | X0b03050504002b | X0b16050704002b | X0b27050704002b | X0b2205060c002b |
| X0b0106060c002b | X0b100503090f11 | X031a050913151f | X0b03050704002b | X0b17050304002b | X0b28050004002b | X0b2305060c002b |
| X0b0206050c002b | X0b100505090f11 | X0a15050113151f | X0b04050104002b | X0b17050704002b | X0b28050104002b | X0b2405020c002b |
| X0b0206060c002b | X0b110501090f11 | X0b16050613151f | X0b04050504002b | X0b18050504002b | X0b28050204002b | X0b2405040c002b |
| X0b0306060c002b | X0311050a131112 | X031f050a081f20 | X0b04050704002b | X0b18050604002b | X0b28050504002b | X0b2405050c002b |
| X0b0406060c002b | X0b110500131112 | X0b1f0500081f20 | X0b05050004002b | X0b18050704002b | X0b29050004002b | X0b2505050c002b |
| X0b0506050c002b | X0b120500131112 | X030b050805000b | X0b06050004002b | X0b19050004002b | X0b29050104002b | X0b2605020c002b |
| X0b0506060c002b | X030e050a050e0f | X0b03050105000b | X0b06050204002b | X0b19050104002b | X0b29050504002b | X0b2605060c002b |
| X0b0606050c002b | X0b0e0500050e0f | X030c050b070015 | X0b07050104002b | X0b19050204002b | X0b2a050004002b | X0b2705020c002b |
| X0b0606060c002b | X0b0f0500050e0f | X0b090502070015 | X0b07050304002b | X0b19050304002b | X0b2a050104002b | X0b2705050c002b |
| X0b0706030c002b | X0312050c111213 | X0b0a0502070015 | X0b07050404002b | X0b19050404002b | X0b2a050204002b | X0b2805040c002b |
| X0b0706040c002b | X0b120503111213 | X0b0c0502070015 | X0b07050504002b | X0b19050604002b | X0b2a050404002b | X0b2805060c002b |
| X0b0806040c002b | V020d0501 | X0b0d0502070015 | X0b07050604002b | X0b19050704002b | X0b2a050504002b | X0b2905060c002b |
| X0b0806050c002b | X03140508091214 | X0b0e0502070015 | X0b07050704002b | X0b1a050104002b | X0b2a050704002b | X0b2a05060c002b |
| X0b0906000c002b | X0b120506091214 | X0b0f0502070015 | X0b08050104002b | X0b1a050304002b | X0320050a07202b | X0b2b050b0c002b |
| X0b0906030c002b | V02150501 | X0b110502070015 | X0b08050304002b | X0b1a050404002b | X0b20050007202b | X0b2b050c0c002b |
| X0b0a06000c002b | X030c050a050c0d | X0b120502070015 | X0b08050404002b | X0b1a050704002b | X0b21050107202b | X032a050a15292b |
| X0b0b06040c002b | X0b0c0500050c0d | X0304050a0b0009 | X0b08050504002b | X0b1b050004002b | X0b25050707202b | X0b2b050a15292b |
| X0b0c06040c002b | X0b0d0500050c0d | X0b0305000b0009 | X0b08050604002b | X0b1b050504002b | X0321050a08212b | X0325050918242b |

X0b0d06040c002b
X0b0e06020c002b
X0b0f06020c002b
X0b1006000c002b
X0b1106020c002b
X0b1106030c002b
X0b1206010c002b
X0b1206020c002b
X0b1506050c002b
X0b1606020c002b
X0b1606050c002b
X0b1706060c002b
X0b1806050c002b
X0b1906020c002b
X0b1906030c002b
X0b1b06020c002b
X0b1b06050c002b
X0b1d06020c002b
X0b1e06040c002b
X0b160402081516
X030f040b180c16
X0b0e0401180c16
X0b0f0403180c16
X0b100407180c16
X0b110407180c16
X030c040b080a14
X0b0a0402080a14
X0b0d0402080a14
X0b0f0402080a14
X0b120402080a14
V02180400
X030b040902090b
X0b09040202090b
X0317040c081718
X0b170400081718
X03080408180809
X0b080403180809
X0318040e071819
X0b180402071819
V02070400
X0309040b080709
X0b070406080709
X0b080406080709
X0307040a100708
X0b070402100708
X0b070404100708
X0b080400100708
X0319040c08191a
X0b19040008191a
X0312040a0c111a
X0b1104040c111a
X0b1204000c111a
X0b1204070c111a
X0b1a04000c111a
X03080409020608
X0b080401020608
X030604090e0607
X0b0604070e0607
X0306040b12060f
X0b09040712060f
X0316040901101b
X0b19040201101b
V021c0400
V02040400
X0304040a080406
X0b060401080406
X031c040a071c1d
X0b1c0402071c1d
X0b1c0404071c1d
X0b1d0400071c1d
X0303040a120305
X0b030402120305
X0b040402120305
X031f0409071e1f
X0b1e0407071e1f
X0b1f0401071e1f
X031d040913151f
X0b1a040713151f
X0b1b040113151f
X030b040b100b20
X0b150400100b20
X0a160400100b20
X030a040c06000a
X0a07040006000a
X03030409080003
X0b010400080003
X0b02030704002b
X0b03030004002b

X030c0509060b0c
X0b0b0507060b0c
X0315050b081516
X0b150500081516
X0314050c080a14
X0b0b0501080a14
X0b0c0506080a14
X0b0d0506080a14
X0b0f0506080a14
X030a05090b0a0c
X0b0c05010b0a0c
X0316050a071617
X0b160502071617
V02180501
X0309050a10090a
X0b09050010090a
X0b0a050010090a
X0317050a081718
X0b170502081718
X0b020400080003
X0b030400080003
X0302040c0b0009
X0b0804050b0009
X0310040b0d0013
X0b0904060d0013
X0b0a04060d0013
X0b0c04060d0013
X0b0d04060d0013
X0b0e04060d0013
X0b0f04060d0013
X0b1104060d0013
X0b1204060d0013
X0301040a0e0003
X0b0104020e0003
X0b0204020e0003
X031804080f0019
X0b0804070f0019
X03020409100004
X0b030406100004
X0b040406100004
X0311040c110011
X0b090400110011
X0b0c0400110011
X0b0e0400110011
X0b110400110011
X0301040b120002
X0b000400120002
X0b000401120002
X0b010401120002
X031f040a011f21
X0b210401011f21
X031e040a111721
X0b1f0400111721
X0b200404111721
X0b210402111721
X0321040a002123
X03230408002123
X0b210407002123
X03210409091b23
X0b1b0407091b23
X0b1f0407091b23
X0b220407091b23
V02240400
X031e0409151c25
X0b200407151c25
X0b220401151c25
X03260408112526
X0b260400112526
X0326040c092627
X0b260406092627
X0b270406092627
X0327040b102527
X0b260401102527
X0b270403102527
X0327040a152628
X0b270400152628
X0324040a01222b
X0b2b040a01222b
X0b01040603002b
X0b02040603002b
X0b17040603002b
X0b18040603002b
X0b00040204002b
X0b01040504002b
X0b01040704002b
X0b02040104002b
X0b14030404002b
X0b14030604002b

X0b0405020b0009
X0b0505060b0009
X0b0605060b0009
X0313050b0d0013
X0b0605070d0013
X0b0b05030d0013
X0b0c05030d0013
X0b0f05030d0013
X0b1005070d0013
X0b1305010d0013
X030105090e0003
X0b0105030e0003
X0b0205030e0003
X0302050a120002
X0b010500120002
X0b010506120002
X0b020502120002
X0b020506120002
X03030509180007
X0b03040104002b
X0b04040104002b
X0b05040004002b
X0b05040104002b
X0b05040404002b
X0b06040004002b
X0b06040204002b
X0b06040404002b
X0b06040604002b
X0b07040104002b
X0b08040404002b
X0b09040104002b
X0b09040304002b
X0b09040504002b
X0b0a040404002b
X0b0a040504002b
X0b0b040004002b
X0b0b040104002b
X0b0b040204002b
X0b0b040304002b
X0b0b040504002b
X0b0b040704002b
X0b0c040104002b
X0b0c040304002b
X0b0c040504002b
X0b0c040704002b
X0b0d040104002b
X0b0d040304002b
X0b0d040404002b
X0b0d040504002b
X0b0d040704002b
X0b0e040304002b
X0b0e040704002b
X0b0f040404002b
X0b0f040704002b
X0b10040104002b
X0b10040204002b
X0b10040304002b
X0b10040404002b
X0b10040504002b
X0b10040604002b
X0b11040104002b
X0b11040304002b
X0b11040504002b
X0b12040304002b
X0b12040404002b
X0b13040004002b
X0b13040304002b
X0b13040404002b
X0b14040004002b
X0b14040104002b
X0b14040304002b
X0b14040404002b
X0b14040504002b
X0b15040104002b
X0b15040304002b
X0b15040504002b
X0b17040204002b
X0b17040304002b
X0b18040104002b
X0b18040304002b
X0b18040504002b
X0b18040704002b
X0b19040304002b
X0b19040504002b
X0b1a040104002b
X0b1a040304002b
X0b23030704002b
X0b24030204002b

X0b08050704002b
X0b09050104002b
X0b09050304002b
X0b09050404002b
X0b09053504002b
X0b09050604002b
X0b09050704002b
X0b0a050104002b
X0b0a050304002b
X0b0a050404002b
X0b0a050504002b
X0b0a050604002b
X0b0a050704002b
X0b0b050004002b
X0b0b050204002b
X0b0b050404002b
X0b0b050504002b
X0b0b050604002b
X0b0c050404002b
X0b1a040404002b
X0b1b040004002b
X0b1b040404002b
X0b1c040104002b
X0b1d040304002b
X0b1d040404002b
X0b1d040504002b
X0b1e040104002b
X0b1e040304002b
X0b1e040404002b
X0b1f040204002b
X0b20040104002b
X0b20040204002b
X0b20040304002b
X0b21040404002b
X0b21040504002b
X0b22040004002b
X0b22040404002b
X0b23040004002b
X0b23040104002b
X0b23040404002b
X0b24040104002b
X0b24040204002b
X0b24040304002b
X0b24040504002b
X0b24040604002b
X0b24040704002b
X0b25040004002b
X0b25040104002b
X0b25040204002b
X0b25040604002b
X0b26040304002b
X0b26040404002b
X0b26040704002b
X0b27040404002b
X0b27040504002b
X0b27040704002b
X0b28040104002b
X0b28040204002b
X0b28040304002b
X0b28040504002b
X0b28040604002b
X0b28040704002b
X0b29040004002b
X0b29040304002b
X0b29040404002b
X0b29040704002b
X0b2a040204002b
X0b2a040504002b
X0b2a040704002b
X030a040a0a002b
X0b0904040a002b
X0b0a04000a002b
X0b0a04070a002b
X0b0b04060a002b
X0b1304070a002b
X0b1604070a002b
X0b1704070a002b
X0b1904070a002b
X0b1d04070a002b
X0b1e04000a002b
X0b0004030c002b
X0b0104030c002b
X0b0104040c002b
X0b0204040c002b
X0b0304040c002b
X0b0404040c002b
X0b1503050c002b
X0b1603030c002b

X0b1b050604002b
X0b1c050104002b
X0b1c050404002b
X0b1c050504002b
X0b1c050704002b
X0b1d050104002b
X0b1d050304002b
X0b1d050404002b
X0b1d050504002b
X0b1d050704002b
X0b1e050004002b
X0b1e050204002b
X0b1e050304002b
X0b1e050404002b
X0b1e050504002b
X0b1e050704002b
X0b1f050104002b
X0b1f050304002b
X0b1f050404002b
X0b0504060c002b
X0b0604030c002b
X0b0604050c002b
X0b0804020c002b
X0b0a04030c002b
X0b0b04040c002b
X0b0e04050c002b
X0b0f04050c002b
X0b1204050c002b
X0b1304060c002b
X0b1404060c002b
X0b1504040c002b
X0b1604030c002b
X0b1604040c002b
X0b1604050c002b
X0b1704040c002b
X0b1704050c002b
X0b1804040c002b
X0b1904040c002b
X0b1904060c002b
X0b1a04020c002b
X0b1a04050c002b
X0b1b04030c002b
X0b1b04050c002b
X0b1b04060c002b
X0b1d04020c002b
X0b1e04020c002b
X0b1e04050c002b
X0b1e04060c002b
X0b1f04030c002b
X0b1f04050c002b
X0b2004050c002b
X0b2104030c002b
X0b2204030c002b
X0b2204050c002b
X0b2204060c002b
X0b2304060c002b
X0b2404040c002b
X0b2504040c002b
X0b2604020c002b
X0b2604050c002b
X0b2704020c002b
X0b2804040c002b
X0b2904050c002b
X0b2904060c002b
X0b2a04040c002b
X0b2a04060c002b
X0b2b04090c002b
X0b2b040b0c002b
X0b2b040c0c002b
X0311040b12102b
X0b15040612102b
X0b16040612102b
X0b1a040612102b
X0b1c040612102b
X0b1d040612102b
X0b1f040612102b
X0b20040612102b
X0b21040612102b
X032a040b15292b
X0b29040115292b
X0b2a040015292b
X0b2a040315292b
X030d040a16002b
X0b0c040416002b
X0b0d040016002b
X0b12040116002b
X0b040201080a14
V02180200

X0b21050008212b
X0b24050108212b
X0b24050708212b
X0b0005000c002b
X0b0005010c002b
X0b0105040c002b
X0b0105050c002b
X0b0205040c002b
X0b0205050c002b
X0b0305030c002b
X0b0305040c002b
X0b0305060c002b
X0b0405040c002b
X0b0405060c002b
X0b0505050c002b
X0b0605040c002b
X0b0605050c002b
X0b0705020c002b
X0b0805020c002b
X0b16040116002b
X0b17040116002b
X0b19040116002b
X0b1d040116002b
X0b20040016002b
X0b21040016002b
X030f040a17002b
X0b0a040117002b
X0b0c040417002b
X0b0f040017002b
X0b13040117002b
X0a1c040017002b
X0b1f040417002b
X0325040a18242b
X0325040818242b
X0b28040018242b
X0310030c051011
X0b110304051011
V020f0301
X030e030b050e0f
X0b0e0303050e0f
X0b0f0303050e0f
X03120309111213
X0b130300111213
X030e030c0b0d0f
X0b0d03000b0d0f
X0b0e03020b0d0f
X0b0e03060b0d0f
X0b0f03060b0d0f
V02160301
X030b030c060b0c
X0b0b0302060b0c
X0b0c0302060b0c
X0316030b081516
X0b160307081516
X0314030c180c16
X0b0f0307180c16
V02170301
X030c030b0b0a0c
X0b0a03020b0a0c
X030a030c10090a
X0b09030210090a
X0b0a030010090a
V02080301
V02190301
X030d030b0e0810
X0b0b03000e0810
X0b0c03000e0810
X0b0e03000e0810
X0b0e03010e0810
X0a0f03010e0810
X0308030c180809
X0b080300180809
X0b090300180809
X0318030b071819
X0b180300071819
X0b190300071819
X03070308080709
X0b080303080709
X0307030c100708
X0b070300100708
X0b080302100708
X0b080304100708
X0319030c08191a
X0b19030208191a
V02060301
V021b0301
X0320020b081f20
X0b200207081f20

X0b2b050918242b
V02100400
X030f040c060f10
X0a100400060f10
X030f0409090f11
X0b110402090f11
X0312040b111213
X0b130405111213
X030d0409060d0e
X0b0e0402060d0e
X0313040b0b1315
X0b1504070b1315
X031404080d1415
X0b1404070d1415
V02160400
X030b040a060b0c
X0b0c0402060b0c
X0315040a081516
X0b150402081516
X0306030c0e0607
X0b0603020e0607
X030d030912060f
X0b09030412060f
X0306030a100506
X0b050300100506
V021d0301
X031d030b0e1b1d
X0b1b03070e1b1d
V021f0301
X0319030a13151f
X0b17030713151f
X0b1e030713151f
X030a030b06000a
X0b01030106000a
X0301030b080003
X0b000301080003
X030203090b0009
X0b0803050b0009
X030003050e0003
X0b0203020e0003
X0310030b110011
X0b010306110011
X03000306120002
X0b020304120002
X0321030e011f21
X0b1f0307011f21
X0b200304011f21
X031a030a111721
X0b210306111721
V02220301
X0324030b102324
X0b240304102324
X03220309112224
X0b220307112224
X0b230304112224
X0b240301112224
X031e030c151c25
X0b200300151c25
X0b220300151c25
X0b230300151c25
X0b240300151c25
X03260309002426
X0b240306002426
V02270301
X0326030c092627
X0b260302092627
X0b260306092627
X0b270304092627
X0b270306092627
X0326030b152628
X0b260301152628
X0b270303152628
V022a0301
X0328030b02262b
X0b26030002262b
X0b26030302262b
X0a27030102262b
X0b28030002262b
X0b29030302262b
X0b2a030002262b
X0a2a030102262b
X0b00030204002b
X0b01030004002b
X0b01030304002b
X0b02030104002b
X0b02030504002b
X0b08020704002b
X0b09020104002b

| | | | | | | |
|---|---|---|---|---|---|---|
| X0b03030104002b | X0b14030704002b | X0b24030504002b | X0b1703030c002b | X0309020b02090b | X030b020b05000b | X0b09020404002b |
| X0b03030504002b | X0b15030004002b | X0b24030704002b | X0b1703040c002b | X0b09020602090b | X0b05020005000b | X0b0a020104002b |
| X0b04030004002b | X0b15030104002b | X0b25030104002b | X0b1703050c002b | X0b0a020602090b | X0a06020005000b | X0b0a020404002b |
| X0b04030104002b | X0b15030204002b | X0b25030204002b | X0b1803020c002b | X0309020c10090a | X03000207080003 | X0b0b020204002b |
| X0b04030504002b | X0b15030304002b | X0b25030504002b | X0b1803030c002b | X0b09020010090a | X0b020202080003 | X0b0b020704002b |
| X0b05030104002b | X0b15030604002b | X0b25030704002b | X0b1803040c002b | X0b0a020010090a | X030002040a0003 | X0b0c020704002b |
| X0b05030204002b | X0b15030704002b | X0b26030404002b | X0b1803060c002b | V02080200 | X0b0202040a0003 | X0b0d020504002b |
| X0b05030504002b | X0b16030004002b | X0b26030504002b | X0b1903030c002b | V02190200 | X03000206120002 | X0b0d020704002b |
| X0b05030704002b | X0b16030204002b | X0b26030704002b | X0b1903050c002b | X030e020e0e0810 | X0b020205120002 | X0b0e020504002b |
| X0b06030304002b | X0b16030404002b | X0b27030204002b | X0b1a03050c002b | X0b0b02000e0810 | X0306020b13000d | X0b0e020704002b |
| X0b06030504002b | X0b16030504002b | X0b27030504002b | X0b1b03050c002b | X0b0c02020e0810 | X0b05020613000d | X0b0f020404002b |
| X0b06030604002b | X0b16030604002b | X0b27030704002b | X0b1c03060c002b | X0b0d02060e0810 | X0b06020613000d | X0b0f020604002b |
| X0b06030704002b | X0b17030004002b | X0b28030404002b | X0b1d03030c002b | X0b0e02060e0810 | X0b07020613000d | X0b0f020704002b |
| X0b07030104002b | X0b17030204002b | X0b28030504002b | X0b1e03050c002b | X0318020e071819 | X0b08020613000d | X0b10020204002b |
| X0b07030404002b | X0b17030604002b | X0b28030704002b | X0b1f03040c002b | X0b180202071819 | X0b0b020613000d | X0b10020404002b |
| X0b07030504002b | X0b18030504002b | X0b29030204002b | X0b1f03050c002b | X0b190202071819 | X0b0c020613000d | X0b11020104002b |
| X0b07030704002b | X0b18030704002b | X0b29030504002b | X0b2003050c002b | X0308020b100708 | X031b020b111721 | X0b11020204002b |
| X0b08030604002b | X0b19030404002b | X0b29030704002b | X0b2103050c002b | X0b070200100708 | X0b180207111721 | X0b11020304002b |
| X0b08030704002b | X0b19030604002b | X0b2a030404002b | X0b2203040c002b | X0319020b08191a | X0321020c182021 | X0b11020404002b |
| X0b09030104002b | X0b19030704002b | X0b2a030504002b | X0b2203050c002b | X0b19020108191a | X0b200200182021 | X0b12020004002b |
| X0b09030304002b | X0b1a030004002b | X0b2a030704002b | X0b2303060c002b | X0316020a0e111a | X0322020c102122 | X0b12020404002b |
| X0b09030604002b | X0b1a030204002b | X0328030a09282b | X0b2403030c002b | X0a1102000e111a | X0b210205102122 | X0b14020404002b |
| X0b09030704002b | X0b1a030304002b | X0b2b030a09282b | X0b2503040c002b | X0b1102070e111a | X03220209002123 | X0b14020704002b |
| X0b0a030104002b | X0b1a030404002b | X032a03090a002b | X0b2503060c002b | X0b1402000e111a | X03210208002123 | X0b15020204002b |
| X0b0a030304002b | X0b1a030604002b | X030b03080a002b | X0b2803030c002b | X0b1502070e111a | X0b210202002123 | X0b15020304002b |
| X0b0a030404002b | X0b1a030704002b | X0b0b03010a002b | X0b2803060c002b | V02060200 | X0b220203002123 | X0b16020104002b |
| X0b0a030504002b | X0b1b030004002b | X0b0c03010a002b | X0b2903040c002b | X0306020c0e0607 | X0b230200002123 | X0b16020204002b |
| X0b0a030604002b | X0b1b030204002b | X0b0d03010a002b | X0b2b03090c002b | X0b0702070e0607 | X0320020c091b23 | X0b16020604002b |
| X0b0a030704002b | X0b1b030304002b | X0b1803010a002b | X0b2b030b0c002b | X030e020b12060f | X0b1d0205091b23 | X0b17020404002b |
| X0b0b030504002b | X0b1b030404002b | X0b2803010a002b | X0b2b030c0c002b | X0b09020212060f | X0324020b102324 | X0b17020604002b |
| X0b0b030704002b | X0b1b030604002b | X0321030b0b162b | X032a030c10282b | X0b0a020212060f | X0b240200102324 | X0b18020404002b |
| X0b0c030504002b | X0b1c030004002b | X031603080b162b | X0b290300102 82b | X0319020a01101b | X0323020c022325 | X0b19020404002b |
| X0b0c030704002b | X0b1c030104002b | X0b1a03010b162b | X0b29030610282b | X0b10020601101b | X0b250205022325 | X0b19020504002b |
| X0b0d030204002b | X0b1c030204002b | X0b1e03010b162b | X0b2a030210282b | X0b12020101101b | X031e020c151e25 | X0b1a020204002b |
| X0b0d030504002b | X0b1c030404002b | X0b2003010b162b | X0b2a030610282b | X0b14020601101b | X0b1f0202151e25 | X0b1a020504002b |
| X0b0d030704002b | X0b1c030504002b | X0b0003000c002b | X0329030b15292b | X0b15020001101b | X0b200202151e25 | X0b1b020204002b |
| X0b0e030704002b | X0b1c030704002b | X0b0003030c002b | X0b29030115292b | X0305020c100506 | X0b220202151e25 | X0b1b020604002b |
| X0b0f030004002b | X0b1d030004002b | X0b0103050c002b | X0b2a030315292b | X0b050202100506 | X0b230202151e25 | X0b1b020704002b |
| X0b0f030204002b | X0b1d030504002b | X0b0203060c002b | X0328030c18242b | X0b060202100506 | X0b240202151e25 | X0b1c020204002b |
| X0b0f030404002b | X0b1d030604002b | X0b0303060c002b | X0b25030018242b | X031c020a000e1d | X0325020c112526 | X0b1d020004002b |
| X0b10030104002b | X0b1e030004002b | X0b0403060c002b | X0b27030018242b | X0a100200000e1d | X0b250200112526 | X0b1d020104002b |
| X0b10030204002b | X0b1e030204002b | X0b0503040c002b | X0b28030218242b | X0b120207000e1d | X0b260202112526 | X0b1d020304002b |
| X0b10030304002b | X0b1e030304002b | X0b0503060c002b | V02100200 | X0b140202000e1d | X0327020c152628 | X0b1d020404002b |
| X0b10030604002b | X0b1e030404002b | X0b0603040c002b | V02110200 | X0b150206000e1d | X0b270200152628 | X0b1d020704002b |
| X0b10030704002b | X0b1e030604002b | X0b0703020c002b | X03100208060f10 | X0b1a0200000e1d | X0b280202152628 | X0b1e020004002b |
| X0b11030104002b | X0b1f030004002b | X0b0703060c002b | X0b100207060f10 | X0b1a0207000e1d | X0327020b00272b | X0b1e020204002b |
| X0b11030204002b | X0b1f030204002b | X0b0903050c002b | V020e0200 | X031e020b011e1e | X0b29020600272b | X0b1e020504002b |
| X0b11030304002b | X0b1f030304002b | X0b0b03030c002b | X03120209111213 | X0b1c0207011e1e | X0b2a020600272b | X0b1e020604002b |
| X0b11030604002b | X0b1f030604002b | X0b0b03040c002b | X0b130202111213 | V02020200 | X0324020c01222b | X0b1e020704002b |
| X0b11030704002b | X0b20030204002b | X0b0b03060c002b | X030d020c060d0e | X0314020b020e1f | X0b27020501222b | X0b1f020604002b |
| X0b12030004002b | X0b20030304002b | X0b0c03030c002b | X0b0d0202060d0e | X0b130207020e1f | X0b00020204002b | X0b21020104002b |
| X0b12030104002b | X0b20030604002b | X0b0c03040c002b | X0b0e0202060d0e | X0b170200020e1f | X0b01020004002b | X0b21020304002b |
| X0b12030304002b | X0b20030704002b | X0b0c03060c002b | X030f020c0b0d0f | X0b180206020e1f | X0b01020104002b | X0b21020404002b |
| X0b12030504002b | X0b21030004002b | X0b0d03030c002b | X0b0d02030b0d0f | X0b190206020e1f | X0b01020404002b | X0b21020704002b |
| X0b12030604002b | X0b21030104002b | X0b0d03040c002b | X0b0e02030b0d0f | X0b1c0200020e1f | X0b02020304002b | X0b22020504002b |
| X0b13030104002b | X0b21030204002b | X0b0d03060c002b | X030d020b050c0d | X031f020b071e1f | X0b03020004002b | X0b22020604002b |
| X0b13030204002b | X0b21030304002b | X0b0e03040c002b | X0b0c0200050c0d | X0b1f0207071e1f | X0b03020404002b | X0b22020704002b |
| X0b13030304002b | X0b21030404002b | X0b0e03050c002b | X0b0d0200050c0d | X0315020b13151f | X0b03020704002b | X0b24020704002b |
| X0b13030504002b | X0b21030704002b | X0b0f03050c002b | X0315020c0d1415 | X0b16020013151f | X0b04020004002b | X0b25020104002b |
| X0b13030604002b | X0b22030204002b | X0b1003040c002b | X0b1502010d1415 | X0b19020713151f | X0b04020404002b | X0b25020304002b |
| X0b13030704002b | X0b22030304002b | X0b1003050c002b | X0314020a180c16 | X0b1b020013151f | X0b04020704002b | X0b25020404002b |
| X0b14030004002b | X0b22030604002b | X0b1103050c002b | X0b0f0200180c16 | X031e0209001e20 | X0b05020104002b | X0b25020704002b |
| X0b14030104002b | X0b23030104002b | X0b1303040c002b | X0b110206180c16 | X0b1c0203001e20 | X0b06020104002b | X0b26020404002b |
| X0b14030204002b | X0b23030204002b | X0b1403050c002b | X0b130206180c16 | X0b1f0200001e20 | X0b07020204002b | X0b26020504002b |
| X0b14030304002b | X0b23030504002b | X0b1503040c002b | X030a020c080a14 | X0b200206001e20 | X0b08020404002b | X0b26020704002b |
| X0b27020104002b | X0b1c02040c002b | X0316010c081516 | X0b220103102122 | X0b13010704002b | X0b0801050c002b | X030b000b0a0810 |
| X0b27020304002b | X0b1c02050c002b | X0b150102081516 | X0322010b182223 | X0b14010404002b | X0b0901060c002b | X0b0900020a0810 |
| X0b27020404002b | X0b1c02060c002b | X03150109111416 | X0b230106182223 | X0b14010604002b | X0b0a01060c002b | X0b0a00020a0810 |
| X0b27020704002b | X0b1d02060c002b | X0b150104111416 | V02260101 | X0b14010704002b | X0b0b01050c002b | X0b0b00020a0810 |
| X0b28020404002b | X0b1e02040c002b | X030c010a080a14 | X03250109112526 | X0b15010604002b | X0b0c01050c002b | X0b0c00020a0810 |
| X0b28020504002b | X0b1f02040c002b | X0b0b0102080a14 | X0b250101112526 | X0b15010704002b | X0b0d01020c002b | X0318000a00181a |
| X0b28020704002b | X0b1f02050c002b | X0b0c0100080a14 | X0b260103112526 | X0b16010104002b | X0b0f01050c002b | X0b18000000181a |
| X0b29020404002b | X0b2002040c002b | X0b0d0107080a14 | V02280101 | X0b16010404002b | X0b1001050c002b | X0b19000200181a |
| X0b29020504002b | X0b2002050c002b | X0b0e0100080a14 | X03270109152628 | X0b16010504002b | X0b1001060c002b | X031a000c0b191b |
| X0b29020704002b | X0b2202000c002b | X0b0e0106080a14 | X0b270101152628 | X0b16010704002b | X0b1101020c002b | X0b1a00020b191b |
| X0b2a020404002b | X0b2202040c002b | X030b010b0b0a0c | X0b280103152628 | X0b17010404002b | X0b1201050c002b | V021c0000 |
| X0b2a020504002b | X0b2302040c002b | X0b0a01020b0a0c | X0b1d010603002b | X0b18010704002b | X0b1301050c002b | X031b000a011a1c |
| X0b2a020704002b | X0b2302050c002b | X0b0c01020b0a0c | X0b1e010603002b | X0b19010104002b | X0b1301060c002b | X0b1b0000011a1c |
| X0b2b020a04002b | X0b2302070c002b | X0316010a071617 | X0b21010603002b | X0b19010304002b | X0b1401050c002b | X0b1c0002011a1c |
| X0328020a08212b | X0b2402040c002b | X0b160102071617 | X0b22010603002b | X0b19010404002b | X0b1501010c002b | X030f000a0d0e1f |
| X0b25020608212b | X0b2402050c002b | X0315010b091517 | X0b25010603002b | X0b19010504002b | X0b1501050c002b | X0b1300060d0e1f |
| X0b26020608212b | X0b2b02090c002b | X0b170107091517 | X0b26010603002b | X0b19010604002b | X0b1601060c002b | X0b1400060d0e1f |
| X0b27020608212b | X0b2b020b0c002b | X0317010b081718 | X0b27010603002b | X0b19010704002b | X0b1701020c002b | X0b1500060d0e1f |
| X0b28020608212b | X0b2b020c0c002b | X0b170100081718 | X0b28010603002b | X0b1a010204002b | X0b1701050c002b | X0b1600060d0e1f |
| X032b02040a002b | X032802090d1c2b | X030a010a0c0810 | X0b00010204002b | X0b1a010304002b | X0b1801050c002b | X0b1800060d0e1f |
| X0b0202010a002b | X031d02080d1c2b | X0b0901020c0810 | X0b01010004002b | X0b1a010604002b | X0b1801060c002b | X0b1900060d0e1f |
| X0b0202060a002b | X0b2102000d1c2b | X0b0a01000c0810 | X0b01010104002b | X0b1b010604002b | X0b1a01010c002b | X0b1b00060d0e1f |
| X0b0002000c002b | X0b2402060d1c2b | X0a0c01010c0810 | X0b01010504002b | X0b1b010704002b | X0b1a01040c002b | X0b1c00060d0e1f |
| X0b0002010c002b | X0b2802030d1c2b | X0b0c01020c0810 | X0b02010004002b | X0b1c010404002b | X0b1a01050c002b | X0b01000004002b |

| | | | | | | |
|---|---|---|---|---|---|---|
| X0b0002030c002b | X032602090f1a2b | X03190109071819 | X0b02010304002b | X0b1c010704002b | X0b1b01050c002b | X0b01000404002b |
| X0b0102060c002b | X031c02080f1a2b | X0b180102071819 | X0b02010604002b | X0b1d010004002b | X0b1c01050c002b | X0b02000004002b |
| X0b0302050c002b | X0b2102060f1a2b | X0319010a08191a | X0b03010004002b | X0b1d010504002b | X0b1c01060c002b | X0b02000404002b |
| X0b0302060c002b | X0b2302060f1a2b | X0b19010208191a | X0b04010004002b | X0b1e010004002b | X0b1f01050c002b | X0b03000004002b |
| X0b0402050c002b | X0b2602030f1a2b | X0b1a010708191a | X0b04010604002b | X0b1e010504002b | X0b1f01060c002b | X0b03000404002b |
| X0b0402060c002b | X0329020c15292b | X031a010a09181a | X0b05010004002b | X0b1f010004002b | X0b2001050c002b | X0b04000004002b |
| X0b0502040c002b | X0b29020015292b | X0b18010409181a | X0b05010104002b | X0b20010004002b | X0b2001060c002b | X0b04000404002b |
| X0b0602040c002b | X0b2a020215292b | X0317010a0c111a | X0b05010504002b | X0b21010004002b | X0b2301050c002b | X0b05000004002b |
| X0b0702040c002b | X0320020817002b | X0b1301020c111a | X0b06010004002b | X0b21010504002b | X0b2401050c002b | X0b05000404002b |
| X0b0702050c002b | X0a02020017002b | X030a010912060f | X0b06010104002b | X0b22010004002b | X0b2901040c002b | X0b06000004002b |
| X0b0802020c002b | X0b02020717002b | X0b09010412060f | X0b06010504002b | X0b22010504002b | X0b2b010b0c002b | X0b06000404002b |
| X0b0802050c002b | X0328020b18242b | X0311010a01101b | X0b07010004002b | X0b23010004002b | X0b2b010c0c002b | X0b07000004002b |
| X0b0b02040c002b | X0b25020218242b | X0b13010001101b | X0b08010004002b | X0b24010004002b | X031c010c0d1c2b | X0b07000404002b |
| X0b0b02050c002b | X0b26020018242b | X0b15010001101b | X0b08010604002b | X0b24010604002b | X0b1d01030d1c2b | X0b08000004002b |
| X0b0c02040c002b | X0b27020218242b | X0b18010001101b | X0b09010104002b | X0b25010004002b | X0a1c01010d1c2b | X0b08000404002b |
| X0b0c02050c002b | X0b28020018242b | X0b1b010001101b | X0b09010504002b | X0b25010504002b | X0b2101030d1c2b | X0b09000404002b |
| X0b0d02040c002b | X0b29020218242b | X031a0109071a1b | X0b09010704002b | X0b26010004002b | X0a2201010d1c2b | X0b0a000404002b |
| X0b0e02040c002b | X0b2a020018242b | X0b1b0104071a1b | X0b0a010104002b | X0b26010504002b | X0b2501030d1c2b | X0b0b000404002b |
| X0b0f02020c002b | X0311010c051011 | X031b010c081b1c | X0b0a010404002b | X0b27010004002b | X0a2601010d1c2b | X0b0c000404002b |
| X0b0f02050c002b | X0b110100051011 | X0b1b0102081b1c | X0b0a010504002b | X0b27010504002b | X0b2701030d1c2b | X0b0d000004002b |
| X0b1002050c002b | V02120101 | X031a010c181a1c | X0b0a010704002b | X0b28010004002b | X0a2801010d1c2b | X0b0d000204002b |
| X0b1102050c002b | X030f010b060f10 | X0b1a0100181a1c | X0b0b010604002b | X0b28010204002b | X0329010a15292b | X0b0d000404002b |
| X0b1202030c002b | X0b0f0107060f10 | X031c010a071c1d | X0b0b010704002b | X0b28010404002b | X0b2b010a15292b | X0b0d000604002b |
| X0b1202050c002b | X03110109131112 | X0b1c0102071c1d | X0b0c010404002b | X0b28010504002b | V02140000 | X0b0e000004002b |
| X0b1202060c002b | X0b120103131112 | V021c0101 | X0b0c010604002b | X0b29010004002b | X0313000a001214 | X0b0e000204002b |
| X0b1302000c002b | V020e0101 | X031d0109081d1e | X0b0c010704002b | X0b29010204002b | X0b130000001214 | X0b0e000404002b |
| X0b1302040c002b | X0313010b061113 | X0b1d0101081d1e | X0b0d010304002b | X0b29010504002b | X0b140002001214 | X0b0e000604002b |
| X0b1302050c002b | X0b110107061113 | X0b1e0103081d1e | X0b0d010404002b | X0b29010604002b | V02160000 | X0b0f000004002b |
| X0b1402050c002b | X0313010c111213 | V02020101 | X0b0e010304002b | X0b2a010004002b | X030b000a0b0a0c | X0b0f000204002b |
| X0b1502040c002b | X0b130104111213 | X0308010c05000b | X0b0e010404002b | X0b2a010504002b | X0b0b00000b0a0c | X0b0f000604002b |
| X0b1502050c002b | V020d0101 | X0b09010005000b | X0b0e010704002b | X0b2a010604002b | X0b0c00000b0a0c | X0b10000004002b |
| X0b1602040c002b | X030c010a060d0c | X0b0b010005000b | X0b0f010004002b | X0b2b010904002b | X0315000a001517 | X0b10000404002b |
| X0b1702020c002b | X0b0d0106060d0c | X03030109080003 | X0b0f010204002b | X0329010909282b | X0b150000001517 | X0b11000004002b |
| X0b1702050c002b | X030f010c0b0d0f | X0b020105080003 | X0b0f010404002b | X0b28010709282b | X0b160002001517 | X0b11000204002b |
| X0b1702070c002b | X0b0d01000b0d0f | X0301010b0c0003 | X0b0f010604002b | X0b29010709282b | X0309000a0d090b | X0b11000604002b |
| X0b1802050c002b | X0b0d01050b0d0f | X0b0001000c0003 | X0b10010004002b | X0b0001030c002b | X0b0900000d090b | X0b12000004002b |
| X0b1902030c002b | X0b0e01050b0d0f | X0b0001010c0003 | X0b11010104002b | X0b0101060c002b | X0b0a00000d090b | X0b12000404002b |
| X0b1a02010c002b | X0314010a131314 | X0b0301050c0003 | X0b11010304002b | X0b0301060c002b | V02190000 | X0b13000404002b |
| X0b1a02030c002b | X0b140102131314 | X031a010b111721 | X0b11010404002b | X0b0401050c002b | X0309000b01080d | X0b14000404002b |
| X0b1a02040c002b | X0315010c0d1415 | X0b170106111721 | X0b11010504002b | X0b0501060c002b | X0b09000601080d | X0b15000404002b |
| X0b1a02060c002b | X0b1501030d1415 | V02220101 | X0b11010604002b | X0b0601060c002b | X0b0a000601080d | X0b16000404002b |
| X0b1b02040c002b | X030d010a000b0d | X03210109102122 | X0b12010004002b | X0b0701050c002b | X0b0b000601080d | X0b17000004002b |
| X0b1b02050c002b | X0b0b0104000b0d | X0b210101102122 | X0b12010604002b | X0b0701060c002b | X0b0c000601080d | X0b17000204002b |
| X0b17000404002h | X0b2100060c002b | X031a0c0b071a1b | X0h1f0c04151c25 | X0b150c0604002b | X0b0b0c050c002b | X030f0d0c050e0f |
| X0b17000604002b | X0b2200060c002b | X0b1a0c05071a1b | X0b200c00151c25 | X0b160c0104002b | X0b0b0c060c002b | X0b0e0d01050e0f |
| X0b18000404002b | X0b2300060c002b | X0b1b0c05071a1b | X09210c01151c25 | X0b160c0304002b | X0b0c0c050c002b | X0b0f0d01050e0f |
| X0b19000404002b | X0b2400060c002b | V021c0b01 | X0b230c04151c25 | X0b170c0704002b | X0b0d0c030c002b | V02140c00 |
| X0b1a000604002b | X0b2500060c002b | X031b0c0e081b1c | X0b240c00151c25 | X0b180c0704002b | X0b0d0c040c002b | X030d0d09060d0e |
| X0b1b000404002h | X0b2600060c002b | X0b1b0c02081b1c | V02260b01 | X0b190c0104002b | X0b0e0c040c002b | X0b0d0d05060d0e |
| X0b1c000404002b | X0b2700060c002b | X0b1c0c02081b1c | X03250c0c112526 | X0b190c0204002b | X0b0e0c060c002b | X03130d09131314 |
| X0b1d000004002b | X0b2800040c002b | V021d0b01 | X0b250c06112526 | X0b190c0304002b | X0b0f0c020c002b | X0b130d01131314 |
| X0b1d000404002b | X0b2a00060c002b | X030f0c0a000e1d | X03260c0b01222b | X0b190c0404002b | X0b0f0c050c002b | X0b140d05131314 |
| X0b1e000004002b | X0b2b00090c002b | X0b130c00000e1d | X0b230c0701222b | X0b190c0504002b | X0b0f0c060c002b | V020e0c00 |
| X0b1e000404002b | X0b2b000b0c002b | X0b140c00000e1d | X0b240c0701222b | X0b1a0c0304002b | X0b100c050c002b | X030d0d0b050c0d |
| X0b1f000004002b | X03100c08051011 | X0b170c00000e1d | X0b250c0101222b | X0b1a0c0704002b | X0b110c010c002b | X0b0c0d02050c0d |
| X0b1f000404002b | X0b100c01051011 | X0b170c01000e1d | X0b260c0501222b | X0b1b0c0304002b | X0b110c030c002b | X030c0d0a060b0c |
| X0b20000004002b | V02120b01 | X0b180c00000e1d | X0b000c0004002b | X0b1b0c0704002b | X0b120c040c002b | X0b0c0d03060b0c |
| X0b20000404002b | X03100c0a060f10 | X0a180c01000e1d | X0b000c0204002b | X0b1c0c0504002b | X0b130c040c002b | X0b0c0d05060b0c |
| X0b21000004002b | X0b100c07060f10 | X0b1b0c00000e1d | X0b000c0304002b | X0b1d0c0504002b | X0b140c040c002b | X030e0d0b180e16 |
| X0b21000404002b | X03120c0c0b1012 | X0b1c0c00000e1d | X0b010c0104002b | X0b1e0c0504002b | X0b140c050c002b | X0b0e0d01180e16 |
| X0b22000004002b | X0b100c060b1012 | X031c0c0b071c1d | X0b010c0604002b | X0b1e0c0704002b | X0b150c030c002b | X0b0d0d01180e16 |
| X0b22000404002b | V020e0b01 | X0a1d0c01071c1d | X0b020c0104002b | X0b1f0c0504002b | X0b150c040c002b | X0b130d05180e16 |
| X0b23000004002b | V020d0b01 | V021e0b01 | X0b020c0604002b | X0b1f0c0704002b | X0b160c040c002b | X0b140d01180e16 |
| X0b23000404002b | X030e0c0c060d0e | X03030c0a120305 | X0b030c0104002b | X0b200c0304002b | X0b160c050c002b | X03140d0e080a14 |
| X0b24000004002b | X0b0e0c07060d0e | X0b030c02120305 | X0b040c0104002b | X0b200c0704002b | X0b170c040c002b | X0b0e0d07080a14 |
| X0b24000404002b | X03140c09091214 | X0b040c02120305 | X0b040c0304002b | X0b210c0704002b | X0b170c050c002b | V02180c00 |
| X0b25000004002b | X0b120c06091214 | X031e0c0b081d1e | X0b040c0504002b | X0b220c0504002b | X0b180c040c002b | X03090d0910090a |
| X0b25000404002b | X03130c0a131314 | X0b1d0c07081d1e | X0b050c0104002b | X0b220c0704002b | X0b180c050c002b | X0b090d0310090a |
| X0b26000004002b | X0b130c02131314 | V021f0b01 | X0b050c0304002b | X0b230c0104002b | X0b1a0c040c002b | X0b0e0d0310090a |
| X0b26000404002b | X0b140c02131314 | X031e0c0c071e1f | X0b050c0504002b | X0b230c0304002b | X0b1b0c040c002b | V02190c00 |
| X0b27000004002b | X030d0c0c050c0d | X0a1e0c01071e1f | X0b060c0104002b | X0b230c0504002b | X0b1c0c030c002b | X03100d0c0e0810 |
| X0b27000404002b | X0b0c0c06050c0d | X031e0c0a13151f | X0b070c0104002b | X0b240c0504002b | X0b1c0c040c002b | X0b090d070e0810 |
| X0b28000004002b | X03140c0a0d1415 | X0b150c0713151f | X0b070c0304002b | X0b250c0304002b | X0b1d0c030c002b | X03180d0a181719 |
| X0b28000204002b | X0b150c010d1415 | X0b170c0613151f | X0b070c0504002b | X0b250c0704002b | X0b1d0c040c002b | X0b170d00181719 |
| X0b28000604002b | X030d0c09000b0d | X0b180c0613151f | X0b080c0104002b | X0b260c0704002b | X0b1e0c030c002b | X0b180d02181719 |
| X0b29000004002b | X0b0b0c07000b0d | X0b190c0613151f | X0b080c0304002b | X0b270c0004002b | X0b1e0c040c002b | X0b190d01181719 |
| X0b29000204002b | X0b0c0c02000b0d | X031f0c0a081f20 | X0b080c0504002b | X0b270c0104002b | X0b1e0c060c002b | X03070d09100708 |
| X0b29000404002b | X0b0d0c07000b0d | X0b1f0c00081f20 | X0b090c0304002b | X0b270c0404002b | X0b1f0c020c002b | X0b070d03100708 |
| X0b29000604002b | X030e0c0c060b0c | X0b200c04081f20 | X0b090c0704002b | X0b280c0004002b | X0b1f0c030c002b | X0b080d03100708 |
| X0b2a000004002b | X0b0c0c00060b0c | X030f0c0901000f | X0b0a0c0104002b | X0b280c0104002b | X0b200c020c002b | X03190d0a08191a |
| X0b2a000404002b | X03160c0c180c16 | X0b030c0001000f | X0b0a0c0304002b | X0b280c0404002b | X0b200c050c002b | X0b1a0d0108191a |
| X0318000b06122b | X0b0d0c06180c16 | X0b040c0001000f | X0b0b0c0004002b | X0b290c0104002b | X0b210c030c002b | X03190d0909181a |
| X0b13000206122b | X030b0c08080a14 | X0b070c0001000f | X0b0b0c0104002b | X0b290c0604002b | X0b210c040c002b | X0b1a0d0609181a |
| X0a14000006122b | X0b0c0c07080a14 | X0b080c0001000f | X0b0b0c0304002b | X0b2a0c0104002b | X0b220c040c002b | X031a0d080e111a |
| X0b15000206122b | X0b0f0c07080a14 | X0b0f0c0001000f | X0b0b0c0404002b | X0b2a0c0604002b | X0b230c020c002b | X0b130d060e111a |
| X0a16000006122b | X0b130c07080a14 | X030a0c0906000a | X0b0c0c0104002b | X0b2b0c0904002b | X0b240c020c002b | X0b140d060e111a |
| X0b18000206122b | V02090b01 | X0b050c0706000a | X0b0c0c0304002b | X03200c0a07202b | X0b250c040c002b | X03080d0a020608 |
| X0a19000006122b | V02180b01 | X0b070c0606000a | X0b0c0c0404002b | X0b220c0307202b | X0b250c050c002b | X0b070d00020608 |

X0b1b000206122b
X0a1c000006122b
X0b0000010c002b
X0b0000030c002b
X0b0100060c002b
X0b0200060c002b
X0b0300060c002b
X0b0400060c002b
X0b0500060c002b
X0b0600060c002b
X0b0700060c002b
X0b0800060c002b
X0b0f00040c002b
X0b1000060c002b
X0b1100040c002b
X0b1200060c002b
X0b1a00000c002b
X0b1a00040c002b
X0b1d00060c002b
X0b1e00060c002b
X0b1f00060c002b
X0b2000060c002b
X031e0d0b081d1e
X0b1e0d06081d1e
V02200c00
X03200d0a081f20
X0b1f0d00081f20
X0b200d04081f20
X03150d0c070015
X0b060d07070015
X03140d0a0f0019
X0b090d060f0019
X0b0a0d060f0019
X0b130d000f0019
X0b140d020f0019
X0b190d060f0019
X0b190d070f0019
X03110d0c110011
X0b050d07110011
X03200d08022022
X0b220d01022022
X03230d08182223
X0b230d01182223
V02240c00
X03240d0a102324
X0b230d00102324
X0b240d04102324
X03250d08092425
X0b250d01092425
X03240d0c151c25
X0b1c0d07151c25
X03260d0c092627
X0b260d07092627
X032b0d0401222b
X0b220d0601222b
X0b0c0d0603002b
X0b0d0d0603002b
X0b000d0204002b
X0b000d0304002b
X0b010d0104002b
X0b010d0504002b
X0b010d0704002b
X0b020d0104002b
X0b020d0504002b
X0b020d0704002b
X0b030d0104002b
X0b030d0204002b
X0b030d0504002b
X0b030d0704002b
X0b040d0104002b
X0b040d0504002b
X0b040d0704002b
X0b050d0104002b
X0b050d0504002b
X0b060d0104002b
X0b060d0504002b
X0b070d0204002b
X0b070d0704002b
X0b080d0704002b
X0b0b0d0004002b
X0b0b0d0104002b
X0b0b0d0504002b
X0b0c0d0404002b
X0b0c0d0704002b
X0b0d0d0304002b
X0b0f0d0004002b
X0b0f0d0204002b
X0b0f0d0304002b
X0b0f0d0404002b

X03170c0a081718
X0b170c02081718
X0b180c02081718
X03180c0c0d1618
X0b160c060d1618
X03170c0b181719
X0b170c03181719
X0b180c03181719
V021a0b01
X03070c0a100708
X0b070c02100708
X0b080c02100708
X03190c0c08191a
X0b1a0c0608191a
X03120c0b0e111a
X0b120c030e111a
X0b190c070e111a
V021b0b01
X03180c0a01101b
X0b130c0601101b
X0b140c0601101b
X0b160c0701101b
X0b0f0d0704002b
X0b100d0004002b
X0b100d0104002b
X0b100d0204002b
X0b100d0504002b
X0b110d0104002b
X0b110d0404002b
X0b110d0504002b
X0b110d0704002b
X0b120d0104002b
X0b120d0504002b
X0b130d0204002b
X0b130d0704002b
X0b140d0704002b
X0b150d0104002b
X0b150d0504002b
X0b150d0704002b
X0b160d0104002b
X0b160d0504002b
X0b170d0104002b
X0b170d0204002b
X0b170d0504002b
X0b170d0704002b
X0b180d0104002b
X0b180d0504002b
X0b180d0704002b
X0b190d0204002b
X0b190d0504002b
X0b1a0d0304002b
X0b1a0d0504002b
X0b1b0d0104002b
X0b1b0d0204002b
X0b1b0d0504002b
X0b1b0d0704002b
X0b1c0d0104002b
X0b1c0d0504002b
X0b1c0d0704002b
X0b1d0d0104002b
X0b1d0d0504002b
X0b1e0d0504002b
X0b1f0d0104002b
X0b1f0d0204002b
X0b1f0d0504002b
X0b1f0d0704002b
X0b200d0104002b
X0b200d0504002b
X0b200d0704002b
X0b210d0104002b
X0b210d0504002b
X0b220d0304002b
X0b220d0504002b
X0b230d0204002b
X0b230d0304002b
X0b230d0604002b
X0b230d0704002b
X0b240d0104002b
X0b240d0504002b
X0b240d0704002b
X0b250d0304002b
X0b250d0604002b
X0b260d0104002b
X0b260d0504002b
X0b270d0004002b
X0b270d0104002b
X0b270d0504002b
X0b280d0004002b
X0b280d0104002b

X0b070c0706000a
X0b080c0606000a
X0b0a0c0706000a
X03080c090b0009
X0b030c060b0009
X0b040c060b0009
X0b040c070b0009
X0b080c070b0009
X03050c0b110011
X0b0c0c03110011
X03180c0b111721
X0b190c00111721
X0b1b0c06111721
X0b1c0c06111721
X03230c09002123
X0b210c06002123
X03230c0c091b23
X0b1d0c06091b23
X03230c0a102324
X0b230c00102324
X0b240c04102324
X031f0c0c151c25
X0b280d0504002b
X0b290d0104002b
X0b290d0504002b
X0b290d0704002b
X0b2a0d0104002b
X0b2a0d0504002b
X0b2a0d0704002b
X0b2b0d0904002b
X0b2b0d0a04002b
X0b000d000c002b
X0b000d010c002b
X0b010d040c002b
X0b010d060c002b
X0b020d040c002b
X0b020d060c002b
X0b030d040c002b
X0b030d060c002b
X0b040d040c002b
X0b040d060c002b
X0b050d040c002b
X0b050d060c002b
X0b060d040c002b
X0b060d060c002b
X0b070d040c002b
X0b070d050c002b
X0b080d040c002b
X0b080d050c002b
X0b090d040c002b
X0b090d050c002b
X0b0a0d040c002b
X0b0a0d050c002b
X0b0b0d060c002b
X0b0d0d040c002b
X0b0d0d070c002b
X0b0e0d030c002b
X0b0e0d040c002b
X0b0e0d050c002b
X0b100d040c002b
X0b100d060c002b
X0b110d060c002b
X0b120d040c002b
X0b120d060c002b
X0b120d070c002b
X0b130d030c002b
X0b130d040c002b
X0b140d030c002b
X0b140d040c002b
X0b150d040c002b
X0b150d060c002b
X0b160d040c002b
X0b160d060c002b
X0b160d070c002b
X0b170d040c002b
X0b170d060c002b
X0b180d040c002b
X0b180d060c002b
X0b190d030c002b
X0b190d040c002b
X0b1a0d040c002b
X0b1a0d070c002b
X0b1b0d040c002b
X0b1b0d060c002b
X0b1c0d040c002b
X0b1c0d060c002b
X0b1d0d040c002b
X0b1d0d060c002b
X0b1d0d070c002b

X0b0d0c0504002b
X0b0e0c0504002b
X0b0f0c0104002b
X0b0f0c0304002b
X0b0f0c0404002b
X0b100c0004002b
X0b100c0204002b
X0b10Jc0304002b
X0b100c0404002b
X0b110c0404002b
X0b110c0504002b
X0b110c0604002b
X0b110c0704002b
X0b120c0504002b
X0b120c0704002b
X0b130c0104002b
X0b130c0304002b
X0b130c0504002b
X0b140c0104002b
X0b140c0304002b
X0b140c0704002b
X0b150c0504002b
X0b1e0d030c002b
X0b1a0d040c002b
X0b1f0d040c002b
X0b1f0d060c002b
X0b200d020c002b
X0b200d060c002b
X0b210d040c002b
X0b210d060c002b
X0b210d070c002b
X0b220d040c002b
X0b220d070c002b
X0b230d040c002b
X0b230d050c002b
X0b240d020c002b
X0b240d060c002b
X0b250d040c002b
X0b250d050c002b
X0b250d070c002b
X0b260d040c002b
X0b260d060c002b
X0b270d060c002b
X0b280d060c002b
X0b290d040c002b
X0b290d060c002b
X0b2a0d040c002b
X0b2a0d060c002b
X0b2b0d0b0c002b
X0b2b0d0c0c002b
X031a0d090f1a2b
X03240d080f1a2b
X03110d0a17002b
X03260d0817002b
X0b0e0d0617002b
X0b0f0d0617002b
V020f0d01
V020e0d01
X030e0e09010e10
X0b0e0e05010e10
X0b0f0e05010e10
X03130e0e011113
X0b130e01011113
V020d0d01
V02140d01
X03140e09001214
X0b140e05001214
V020e0d01
X030e0e09000e0e
X0b0e0e05000e0e
X0b0d0e05000e0e
V020a0d01
X030a0e090d090b
X0b090e010d090b
X0b0a0e030d090b
V02080d01
V02190d01
V021a0d01
X03080e090b0709
X0b070e010b0709
X0b080e030b0709
V021e0d01
V02220d01
X03220e08002123
X0b220e05002123
X03220e0e0b2224
X0b220e070b2224
X03220e09071c25
X0b230e07071c25

X0b230c0607202b
X0b240c0107202b
X0b240c0607202b
X03250c0908212b
X0b220c0608212b
X0b000c010c002b
X0b010c040c002b
X0b020c040c002b
X0b030c040c002b
X0b040c040c002b
X0b050c040c002b
X0b050c060c002b
X0b060c040c002b
X0b060c060c002b
X0b070c040c002b
X0b080c040c002b
X0b090c040c002b
X0b090c050c002b
X0b090c060c002b
X0b0a0c040c002b
X0b0a0c050c002b
X0b0a0c060c002b
X0b250e07071c25
X0b000e0204002b
X0b010e0104002b
X0b020e0104002b
X0b030e0104002b
X0b040e0104002b
X0b050e0104002b
X0b060e0104002b
X0b070e0304002b
X0b070e0704002b
X0b080e0704002b
X0b090e0304002b
X0b090e0704002b
X0b0a0e0704002b
X0b0b0e0104002b
X0b0c0e0304002b
X0b0c0e0704002b
X0b0d0e0304002b
X0b0d0e0704002b
X0b0e0e0304002b
X0b0e0e0704002b
X0b0f0e0304002b
X0b0f0e0704002b
X0b100e0104002b
X0b110e0104002b
X0b120e0104002b
X0b130e0504002b
X0b130e0704002b
X0b140e0704002b
X0b150e0104002b
X0b160e0104002b
X0b170e0104002b
X0b180e0104002b
X0b190e0304002b
X0b190e0704002b
X0b1a0e0304002b
X0b1a0e0704002b
X0b1b0e0104002b
X0b1c0e0104002b
X0b1d0e0104002b
X0b1e0e0304002b
X0b1e0e0704002b
X0b1f0e0104002b
X0b200e0104002b
X0b210e0104002b
X0b220e0304002b
X0b230e0104002b
X0b230e0304002b
X0b240e0104002b
X0b250e0104002b
X0b250e0304002b
X0b260e0104002b
X0b270e0104002b
X0b280e0104002b
X0b290e0104002b
X0b2a0e0104002b
X0b2b0e0e04002b
X0b000e000c002b
X0b070e050c002b
X0b080e050c002b
X0b090e050c002b
X0b0e0e050c002b
X0b130e030c002b
X0b140e030c002b
X0b190e050c002b
X0b1a0e050c002b
X0b1e0e050c002b

X0b260c030c002b
X0b260c040c002b
X0b260c060c002b
X0b270c060c002b
X0b280c060c002b
X0b290c040c002b
X0b2a0c040c002b
X0b2b0c0b0c002b
X0b2b0c0e0c002b
X03270c0c0d1c2b
X0b1c0c070d1c2b
X03210c0b0e1c2b
X0b1f0c060e1e2b
X0b200c010e1c2b
X0b200c060e1c2b
X0b210c050e1e2b
X0b220c010e1e2b
X0b240c030e1e2b
X03280c0c10282b
X0b2b0c0a10282b
X03100d0b051011
X0b100d07051011
X0b230e050c002b
X0b250e050c002b
X0b2b0e0c0c002b

X0b070d06020608
X0b080d02020608
X0b080d06020608
X030f0d0912060f
X0b070d0112060f
X09080d0012060f
X0b080d0112060f
X0b090d0112060f
X0b0a0d0112060f
X0b0f0d0512060f
V021c0c00
X031c0d0a081b1c
X0b1b0d00081b1c
X0b1c0d02081b1c
V02040c00
X03170d0c000e1d
X0b0e0d07000e1d
X03040d0a120305
X0b030d00120305
X0b040d02120305
X031c0d0b011e1e
X0b1e0d01011e1e

APPENDIX B (PART II)

```
; HEADER
; FILEID DEFDES /designs/em2kact/em2kact.def fb2c06f5
; CHECKSUM fb2c06f5
; PROGRAM Action Logic System
; VERSION 1.22
; VAR DEFSYS /actel/system.def
; VAR DEFUSR /actuser/ron/ron.def
; VAR DEFDES /designs/em2kact/em2kact.def
; ENDHEADER
data PACKAGE pkg1020
data DIE die1020
data PLACECLOCKBALANCESTRENGTH 6
data ta-temp-derate ind
data timer-layout post
data timer-condition ind
data ta-volt-derate V450
```

APPENDIX B (PART III)

```
; HEADER
; FILEID PIN /designs/EM2KACT/3M2KACT.pin e3ee24d0
; CHECKSUM e3ee24d0
; PROGRAM Action Logic System
; VERSION 1.22
; DEPEND DDFDIE /actel/die1020.ddf 9fe38a0b
; DEPEND DDFPACKAGE /actel/pkg 1020.ddf bb892886
; VAR DDFDIE /actel/die1020.ddf
; VAR DDFPACKAGE /actel/pkg1020.ddf
; ENDHEADER
DEF em2kact.
NET NONRST; ; PIN:54.
NET NBCLKIN; ; PIN:64.
                                  PINOUTS CORRESPOND TO
                                    FIGURES INDICATED
NET TX; ; PIN:2.                  RS 232 XMIT LINE
NET P_DVALID; ; PIN:42.
NET P_COMERR; ; PIN:41.
NET NBCLKOUT; ; PIN:59.
NET XIN; ; PIN:53.
NET XOUT; ; PIN:55.
NET P_PMO; ; PIN:70.              SAME A PS[], NS[], PM[], NME[] IN DIAGRAMS
NET P_NMO; ; PIN:71.              9i, 9j, 9k CONNECT TO CDb, CDa, RDb, AND RDa
NET P_PM1; ; PIN:62.              RESPECTIVELY ON FIG. 9b
NET P_NM1; ; PIN:63.
NET P_PM2; ; PIN:57.
NET P_NM2; ; PIN:58.
NET P_PM3; ; PIN:76.
NET P_NM3; ; PIN:77.
NET P_PM4; ; PIN:78.
NET RCV; ; PIN:3.                 CONNECT TO FIG. 9i,SIGNAL 1-a
NET P_NM4; ; PIN:79.              SAME A PS[], NS[], PM[], NME[] IN DIAGRAMS
NET P_PM5; ; PIN:80.              9i, 9j, 9k CONNECT TO CDb, CDa, RDb, AND RDa
NET P_NM5; ; PIN:81.              RESPECTIVELY ON FIG. 9b
NET P_PWO; ; PIN:44.
NET P_CSO; ; PIN:27.              CONTACT STATUS INPUTS
                                  CONNECT TO "NEW #" OF FIG. 9a.
NET P_NSO; ; PIN:45.              SAME A PS[], NS[], PM[], NME[] IN DIAGRAMS
NET P_PS1; ; PIN:48.              9i, 9j, 9k CONNECT TO CDb, CDa, RDb, AND RDa
NET P_NS1; ; PIN:49.              RESPECTIVELY ON FIG. 9b
NET P_CS1; ; PIN:28.              CONTACT STATUS INPUTS
                                  CONNECT TO "NEW #" OF FIG. 9a.
NET P_PS2; ; PIN:50.              SAME A PS[], NS[], PM[], NME[] IN DIAGRAMS
NET P_NS2; ; PIN:51.              9i, 9j, 9k CONNECT TO CDb, CDa, RDb, AND RDa
NET P_PS3; ; PIN:10.              RESPECTIVELY ON FIG. 9b
NET P_CS2; ; PIN:29.              CONTACT STATUS INPUTS
                                  CONNECT TO "NEW #" OF FIG. 9a.
NET P_NS3; ; PIN:9.               SAME A PS[], NS[], PM[], NME[] IN DIAGRAMS
NET P_PS4; ; PIN:8.               9i, 9j, 9k CONNECT TO CDb, CDa, RDb, AND RDa
NET P_NS4; ; PIN:7.               RESPECTIVELY ON FIG. 9b
NET P-CS3; ; PIN:30.              CONTACT STATUS INPUTS
                                  CONNECT TO "NEW #" OF FIG. 9a.
NET P_PS5; ; PIN:6.               SAME A PS[], NS[], PM[], NME[] IN DIAGRAMS
NET P_NS5; ; PIN:5.               9i, 9j, 9k CONNECT TO CDb, CDa, RDb, AND RDa
                                  RESPECTIVELY ON FIG. 9b
NET P_CS4; ; PIN:31.              CONTACT STATUS INPUTS
                                  CONNECT TO "NEW #" OF FIG. 9a.
NET P_PS6; ; PIN:84.              SAME A PS[], NS[], PM[], NME[] IN DIAGRAMS
NET P_NS6; ; PIN:83.              9i, 9j, 9k CONNECT TO CDb, CDa, RDb, AND RDa
                                  RESPECTIVELY ON FIG. 9b
NET P_MSTO; ; PIN:16.             MOTOR READ STATUS INPUTS
NET P_MST1; ; PIN:17.             CONNECT TO MSTAT ON FIG. 9b
NET P_MST2; ; PIN:20.
NET P_CS5; ; PIN:32.              CONTACT STATUS INPUTS
                                  CONNECT TO "NEW #" OF FIG. 9a.
```

```
NET P_MST3; ; PIN:21.      MOTOR READ STATUS INPUTS
NET P_MST4; ; PIN:22.      CONNECT TO MSTAT ON FIG. 9b
NET P_MST5; ; PIN:23
NET P_TDRV; ; PIN:35       OPTO TRIAC DRIVER LINE (FIG. 91, 1-b)
                           CONNECT TO "NEW #" ON FIG. 9a
```

APPENDIX B (PART IV)

Note: Erroneous COMM messages result in the gate array responding with two all 1's response bytes (ie., 11111111 and 11111111), the gate array resetting itself with no other action, and then the gate array waiting for the next valid byte 0.

The following tables are a complete list of EM2000 Gate Array Commands and responses between a controller and the device.

Gate Array READ MOTOR Commands/Responses

| Command Messages | | No Motor Present Response | | Motor Present Response | |
|---|---|---|---|---|---|
| Command Byte 1 | Command Byte 0 | Response Byte 1 | Response Byte 0 | Response Byte 1 | Response Byte 0 |
| 00000001 | 00000000 | 00000001 | 00000000 | 11010001 | 00000000 |
| 00000001 | 10100010 | 00000001 | 10100010 | 11010001 | 10100010 |
| 00000001 | 11100100 | 00000001 | 11100100 | 11010001 | 11100100 |
| 00000001 | 01000110 | 00000001 | 01000110 | 11010001 | 01000110 |
| 00000001 | 01101000 | 00000001 | 01101000 | 11010001 | 01101000 |
| 00000001 | 11001010 | 00000001 | 11001010 | 11010001 | 11001010 |
| 00000001 | 10001100 | 00000001 | 10001100 | 11010001 | 10001100 |
| 00000001 | 00101110 | 00000001 | 00101110 | 11010001 | 00101110 |
| 00000001 | 11010000 | 00000001 | 11010000 | 11010001 | 11010000 |
| 00000001 | 01110010 | 00000001 | 01110010 | 11010001 | 01110010 |
| 00000001 | 00110100 | 00000001 | 00110100 | 11010001 | 00110100 |
| 00000001 | 10010110 | 00000001 | 10010110 | 11010001 | 10010110 |
| 00000001 | 10111000 | 00000001 | 10111000 | 11010001 | 10111000 |
| 00000001 | 00011010 | 00000001 | 00011010 | 11010001 | 00011010 |
| 00000001 | 01011100 | 00000001 | 01011100 | 11010001 | 01011100 |
| 00000001 | 11111110 | 00000001 | 11111110 | 11010001 | 11111110 |
| 10100011 | 00000000 | 10100011 | 00000000 | 01110011 | 00000000 |
| 10100011 | 10100010 | 10100011 | 10100010 | 01110011 | 10100010 |
| 10100011 | 11100100 | 10100011 | 11100100 | 01110011 | 11100100 |
| 10100011 | 01000110 | 10100011 | 01000110 | 01110011 | 01000110 |
| 10100011 | 01101000 | 10100011 | 01101000 | 01110011 | 01101000 |
| 10100011 | 11001010 | 10100011 | 11001010 | 01110011 | 11001010 |
| 10100011 | 10001100 | 10100011 | 10001100 | 01110011 | 10001100 |
| 10100011 | 00101110 | 10100011 | 00101110 | 01110011 | 00101110 |
| 10100011 | 11010000 | 10100011 | 11010000 | 01110011 | 11010000 |
| 10100011 | 01110010 | 10100011 | 01110010 | 01110011 | 01110010 |
| 10100011 | 00110100 | 10100011 | 00110100 | 01110011 | 00110100 |
| 10100011 | 10010110 | 10100011 | 10010110 | 01110011 | 10010110 |
| 10100011 | 10111000 | 10100011 | 10111000 | 01110011 | 10111000 |
| 10100011 | 00011010 | 10100011 | 00011010 | 01110011 | 00011010 |
| 10100011 | 01011100 | 10100011 | 01011100 | 01110011 | 01011100 |
| 10100011 | 11111110 | 10100011 | 11111110 | 01110011 | 11111110 |
| 11100101 | 00000000 | 11100101 | 00000000 | 00110101 | 00000000 |
| 11100101 | 10100010 | 11100101 | 10100010 | 00110101 | 10100010 |
| 11100101 | 11100100 | 11100101 | 11100100 | 00110101 | 11100100 |
| 11100101 | 01000110 | 11100101 | 01000110 | 00110101 | 01000110 |
| 11100101 | 01101000 | 11100101 | 01101000 | 00110101 | 01101000 |
| 11100101 | 11001010 | 11100101 | 11001010 | 00110101 | 11001010 |
| 11100101 | 10001100 | 11100101 | 10001100 | 00110101 | 10001100 |
| 11100101 | 00101110 | 11100101 | 00101110 | 00110101 | 00101110 |
| 11100101 | 11010000 | 11100101 | 11010000 | 00110101 | 11010000 |
| 11100101 | 01110010 | 11100101 | 01110010 | 00110101 | 01110010 |

| Command Messages | | Circuit Breaker Open Response | | Circuit Breaker Closed Response | |
|---|---|---|---|---|---|
| Command Byte 1 | Command Byte 0 | Response Byte 1 | Response Byte 0 | Response Byte 1 | Response Byte 0 |
| 01101001 | 00000000 | 00000001 | 00000000 | 11010001 | 00000000 |
| 01101001 | 10100010 | 00000001 | 10100010 | 11010001 | 10100010 |
| 01101001 | 11100100 | 00000001 | 11100100 | 11010001 | 11100100 |
| 01101001 | 01000110 | 00000001 | 01000110 | 11010001 | 01000110 |
| 01101001 | 01101000 | 00000001 | 01101000 | 11010001 | 01101000 |

Gate Array OPEN CONTACT Commands/Responses

| Command Messages | | Circuit Breaker Open Response | | Circuit Breaker Closed Response | |
|---|---|---|---|---|---|
| Command Byte 1 | Command Byte 0 | Response Byte 1 | Response Byte 0 | Response Byte 1 | Response Byte 0 |
| 01101001 | 11001010 | 00000001 | 11001010 | 11010001 | 11001010 |
| 01101001 | 10001100 | 00000001 | 10001100 | 11010001 | 10001100 |
| 01101001 | 00101110 | 00000001 | 00101110 | 11010001 | 00101110 |
| 01101001 | 11010000 | 00000001 | 11010000 | 11010001 | 11010000 |
| 01101001 | 01110010 | 00000001 | 01110010 | 11010001 | 01110010 |
| 01101001 | 00110100 | 00000001 | 00110100 | 11010001 | 00110100 |
| 01101001 | 10010110 | 00000001 | 10010110 | 11010001 | 10010110 |
| 01101001 | 10111000 | 00000001 | 10111000 | 11010001 | 10111000 |
| 01101001 | 00011010 | 00000001 | 00011010 | 11010001 | 00011010 |
| 01101001 | 01011100 | 00000001 | 01011100 | 11010001 | 01011100 |
| 01101001 | 11111110 | 00000001 | 11111110 | 11010001 | 11111110 |
| 11001011 | 00000000 | 10100011 | 00000000 | 01110011 | 00000000 |
| 11001011 | 10100010 | 10100011 | 10100010 | 01110011 | 10100010 |
| 11001011 | 11100100 | 10100011 | 11100100 | 01110011 | 11100100 |
| 11001011 | 01000110 | 10100011 | 01000110 | 01110011 | 01000110 |
| 11001011 | 01101000 | 10100011 | 01101000 | 01110011 | 01101000 |
| 11001011 | 11001010 | 10100011 | 11001010 | 01110011 | 11001010 |
| 11001011 | 10001100 | 10100011 | 10001100 | 01110011 | 10001100 |
| 11001011 | 00101110 | 10100011 | 00101110 | 01110011 | 00101110 |
| 11001011 | 11010000 | 10100011 | 11010000 | 01110011 | 11010000 |
| 11001011 | 01110010 | 10100011 | 01110010 | 01110011 | 01110010 |
| 11001011 | 00110100 | 10100011 | 00110100 | 01110011 | 00110100 |
| 11001011 | 10010110 | 10100011 | 10010110 | 01110011 | 10010110 |
| 11001011 | 10111000 | 10100011 | 10111000 | 01110011 | 10111000 |
| 11001011 | 00011010 | 10100011 | 00011010 | 01110011 | 00011010 |
| 11001011 | 01011100 | 10100011 | 01011100 | 01110011 | 01011100 |
| 11001011 | 11111110 | 10100011 | 11111110 | 01110011 | 11111110 |
| 11100101 | 00000000 | 11100101 | 00000000 | 00110101 | 00000000 |
| 11100101 | 10100010 | 11100101 | 10100010 | 00110101 | 10100010 |
| 11100101 | 11100100 | 11100101 | 11100100 | 00110101 | 11100100 |
| 11100101 | 01000110 | 11100101 | 01000110 | 00110101 | 01000110 |
| 11100101 | 01101000 | 11100101 | 01101000 | 00110101 | 01101000 |
| 11100101 | 11001010 | 11100101 | 11001010 | 00110101 | 11001010 |
| 11100101 | 10001100 | 11100101 | 10001100 | 00110101 | 10001100 |
| 11100101 | 00101110 | 11100101 | 00101110 | 00110101 | 00101110 |
| 11100101 | 11010000 | 11100101 | 11010000 | 00110101 | 11010000 |
| 11100101 | 01110010 | 11100101 | 01110010 | 00110101 | 01110010 |
| 11010001 | 00000000 | 00000001 | 00000000 | 11010001 | 00000000 |
| 11010001 | 10100010 | 00000001 | 10100010 | 11010001 | 10100010 |
| 11010001 | 11100100 | 00000001 | 11100100 | 11010001 | 11100100 |
| 11010001 | 01000110 | 00000001 | 01000110 | 11010001 | 01000110 |
| 11010001 | 01101000 | 00000001 | 01101000 | 11010001 | 01101000 |
| 11010001 | 11001010 | 00000001 | 11001010 | 11010001 | 11001010 |
| 11010001 | 10001100 | 00000001 | 10001100 | 11010001 | 10001100 |
| 11010001 | 00101110 | 00000001 | 00101110 | 11010001 | 00101110 |
| 11010001 | 11010000 | 00000001 | 11010000 | 11010001 | 11010000 |
| 11010001 | 01110010 | 00000001 | 01110010 | 11010001 | 01110010 |
| 11010001 | 00110100 | 00000001 | 00110100 | 11010001 | 00110100 |
| 11010001 | 10010110 | 00000001 | 10010110 | 11010001 | 10010110 |
| 11010001 | 10111000 | 00000001 | 10111000 | 11010001 | 10111000 |
| 11010001 | 00011010 | 00000001 | 00011010 | 11010001 | 00011010 |
| 11010001 | 01011100 | 00000001 | 01011100 | 11010001 | 01011100 |
| 11010001 | 11111110 | 00000001 | 11111110 | 11010001 | 11111110 |
| 01110011 | 00000000 | 10100011 | 00000000 | 01110011 | 00000000 |
| 01110011 | 10100010 | 10100011 | 10100010 | 01110011 | 10100010 |
| 01110011 | 11100100 | 10100011 | 11100100 | 01110011 | 11100100 |
| 01110011 | 01000110 | 10100011 | 01000110 | 01110011 | 01000110 |
| 01110011 | 01101000 | 10100011 | 01101000 | 01110011 | 01101000 |
| 01110011 | 11001010 | 10100011 | 11001010 | 01110011 | 11001010 |
| 01110011 | 10001100 | 10100011 | 10001100 | 01110011 | 10001100 |
| 01110011 | 00101110 | 10100011 | 00101110 | 01110011 | 00101110 |
| 01110011 | 11010000 | 10100011 | 11010000 | 01110011 | 11010000 |

| Gate Array CLOSE CONTACT Commands/Responses ||||||
|---|---|---|---|---|---|
| Command Messages || Circuit Breaker Open Response || Circuit Breaker Closed Response ||
| Command Byte 1 | Command Byte 0 | Response Byte 1 | Response Byte 0 | Response Byte 1 | Response Byte 0 |
| 01110011 | 01110010 | 10100011 | 01110010 | 01110011 | 01110010 |
| 01110011 | 00110100 | 10100011 | 00110100 | 01110011 | 00110100 |
| 01110011 | 10010110 | 10100011 | 10010110 | 01110011 | 10010110 |
| 01110011 | 10111000 | 10100011 | 10111000 | 01110011 | 10111000 |
| 01110011 | 00011010 | 10100011 | 00011010 | 01110011 | 00011010 |
| 01110011 | 01011100 | 10100011 | 01011100 | 01110011 | 01011100 |
| 01110011 | 11111110 | 10100011 | 11111110 | 01110011 | 11111110 |
| 00110101 | 00000000 | 11100101 | 00000000 | 00110101 | 00000000 |
| 00110101 | 10100010 | 11100101 | 10100010 | 00110101 | 10100010 |
| 00110101 | 11100100 | 11100101 | 11100100 | 00110101 | 11100100 |
| 00110101 | 01000110 | 11100101 | 01000110 | 00110101 | 01000110 |
| 00110101 | 01101000 | 11100101 | 01101000 | 00110101 | 01101000 |
| 00110101 | 11001010 | 11100101 | 11001010 | 00110101 | 11001010 |
| 00110101 | 10001100 | 11100101 | 10001100 | 00110101 | 10001100 |
| 00110101 | 00101110 | 11100101 | 00101110 | 00110101 | 00101110 |
| 00110101 | 11010000 | 11100101 | 11010000 | 00110101 | 11010000 |
| 00110101 | 01110010 | 11100101 | 01110010 | 00110101 | 01110010 |
| 10111001 | 00000000 | 00000001 | 00000000 | 11010001 | 00000000 |
| 10111001 | 10100010 | 00000001 | 10100010 | 11010001 | 10100010 |
| 10111001 | 11100100 | 00000001 | 11100100 | 11010001 | 11100100 |
| 10111001 | 01000110 | 00000001 | 01000110 | 11010001 | 01000110 |
| 10111001 | 01101000 | 00000001 | 01101000 | 11010001 | 01101000 |
| 10111001 | 11001010 | 00000001 | 11001010 | 11010001 | 11001010 |
| 10111001 | 10001100 | 00000001 | 10001100 | 11010001 | 10001100 |
| 10111001 | 00101110 | 00000001 | 00101110 | 11010001 | 00101110 |
| 10111001 | 11010000 | 00000001 | 11010000 | 11010001 | 11010000 |
| 10111001 | 01110010 | 00000001 | 01110010 | 11010001 | 01110010 |
| 10111001 | 00110100 | 00000001 | 00110100 | 11010001 | 00110100 |
| 10111001 | 10010110 | 00000001 | 10010110 | 11010001 | 10010110 |
| 10111001 | 10111000 | 00000001 | 10111000 | 11010001 | 10111000 |
| 10111001 | 00011010 | 00000001 | 00011010 | 11010001 | 00011010 |
| 10111001 | 01011100 | 00000001 | 01011100 | 11010001 | 01011100 |
| 10111001 | 11111110 | 00000001 | 11111110 | 11010001 | 11111110 |
| 00011011 | 00000000 | 10100011 | 00000000 | 01110011 | 00000000 |
| 00011011 | 10100010 | 10100011 | 10100010 | 01110011 | 10100010 |
| 00011011 | 11100100 | 10100011 | 11100100 | 01110011 | 11100100 |
| 00011011 | 01000110 | 10100011 | 01000110 | 01110011 | 01000110 |
| 00011011 | 01101000 | 10100011 | 01101000 | 01110011 | 01101000 |
| 00011011 | 11001010 | 10100011 | 11001010 | 01110011 | 11001010 |
| 00011011 | 10001100 | 10100011 | 10001100 | 01110011 | 10001100 |
| 00011011 | 00101110 | 10100011 | 00101110 | 01110011 | 00101110 |
| 00011011 | 11010000 | 10100011 | 11010000 | 01110011 | 11010000 |
| 00011011 | 01110010 | 10100011 | 01110010 | 01110011 | 01110010 |
| 00011011 | 00110100 | 10100011 | 00110100 | 01110011 | 00110100 |
| 00011011 | 10010110 | 10100011 | 10010110 | 01110011 | 10010110 |
| 00011011 | 10111000 | 10100011 | 10111000 | 01110011 | 10111000 |
| 00011011 | 00011010 | 10100011 | 00011010 | 01110011 | 00011010 |
| 00011011 | 01011100 | 10100011 | 01011100 | 01110011 | 01011100 |
| 00011011 | 11111110 | 10100011 | 11111110 | 01110011 | 11111110 |
| 01011101 | 00000000 | 11100101 | 00000000 | 00110101 | 00000000 |
| 01011101 | 10100010 | 11100101 | 10100010 | 00110101 | 10100010 |
| 01011101 | 11100100 | 11100101 | 11100100 | 00110101 | 11100100 |
| 01011101 | 01000110 | 11100101 | 01000110 | 00110101 | 01000110 |
| 01011101 | 01101000 | 11100101 | 01101000 | 00110101 | 01101000 |
| 01011101 | 11001010 | 11100101 | 11001010 | 00110101 | 11001010 |
| 01011101 | 10001100 | 11100101 | 10001100 | 00110101 | 10001100 |
| 01011101 | 00101110 | 11100101 | 00101110 | 00110101 | 00101110 |
| 01011101 | 11010000 | 11100101 | 11010000 | 00110101 | 11010000 |
| 01011101 | 01110010 | 11100101 | 01110010 | 00110101 | 01110010 |

What is claimed is:

1. For an electrical distribution system used to control current paths through a plurality of associated electrical switching means, at least one of which is operable by remote control in at least open and closed circuit positions, a circuit arrangement comprising:

termination means for receiving a plurality of different kinds of remote control signals, at least one of said plurality different kinds for commanding said at least one electrical switching means to open or close the associated current path;

a prescribed map correlating said remote control signals to said electrical switching means; and a programmable control circuit, responsive to said at least one remote control signal and to the prescribed map, for controlling said at least one electrical switching means between the open and closed positions, wherein the prescribed map indicates a selected kind of the different kinds of remote control signals which commands the associated electrical switching means.

2. A circuit arrangement, according to claim 1, wherein for programming the prescribed map, the programmable control circuit includes at least one of the following: a keypad, a nonvolatile memory device and a trinary switch.

3. A circuit arrangement, according to claim 2, wherein the programmable control circuit includes a microcomputer which responds to the keypad.

4. A circuit arrangement, according to claim 1, wherein the programmable control circuit includes a microcomputer for programming the prescribed map.

5. A circuit arrangement, according to claim 1, wherein the termination means includes a microcomputer for interpreting the different kinds of remote control signals.

6. A circuit arrangement, according to claim 1, wherein the different kinds of remote control signals include a pulsed signal for indicating that the associated electrical switching means should change positions between the open and closed circuit positions.

7. A circuit arrangement, according to claim 6, wherein the different kinds of remote control signals also include a level-indicating signal having an open position level and a closed position level for indicating the open and closed positions for the associated electrical switching means.

8. A circuit arrangement, according to claim 1, wherein the different kinds of remote control signals include a level-indicating signal having an open position level and a closed position level for indicating the open and closed positions for the associated electrical switching means.

9. An electrical distribution system for controlling a plurality of electrical switching means, at least one of which operates in at least the open and closed circuit positions, the system comprising:

an enclosure which contains the electrical switching means and contains:

an electrical switching means engagement circuit, respectively coupled to the electrical switching means and responsive to at least one of a plurality of different kinds of remote control signals, for controlling the electrical switching means such that said at least one electrical switching means is able to open and close; and a user-operable programmable control circuit, integrally contained within said enclosure and situated to generate signals to control the engagement circuit so that said at least one electrical switching means is properly controlled between the open and closed circuit positions.

10. An electrical distribution system, according to claim 9, wherein the user-operable programmable control circuit includes means for programming a prescribed map which correlates said at least one of a plurality of different kinds of remote control signals to said at least one electrical switching means.

11. An electrical distribution system, according to claim 9, wherein the plurality of different kinds of remote control signals are carried by conductors to the engagement circuit.

12. An electrical distribution system, according to claim 9, wherein the user-operable programmable control circuit further includes a programmable time clock which may be programmed to indicate when a position of an electrical switching means should be changed automatically.

13. An electrical distribution system, according to claim 12, wherein the plurality of different kinds of remote control signals include a pulsed signal for indicating that the associated electrical switching means should change positions between the open and closed circuit positions and also include a level-indicating signal having an open position level and a closed position level for indicating the open and closed positions for the associated electrical switching means.

14. An electrical distribution system, according to claim 9, wherein the electrical switching means engagement circuit is optically isolated from the user-operable programmable control circuit.

15. In an electrical distribution system for controlling current paths through a plurality of associated electrical switching means which are each operable by remote control in at least the open and closed circuit positions, a circuit arrangement comprising:

termination means for receiving a plurality of different kinds of remote control signals, each of which is associated with one of the electrical switching means for commanding that each of the electrical switching means open or close the associated current path;

a programmable controller, responsive to each of the different kinds of remote control signals and to a user-defined program indicating the kind of remote control signal which commands the associated electrical switching means, for generating control signals; and an interface circuit which responds to the generated control signals by controlling the electrical switching means between the open and closed positions.

16. A circuit arrangement, according to claim 15, wherein the plurality different kinds of remote control signals includes a pulsed signal for indicating that the associated electrical switching means should change positions between the open and closed circuit positions and also include a level-indicating signal having an open position level and a closed position level for indicating the open and closed positions for the associated electrical switching means.

17. A circuit arrangement, according to claim 15, wherein the interface circuit is optically isolated from the programmable controller.

18. A circuit arrangement, according to claim 15, further including a display and wherein the interface circuit includes means for monitoring the position of each of the electrical switching means and reporting the position to the display.

19. A circuit arrangement, according to claim 16, wherein the interface circuit includes means for monitoring the position of each of the electrical switching means and reporting the position to the programmable controller for local and remote display.

20. A circuit arrangement, according to claim 19, wherein the termination means and the controller each includes a microcomputer for communicating between the termination means and the controller.

21. A circuit arrangement, according to claim 1, wherein the programmable control circuit is removable.

22. An electrical distribution system, according claim 9, wherein the user-operable programmable control circuit is optically isolated from communication circuits.

* * * * *